United States Patent
Patil et al.

(10) Patent No.: US 11,996,920 B2
(45) Date of Patent: May 28, 2024

(54) BEAM TRAINING TECHNIQUES IN WIFI FREQUENCY BANDS

(71) Applicant: QUALCOMM Incorporated, San Diego, CA (US)

(72) Inventors: Abhishek Pramod Patil, San Diego, CA (US); George Cherian, San Diego, CA (US); Yanjun Sun, San Diego, CA (US); Lin Yang, San Diego, CA (US); Gaurang Naik, San Diego, CA (US); Abdel Karim Ajami, Lakeside, CA (US); Alfred Asterjadhi, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/942,006

(22) Filed: Sep. 9, 2022

(65) Prior Publication Data

US 2024/0088958 A1 Mar. 14, 2024

(51) Int. Cl.
*H04B 7/06* (2006.01)
*H04W 24/02* (2009.01)
*H04W 28/02* (2009.01)

(52) U.S. Cl.
CPC ......... *H04B 7/0617* (2013.01); *H04B 7/0695* (2013.01); *H04W 24/02* (2013.01); *H04W 28/0278* (2013.01)

(58) Field of Classification Search
CPC .. H04B 7/0617; H04B 7/0408; H04B 7/0456; H04B 7/0634; H04B 7/0626;
(Continued)

(56) References Cited

U.S. PATENT DOCUMENTS

2010/0265925 A1* 10/2010 Liu .................. H04B 7/0617 370/336
2015/0230263 A1* 8/2015 Roy .................. H04W 72/51 455/452.2

(Continued)

FOREIGN PATENT DOCUMENTS

WO WO-2018132593 A1 7/2018

OTHER PUBLICATIONS

Partial International Search Report—PCT/US2023/028233—ISA/EPO—Nov. 15, 2023.

*Primary Examiner* — Khanh C Tran
(74) *Attorney, Agent, or Firm* — Holland & Hart / Qualcomm

(57) ABSTRACT

Methods, systems, and devices for wireless communications are described. A first wireless device (e.g., station (STA), access point (AP)) may transmit to a second wireless device during a service period, an initiating frame using a transmit beam that is based on a first beam training procedure performed between the devices prior to the service period. The first wireless device may perform a second beam training procedure during the service period based on an absence of a response frame from the second wireless device, based on an indication within the response frame received from the second wireless device, or based on identification of a change in a wireless channel relative to a previous beam training interval or previous service period. The first wireless device may then communicate one or more messages with the second wireless device using one or more beams that are based on the second beam training procedure.

30 Claims, 23 Drawing Sheets

(58) Field of Classification Search
CPC ... H04B 7/0639; H04B 7/0695; H04W 24/02; H04W 24/08; H04W 24/10; H04W 24/06; H04W 24/04
See application file for complete search history.

(56) References Cited

U.S. PATENT DOCUMENTS

| | | | |
|---|---|---|---|
| 2015/0341095 A1* | 11/2015 | Yu | H04B 7/061 370/252 |
| 2019/0123798 A1* | 4/2019 | Lou | H04L 5/0055 |
| 2020/0145853 A1 | 5/2020 | Lou et al. | |
| 2022/0216898 A1 | 7/2022 | Lou et al. | |

* cited by examiner

BEAM TRAINING TECHNIQUES IN WIFI FREQUENCY BANDS

TECHNICAL FIELD

The following relates to wireless communications, including beam training techniques in Wi-Fi frequency bands.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via DL and UL. The DL (or forward link) may refer to the communication link from the AP to the station, and the UL (or reverse link) may refer to the communication link from the station to the AP.

Many Wi-Fi deployments may use 2.4 GHz, 5 GHz, and/or 6 GHz bands, which may be referred to as "sub-7" GHz bands. Future Wi-Fi enhancements aim to leverage multi-link operation techniques to enhance a user experience within other frequency bands, such as a 60 GHz frequency band. While the 60 GHz band may offer a large swath of resources for Wi-Fi devices to use, the 60 GHz band is not widely used due to several challenges, including high propagation loss. As such, there is a need to improve Wi-Fi communications on respective frequency bands, such as the 60 GHz band.

SUMMARY

The described techniques relate to improved methods, systems, devices, or apparatuses that support beam training techniques in Wi-Fi frequency bands. Generally, aspects of the present disclosure are directed to techniques for handshake signaling between wireless devices that enable the wireless devices to determine whether (or what level) of beam training procedures are required for a Wi-Fi band, such as a 60 GHz link. In particular, wireless devices may perform a beam training procedure, and subsequently exchange message frames (e.g., initiating frames, response frames) at the start of subsequent service periods (SPs) to indicate whether the respective devices can communicate using previously-selected beams, or if the devices are expected to perform a new beam training procedure. In some cases, a station (STA), an access point (AP), or both, may be able to explicitly trigger a beam training procedure within an SP via an initiating frame or response frame at the start of the SP. Additionally, or alternatively, a failure of one of the devices to successfully receive the initiating frame and/or response frame may serve as an implicit indication that the devices are to perform a new beam training procedure during the SP.

A method for wireless communications at a first wireless device is described. The method may include transmitting, to a second wireless device during a SP, an initiating frame using a transmit beam based on a first beam training procedure performed between the first wireless device and the second wireless device prior to the SP, performing a second beam training procedure during the SP based on an absence of a response frame from the second wireless device, based on an indication within the response frame received from the second wireless device, or based on identification of a change in a wireless channel relative to a previous beam training interval or previous SP, the response frame being in response to the initiating frame, and communicating one or more messages with the second wireless device using one or more beams based on the second beam training procedure.

An apparatus for wireless communications at a first wireless device is described. The apparatus may include a processor, memory coupled with the processor, and instructions stored in the memory. The instructions may be executable by the processor to cause the apparatus to transmit, to a second wireless device during a SP, an initiating frame using a transmit beam based on a first beam training procedure performed between the first wireless device and the second wireless device prior to the SP, perform a second beam training procedure during the SP based on an absence of a response frame from the second wireless device, based on an indication within the response frame received from the second wireless device, or based on identification of a change in a wireless channel relative to a previous beam training interval or previous SP, the response frame being in response to the initiating frame, and communicate one or more messages with the second wireless device using one or more beams based on the second beam training procedure.

Another apparatus for wireless communications at a first wireless device is described. The apparatus may include means for transmitting, to a second wireless device during a SP, an initiating frame using a transmit beam based on a first beam training procedure performed between the first wireless device and the second wireless device prior to the SP, means for performing a second beam training procedure during the SP based on an absence of a response frame from the second wireless device, based on an indication within the response frame received from the second wireless device, or based on identification of a change in a wireless channel relative to a previous beam training interval or previous SP, the response frame being in response to the initiating frame, and means for communicating one or more messages with the second wireless device using one or more beams based on the second beam training procedure.

A non-transitory computer-readable medium storing code for wireless communications at a first wireless device is described. The code may include instructions executable by a processor to transmit, to a second wireless device during a SP, an initiating frame using a transmit beam based on a first beam training procedure performed between the first wireless device and the second wireless device prior to the SP, perform a second beam training procedure during the SP based on an absence of a response frame from the second wireless device, based on an indication within the response frame received from the second wireless device, or based on identification of a change in a wireless channel relative to a previous beam training interval or previous SP, the response frame being in response to the initiating frame, and communicate one or more messages with the second wireless device using one or more beams based on the second beam training procedure.

Some examples of the method, apparatuses, and non-transitory computer-readable medium described herein may further include operations, features, means, or instructions for communicating, with the second wireless device, control signaling indicating a set of multiple SPs associated with the first wireless device, the set of multiple SPs including the SP, where the initiating frame may be transmitted based on the control signaling.

In some examples of the method, apparatuses, and non-transitory computer-readable medium described herein, the initiating frame includes an indication as to whether the first wireless device may be requesting to perform the second beam training procedure with the second wireless device during the SP.

Some examples of the method, apparatuses, and non-transitory computer-readable medium described herein may further include operations, features, means, or instructions for performing one or more measurements on signals received from the second wireless device via a receive beam based on the first beam training procedure, where the initiating frame may be transmitted based on whether the one or more measurements satisfy one or more thresholds.

In some examples of the method, apparatuses, and non-transitory computer-readable medium described herein, the initiating frame includes an indication that the first wireless device may be requesting to perform the second beam training procedure based on the one or more measurements failing to satisfy the one or more thresholds and the initiating frame includes an indication that the first wireless device may be not requesting to perform the second beam training procedure based on the one or more measurements satisfying the one or more thresholds.

In some examples of the method, apparatuses, and non-transitory computer-readable medium described herein, the initiating frame includes a BSR associated with traffic to be communicated from the first wireless device to the second wireless device and the method, apparatuses, and non-transitory computer-readable medium may include further operations, features, means, or instructions for transmitting the traffic to the second wireless device using the one or more beams and based on the BSR.

Some examples of the method, apparatuses, and non-transitory computer-readable medium described herein may further include operations, features, means, or instructions for receiving, from the second wireless device, a trigger frame scheduling the traffic based on the BSR, where the traffic may be transmitted based on the trigger frame.

Some examples of the method, apparatuses, and non-transitory computer-readable medium described herein may further include operations, features, means, or instructions for receiving downlink traffic from the second wireless device with the trigger frame.

In some examples of the method, apparatuses, and non-transitory computer-readable medium described herein, the one or more messages may be received from the second wireless device using a receive beam based on the second beam training procedure and a last frame of the one or more messages indicate an end of the one or more messages, an end of the SP, or both.

In some examples of the method, apparatuses, and non-transitory computer-readable medium described herein, the first wireless device receives the one or more messages while in a first operational state associated with a first power consumption and the method, apparatuses, and non-transitory computer-readable medium may include further operations, features, means, or instructions for transitioning to a second operational state associated with a second power consumption that may be less than the first power consumption based on the one or more messages indicating the end of the one or more messages, the end of the SP, or both.

Some examples of the method, apparatuses, and non-transitory computer-readable medium described herein may further include operations, features, means, or instructions for communicating one or more additional messages with the second wireless device during a second SP using the one or more beams based on the second beam training procedure.

In some examples of the method, apparatuses, and non-transitory computer-readable medium described herein, the one or more messages include an indication of the second SP for communications between the first wireless device and the second wireless device and the one or more additional messages may be communicated based on the indication of the second SP.

In some examples of the method, apparatuses, and non-transitory computer-readable medium described herein, the initiating frame includes the indication that the first wireless device may be requesting to perform the second beam training procedure with the second wireless device and the method, apparatuses, and non-transitory computer-readable medium may include further operations, features, means, or instructions for receiving the response frame from the second wireless device based on the initiating frame, where the response frame includes an acknowledgment of the second beam training procedure, where the second beam training procedure may be performed based on the acknowledgment.

In some examples of the method, apparatuses, and non-transitory computer-readable medium described herein, the initiating frame includes the indication that the first wireless device may be requesting to perform the second beam training procedure with the second wireless device and the method, apparatuses, and non-transitory computer-readable medium may include further operations, features, means, or instructions for identifying the absence of the response frame from the second wireless device based on the initiating frame and monitoring for signals from the second wireless device as part of the second beam training procedure based on the absence of the response frame.

Some examples of the method, apparatuses, and non-transitory computer-readable medium described herein may further include operations, features, means, or instructions for receiving, via the response frame, an indication that the second wireless device may be requesting to perform the second beam training procedure with the first wireless device, where the second beam training procedure may be performed based on receiving the response frame.

Some examples of the method, apparatuses, and non-transitory computer-readable medium described herein may further include operations, features, means, or instructions for identifying that a quantity of failed frame exchanges between the first wireless device and the second wireless device satisfies a threshold quantity based on transmitting the initiating frame, where the second beam training procedure may be performed based on the identifying.

Some examples of the method, apparatuses, and non-transitory computer-readable medium described herein may further include operations, features, means, or instructions for receiving the response frame based on the initiating frame being transmitted and transmitting, to the second wireless device, an acknowledgment frame based on the response frame, where the second beam training procedure may be performed based on the acknowledgment frame.

In some examples of the method, apparatuses, and non-transitory computer-readable medium described herein, the initiating frame includes a quality of service null frame including a control field, the control field including a BSR, the indication as to whether the first wireless device may be requesting to perform the second beam training procedure, or both.

In some examples of the method, apparatuses, and non-transitory computer-readable medium described herein, the first wireless device includes a station (STA), a first multi-link device, or both, the second wireless device includes an access point (AP), a second multi-link device, or both, the first wireless device includes the AP and, and the second wireless device includes the STA.

A method for wireless communications at a first wireless device is described. The method may include monitoring for an initiating frame from a second wireless device during a SP, where the initiating frame is monitored performed using a receive beam based on a first beam training procedure performed between the first wireless device and the second wireless device prior to the SP, performing a second beam training procedure during the SP based on an absence of the initiating frame, based on the initiating frame being received and including an indication that the second wireless device is requesting to perform a second beam training procedure with the first wireless device, or based on identification of a change in a wireless channel during a previous beam training interval or previous SP, and communicating one or more messages with the second wireless device using one or more beams based on the second beam training procedure.

An apparatus for wireless communications at a first wireless device is described. The apparatus may include a processor, memory coupled with the processor, and instructions stored in the memory. The instructions may be executable by the processor to cause the apparatus to monitor for an initiating frame from a second wireless device during a SP, where the initiating frame is monitored performed using a receive beam based on a first beam training procedure performed between the first wireless device and the second wireless device prior to the SP, perform a second beam training procedure during the SP based on an absence of the initiating frame, based on the initiating frame being received and including an indication that the second wireless device is requesting to perform a second beam training procedure with the first wireless device, or based on identification of a change in a wireless channel during a previous beam training interval or previous SP, and communicate one or more messages with the second wireless device using one or more beams based on the second beam training procedure.

Another apparatus for wireless communications at a first wireless device is described. The apparatus may include means for monitoring for an initiating frame from a second wireless device during a SP, where the initiating frame is monitored performed using a receive beam based on a first beam training procedure performed between the first wireless device and the second wireless device prior to the SP, means for performing a second beam training procedure during the SP based on an absence of the initiating frame, based on the initiating frame being received and including an indication that the second wireless device is requesting to perform a second beam training procedure with the first wireless device, or based on identification of a change in a wireless channel during a previous beam training interval or previous SP, and means for communicating one or more messages with the second wireless device using one or more beams based on the second beam training procedure.

A non-transitory computer-readable medium storing code for wireless communications at a first wireless device is described. The code may include instructions executable by a processor to monitor for an initiating frame from a second wireless device during a SP, where the initiating frame is monitored performed using a receive beam based on a first beam training procedure performed between the first wireless device and the second wireless device prior to the SP, perform a second beam training procedure during the SP based on an absence of the initiating frame, based on the initiating frame being received and including an indication that the second wireless device is requesting to perform a second beam training procedure with the first wireless device, or based on identification of a change in a wireless channel during a previous beam training interval or previous SP, and communicate one or more messages with the second wireless device using one or more beams based on the second beam training procedure.

Some examples of the method, apparatuses, and non-transitory computer-readable medium described herein may further include operations, features, means, or instructions for receiving the initiating frame and transmitting a response frame to the second wireless device based on the initiating frame, where the second beam training procedure may be performed based on the response frame being transmitted.

Some examples of the method, apparatuses, and non-transitory computer-readable medium described herein may further include operations, features, means, or instructions for identifying an absence of the initiating frame from the second wireless device based on the initiating frame being monitored, where the second beam training procedure may be performed based on the absence of the initiating frame.

Some examples of the method, apparatuses, and non-transitory computer-readable medium described herein may further include operations, features, means, or instructions for communicating, with the second wireless device, control signaling indicating a set of multiple SPs associated with the first wireless device, the set of multiple SPs including the SP, where the initiating frame may be monitored for based on the control signaling.

In some examples of the method, apparatuses, and non-transitory computer-readable medium described herein, the initiating frame includes an indication as to whether the second wireless device may be requesting to perform the second beam training procedure with the first wireless device during the SP.

Some examples of the method, apparatuses, and non-transitory computer-readable medium described herein may further include operations, features, means, or instructions for receiving, via the initiating frame and based on the monitoring, a BSR associated with traffic to be communicated from the second wireless device to the first wireless device and receiving the traffic from the second wireless device using the one or more beams and based on the BSR.

Some examples of the method, apparatuses, and non-transitory computer-readable medium described herein may further include operations, features, means, or instructions for transmitting, to the second wireless device, a trigger frame scheduling the traffic based on the BSR, where the traffic may be received based on the trigger frame.

Some examples of the method, apparatuses, and non-transitory computer-readable medium described herein may further include operations, features, means, or instructions for transmitting downlink traffic from the second wireless device along with the trigger frame.

In some examples of the method, apparatuses, and non-transitory computer-readable medium described herein, a last frame of the one or more messages indicate an end of the one or more messages, an end of the SP, or both.

In some examples of the method, apparatuses, and non-transitory computer-readable medium described herein, the one or more messages include an indication of a second SP for communications between the first wireless device and the second wireless device and the method, apparatuses, and non-transitory computer-readable medium may include further operations, features, means, or instructions for communicating one or more additional messages with the second wireless device during the second SP using the one or more beams based on the second beam training procedure.

Some examples of the method, apparatuses, and non-transitory computer-readable medium described herein may further include operations, features, means, or instructions for receiving, via the initiating frame and based on the monitoring, the indication that the second wireless device may be requesting to perform the second beam training procedure with the second wireless device and transmitting a response frame to the second wireless device based on the initiating frame, where the response frame includes an acknowledgment of the second beam training procedure, where the second beam training procedure may be performed based on the acknowledgment.

Some examples of the method, apparatuses, and non-transitory computer-readable medium described herein may further include operations, features, means, or instructions for transmitting a response frame based at last in part on receiving the initiating frame, where the response frame includes an indication that the first wireless device may be requesting to perform the second beam training procedure with the second wireless device, where the second beam training procedure may be performed based on the response frame being transmitted.

Some examples of the method, apparatuses, and non-transitory computer-readable medium described herein may further include operations, features, means, or instructions for identifying that a quantity of failed frame exchanges between the first wireless device and the second wireless device satisfies a threshold quantity based on the monitoring, where the second beam training procedure may be performed based on the identifying.

Some examples of the method, apparatuses, and non-transitory computer-readable medium described herein may further include operations, features, means, or instructions for transmitting a response frame based on the initiating frame being received and receiving, from the second wireless device, an acknowledgment frame based on transmitting the response frame, where the second beam training procedure may be performed based on the acknowledgment frame.

In some examples of the method, apparatuses, and non-transitory computer-readable medium described herein, the initiating frame includes a quality of service null frame including a control field, the control field including a buffer status report, the indication as to whether the first wireless device may be requesting to perform the second beam training procedure, or both.

In some examples of the method, apparatuses, and non-transitory computer-readable medium described herein, the first wireless device includes an STA, a first multi-link device, or both, the second wireless device includes an AP, a second multi-link device, or both, the first wireless device includes the AP and, and the second wireless device includes the STA.

A method for wireless communications at a first wireless device is described. The method may include monitoring for signals from a second wireless device during a beacon transmit interval (BTI), the signals associated with a first beam training procedure between the first wireless device and the second wireless device, performing a second beam training procedure during a SP in response to the signals being monitored or an absence of the signals associated with the first beam training procedure, and communicating one or more messages with the second wireless device using one or more beams based on the second beam training procedure.

An apparatus for wireless communications at a first wireless device is described. The apparatus may include a processor, memory coupled with the processor, and instructions stored in the memory. The instructions may be executable by the processor to cause the apparatus to monitor for signals from a second wireless device during a BTI, the signals associated with a first beam training procedure between the first wireless device and the second wireless device, perform a second beam training procedure during a SP in response to the signals being monitored or an absence of the signals associated with the first beam training procedure, and communicate one or more messages with the second wireless device using one or more beams based on the second beam training procedure.

Another apparatus for wireless communications at a first wireless device is described. The apparatus may include means for monitoring for signals from a second wireless device during a BTI, the signals associated with a first beam training procedure between the first wireless device and the second wireless device, means for performing a second beam training procedure during a SP in response to the signals being monitored or an absence of the signals associated with the first beam training procedure, and means for communicating one or more messages with the second wireless device using one or more beams based on the second beam training procedure.

A non-transitory computer-readable medium storing code for wireless communications at a first wireless device is described. The code may include instructions executable by a processor to monitor for signals from a second wireless device during a BTI, the signals associated with a first beam training procedure between the first wireless device and the second wireless device, perform a second beam training procedure during a SP in response to the signals being monitored or an absence of the signals associated with the first beam training procedure, and communicate one or more messages with the second wireless device using one or more beams based on the second beam training procedure.

In some examples of the method, apparatuses, and non-transitory computer-readable medium described herein, the monitoring may include operations, features, means, or instructions for monitoring for a beacon frame in a beamformed mode.

Some examples of the method, apparatuses, and non-transitory computer-readable medium described herein may further include operations, features, means, or instructions for receiving a beacon frame from the second wireless device based on the signals being monitored, the beacon frame associated with the first beam training procedure and refraining from transmission of an initiating frame within the SP based on the beam training procedure including an initial beam training procedure between the first wireless device and the second wireless device, where the second beam training procedure may be performed based on the initiating frame being refrained from transmission.

Some examples of the method, apparatuses, and non-transitory computer-readable medium described herein may further include operations, features, means, or instructions for identifying an absence of an initiating frame communicated between the first wireless device and the second wireless device within the SP, where the second beam training procedure may be performed based on the absence of the initiating frame.

DETAILED DESCRIPTION

Figure 1:
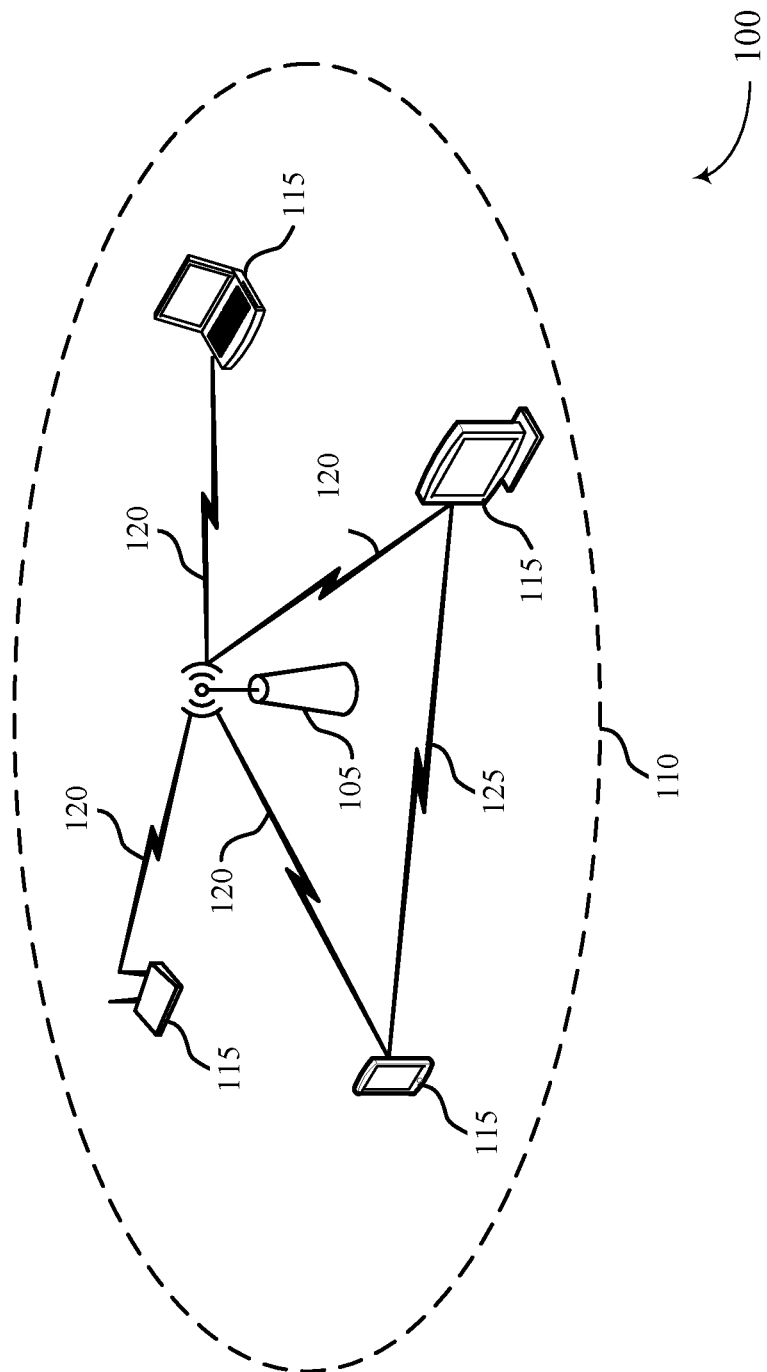
FIG. 1 illustrates an example of a wireless local area network (WLAN) that supports beam training techniques in Wi-Fi frequency bands in accordance with aspects of the present disclosure.

In some deployments, wireless devices (such as wireless fidelity (Wi-Fi) devices) may support multi-link operation (MLO) according to which the devices may communicate via multiple different links. For example, an access point (AP) multi-link device (MLD) may communicate with a non-AP MLD via a 2.4 gigahertz (GHz) link, a 5 GHz link, a 6 GHz link, or any combination thereof, which may generally be referred to as "sub-7" GHz bands. In some systems, an AP MLD and a non-AP MLD may be capable of communication via other radio frequency links, such as 45 GHz and 60 GHz links (e.g., non-sub-7 links), which may provide relatively higher data rates or greater link diversity.

Communication over such other radio frequency links may present several challenges, which may hinder adoption of such other radio frequency links (which may, in turn, limit an achievable throughput or diversity of a system). For example, the non-sub-7 bands, such as the 45 GHz and the 60 GHz bands, may be relatively more susceptible to propagation losses as compared to sub-7 bands. As such, beam refinement procedures may be utilized in sub-7 bands and in the 60 GHz band to identify beams within the respective bands that exhibit sufficient performance and are less susceptible to propagation loss. However, beam training procedures may not always be required for different bands, such as the 60 GHz band. As such, performance of beam training procedures, when not required for sufficient performance, may result in wasted communications resources, increased power consumption, and delayed communications within the band.

Accordingly, aspects of the present disclosure are directed to techniques that enable wireless devices (e.g., AP MLD, non-AP MLD) to perform beam training procedures within a service period (SP) used for communications between the respective devices. Wireless devices may perform beam training procedures to identity a transmission beam, a receive beam, or both, for communicating in a beamformed mode, which may include using beamforming for receiving or transmitting signals via a beam. For example, a first wireless device (e.g., AP, STA) may transmit an initiating frame within an SP using a transmit (Tx) beam determined based on a previous beam-training procedure. In some cases, the first wireless device may determine whether to perform the second beam training procedure within the SP based on a response message received from the second wireless device, based on an absence of the response message, based on channel conditions between the first wireless device and the second wireless device, or any combination thereof. Subsequently, the first and second wireless device may communicate messages (e.g., Tx, Rx messages) with one another within the SP using one or more beams determined based on the second beam training procedure. Accordingly, the wireless devices may perform beam training procedures within SPs to enable more efficient and reliable wireless communications between the respective devices.

Particular implementations of the subject matter described in this disclosure can be implemented to realize one or more of the following potential advantages. For example, by exchanging initiating frames and/or response frames within a SP, wireless devices (e.g., AP MLD, non-AP MLD) may be able to determine whether or not the wireless devices are expected to perform a new beam training procedure within the SP. As such, techniques described herein may enable the wireless devices to perform beam training procedures within SPs to enable more efficient and reliable wireless communications between the respective devices.

Aspects of the disclosure are initially described in the context of a wireless communications system. Additional aspects of the disclosure are described in the context of example beam training procedures, example flow diagrams, and an example process flow. Aspects of the disclosure are further illustrated by and described with reference to apparatus diagrams, system diagrams, and flowcharts that relate to beam training techniques in Wi-Fi frequency bands.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a BSS or an ESS. The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

In some implementations, the WLAN 100 may support MLO according to which two or more devices may communicate via two or more wireless links, such as two or more radio frequency links. MLO may refer or apply to pre-association or post-association operation. In such implementations, the WLAN 100 may include one or more MLDs that are capable of communicating (such as transmitting or receiving) via multiple links. In some aspects, one or more STAs 115 may be associated or affiliated with a first MLD, such as a non-AP MLD 130, and one or more APs 105 may be associated or affiliated with a second MLD, such as an AP MLD 135. The one or more STAs 115 or APs 105 affiliated with an MLD may be associated with multiple functionalities of the MLD.

For example, an MLD may be a device that is capable of communicating via multiple radio frequency links and operation or functionality of the MLD at each of the multiple radio frequency links may be described as being performed by a respective STA 115 (in examples in which the MLD is a non-AP MLD 130, such that each STA 115 affiliated with a non-AP MLD 130 is a non-AP STA 115) or a respective AP 105 (in examples in which the MLD is an AP MLD 135, such that each STA 115 affiliated with an AP MLD 135 is or functions as an AP 105). As such, a non-AP MLD 130 may communicate (such as transmit or receive) via a first radio frequency link using a first STA 115 and may communicate (such as transmit or receive) via a second radio frequency link using a second STA 115. Similarly, an AP MLD 135 may communicate (such as transmit or receive) via a first radio frequency link using a first AP 105 and may communicate (such as transmit or receive) via a second radio frequency link using a second AP 105. For example, a non-AP MLD 130 may effectively communicate with an AP MLD 135 via a wireless link 120-a using a first STA-AP pair and via a wireless link 120-b using a second STA-AP pair.

A non-AP MLD 130 and an AP MLD 135 may communicate via various radio frequency links, including a 2.4 GHz link, a 5 GHz link, and a 6 GHz link, which may generally be referred to as "sub-7 GHz links." In some systems, the 2.4 GHz link, the 5 GHz link, and the 6 GHz link may be relatively easy to access. For example, a non-AP MLD 130 and an AP MLD 135 may access or communicate using (such as transmit or receive via) any one or more of the 2.4 GHz link, the 5 GHz link, and the 6 GHz link without negotiating access on a different link, without an access constraint (such as an access constraint associated with a service type), or without applying techniques associated with mitigating propagation path loss (such as focusing transmission and reception in a specific direction via beamforming). Some other radio frequency links, however, may be associated with an access constraint or difficulty and, in some implementations, a non-AP MLD 130 and an AP MLD 135 may use any one or more of the 2.4 GHz link, the 5 GHz link, and the 6 GHz link to support and facilitate communications via such other radio frequency links.

In some aspects, the WLAN 100 may support techniques that enable wireless devices (e.g., AP MLD 135, non-AP MLD 130) to perform beam training procedures within an SP used for communications between the respective devices. For example, a first wireless device (e.g., AP MLD 135, non-AP MLD 130) may transmit an initiating frame within an SP using a Tx beam determined based on a previous beam-training procedure. The initiating frame may indicate whether or not the first wireless device is requesting to perform a second beam training procedure within the SP. In some cases, the first wireless device may determine whether to perform the second beam training procedure within the SP based on a response message received from the second wireless device, based on an absence of the response message, based on channel conditions between the first wireless device and the second wireless device, or any combination thereof. Subsequently, the first and second wireless device may communicate messages (e.g., Tx, Rx messages) with one another within the SP using one or more beams determined based on the second beam training procedure.

In some implementations, a relative quality of communications performed over a 60 GHz link may be used to determine whether a beam training procedure should be performed, or how precise (and therefore power intensive) of a beam training procedure should be performed. In other cases, information determined from other links, such as sub-7 GHz links, may be used to facilitate beam training procedures on the 60 GHz link. For example, position information and/or beam information determined using a sub-7 link may be used to determine whether (or what level of precision) of beam training procedures should be performed on the 60 GHz link.

In some aspects, the first radio frequency link (such as any one or more of the 2.4 GHz link, the 5 GHz link, or the 6 GHz link) may be referred to as a sub-7 GHz link, where a sub-7 GHz link may generally refer to any radio frequency link, or any collection of two or more radio frequency links, at or below 7 GHz. Further, as described herein, the second radio frequency link may refer to any radio frequency link associated with an access constraint or difficulty. Thus, the implementations described herein may be applicable to any radio frequency band or link that has constraints or rules in terms of which devices may obtain access, when devices may obtain access, or how far (in terms of a reachability distance) messaging can be transmitted via that radio frequency band or link.

Further, the devices of the WLAN 100 may support various possible configurations associated with operation at one or more radio frequencies (such as possible configurations for 45 GHz or 60 GHz operation). For example, depending on a radio configuration, a device (such as an AP 105, a STA 115, a non-AP MLD 130, or an AP MLD 135) may operate in accordance with a single link, single radio (SLSR) configuration according to which a single radio device may operate using one radio frequency (e.g., 60 GHz link), a multi-link, single radio (MLSR) configuration according to which a device may operate using one radio frequency band at a time (but may operate using both sub-7 GHz and 45 GHz or 60 GHz), or a multi-link, multi-radio (MLMR) configuration according to which a device may operate on more than one band simultaneously (with at least one radio operating using a sub-7 GHz band). In accordance with the implementations described herein, an MLD may support an MLSR or an MLMR configuration. As such, the described techniques may apply for devices that can communicate via multiple links simultaneously or devices that can communicate via different links at different times.

Further, although described herein as a non-AP MLD 130, a non-AP MLD 130 may function as a soft AP device (which may be referred to as a soft AP device). In such examples in which the non-AP MLD 130 functions as a soft AP device, the non-AP MLD 130 may perform the same or similar functions (such as transmit or receive the same or similar signaling) as the AP MLD 135 to one or more other STAs 115 or to one or more other non-AP MLDs 130. If operating as a soft AP device, which may be a device that operates using a battery or an otherwise limited power supply (or in a power save mode), the non-AP MLD 130 may use a same set of radio frequency chains for soft AP device operation as used for operation as a non-AP MLD 130. Further, although referred to herein as a soft AP device, such a device may be any client device (such as any battery powered client device) that functions as an AP MLD 135.

Figure 2:
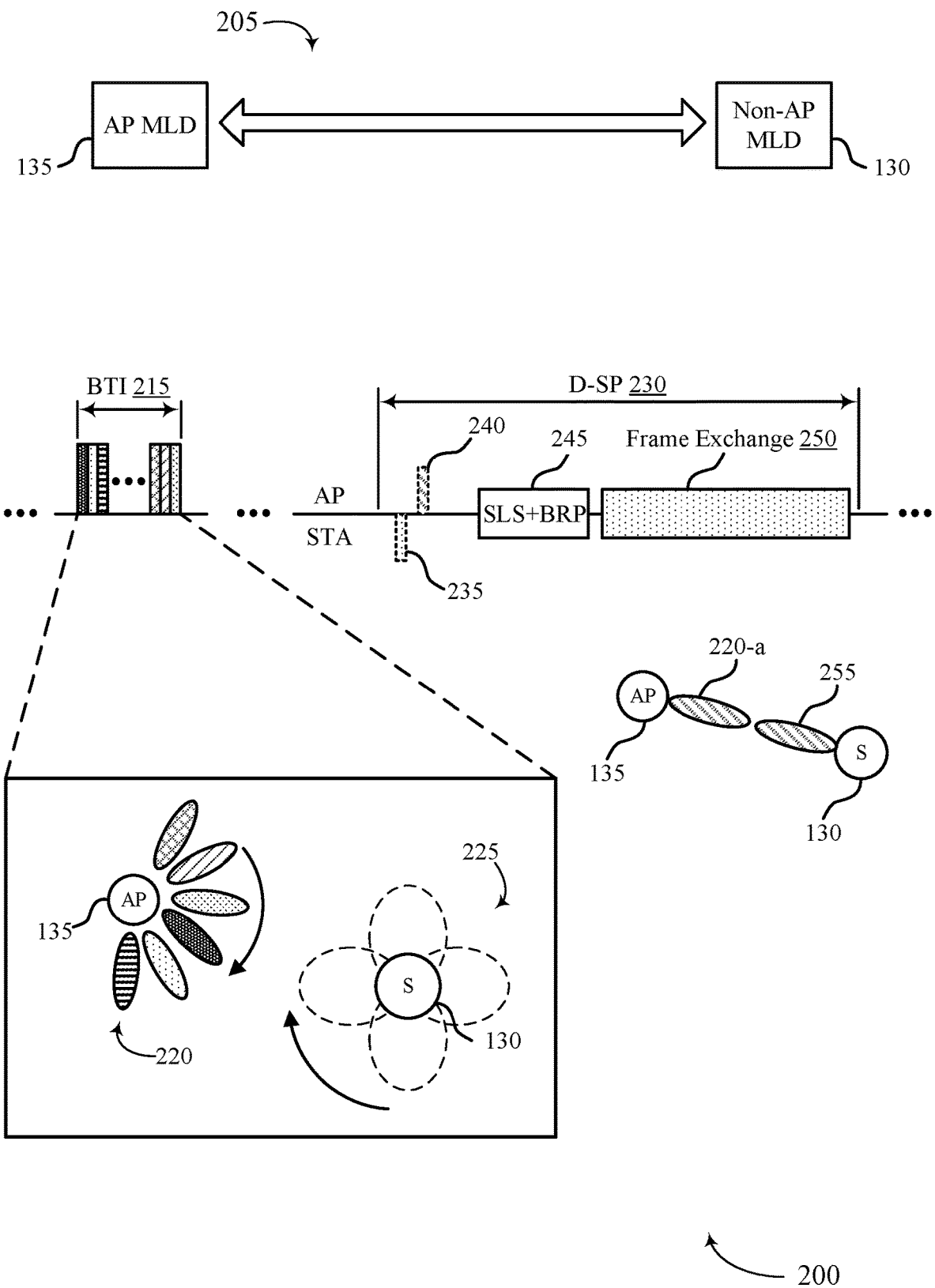
FIG. 2 illustrates an example of a wireless communications system that supports beam training techniques in Wi-Fi frequency bands in accordance with one or more aspects of the present disclosure.

FIG. 2 illustrates an example of a wireless communications system 200 that supports beam training techniques in Wi-Fi frequency bands in accordance with one or more aspects of the present disclosure. Aspects of the wireless communications system 200 may implement, or be implemented by, aspects of the WLAN 100. For example, the wireless communications system 200 illustrates communication between a non-AP MLD 130 and an AP MLD 135, which may be examples of the non-AP MLD 130 and the AP MLD 135, respectively, as illustrated by and described with reference to FIG. 1.

In some implementations, the non-AP MLD 130 and the AP MLD 135 may communicate via a communication link 205. In some implementations, the communication link 205 may include one or more different links. For example, in some implementations, the communication link 205 may include a first radio frequency link (e.g., a sub-7 link such as any one or more of a 2.4 GHz link, a 5 GHz link, or a 6 GHz link) and a second radio frequency link (e.g., a non-sub-7 link such as a 45 GHz link, or a 60 GHz link). In this example, the first radio frequency link (e.g., sub-7 link) may support communications performed via the second radio frequency link (e.g., non-sub-7 link). In other words, the first radio frequency link may serve as an anchor or stable link that is used to facilitate communications via the second radio frequency link.

Moreover, in some aspects, a 60 GHz link may be part of an MLO setup involving sub7 link(s). In other words, the AP operating on 60 GHz may be affiliated with the AP MLD 135 that has at least one other AP operating on a sub-7 link. In some implementations, aspects of the present disclosure are directed to utilizing sub-7 links as anchor links to facilitate operations on 60 GHz links, and to reduce management frame overhead. In other words, as will be described in further detail herein, aspects of the present disclosure are directed to utilizing the MLO framework to facilitate operations on a non-sub-7 link, such as a 45 GHz or 60 GHz link.

In some wireless communications systems, wireless communications within a 60 MHz band may be performed within repeating beacon intervals (BIs). Each BI may be divided into three parts: (1) a beacon transmit interval (BTI) (e.g., BTI 215), (2) dedicated SPs (D-SP) (e.g., D-SP 230) and opportunistic SPs (O-SPs). During the BTI 215, an AP 105, an AP MLD 135, or a personal basic service set control point (PCP) may transmit multiple directional beacons (e.g., beacon frames). During the A-BFT, one or more STAs 115 or non-AP MLDs 130 may perform beam training for communication with an AP 105, AP MLD 135, or PCP.

Some radio frequency bands (such as a 45 GHz or 60 GHz band) may provide a large amount of communication resources (such as a large swath of spectrum) that communicating devices (such as Wi-Fi devices) may use. Operation on relatively higher radio frequency bands (such as 45 GHz or 60 GHz bands) may present several challenges at a device or system level, which may lead to a lack of widespread adoption of the 45 GHz or 60 GHz band for data communications.

For example, transmissions within 45 GHz or 60 GHz bands may suffer from high propagation loss (e.g., high attenuation). As such, omnidirectional transmissions (e.g., non-beamformed transmissions) will not travel far. As a result, wireless devices may be required to perform directional transmissions to take advantage of beamforming antenna gains to form a narrow beam towards the intended peer device. Stated differently, wireless devices communicating within non-sub-7 bands may be required to focus transmissions and receptions to narrow beams in order for the transmissions to reach the intended receivers.

Beam training procedures may be performed to identify narrow beams used to perform beamforming communications in a beamformed mode. During a beam training procedure, transmission/reception planes at a transmitting/receiving devices may be divided up into several sectors, where the wireless devices are configured to identify narrow Tx/Rx beams within a sector that will be used for beamformed communications. Some beam training procedures (e.g., beam training procedures defined by 802.11ad/ay) may include two steps or phases: (1) a sector-level sweep (SLS) phase (e.g., sector-level training procedure), and (2) a beam refinement phase (BRP) (e.g., beam refinement procedure).

While the terms "SLS" and "BRP" (and like terms) are the terms used and defined in 802.11ad/ay, it is noted herein that different terminology may be used to refer to the different steps of a beam training procedure. In particular, future generations of Wi-Fi may adopt different words or phrases that are used to refer to the respective steps of a beam training procedure. Moreover, future generations of Wi-Fi may include additional or alternative steps/phases of a beam training procedure. However, aspects of the present disclosure, which enable wireless devices to skip beam training procedures or perform less-intensive beam training procedures, may be implemented for both the current beam training framework, as well as future beam training framework with additional and/or alternative steps/phases.

During an SLS phase of a beam training procedure, each device may take turns to transmit a frame on each of its sectors while the other device listens in quasi-omni state. The SLS phase may help establish an initial coarse-grain antenna sector configuration, which may be further refined during a subsequent BRP phase. For example, during the SLS phase, the AP MLD 135 may perform a sector sweep of (short) beacon frames during the BTI 215, as shown in FIG. 2. In particular, during the SLS phase, the AP-MLD 135 may sweep across sectors/beams 220 while the non-AP MLD 130 listens using beams 225 (e.g., quasi-omnidirectional beams 2250, such as wide beams 225) to determine a general direction of the AP-MLD 135, and identify wide beams 225 that may be used to communicate with the AP-MLD 135 (e.g., identify a sector corresponding to the AM-MLD 135). In other words, during SLS, the AP MLD 135 may take turns transmitting a short frame on each sector (e.g., each beam 220), while the non-AP MLD 130 other side listens in a quasi-omnidirectional or omnidirectional mode to help establish a general direction of where the peer wireless device is located, and to use the received beacons/frames to evaluate whether additional beam training is needed or not.

Comparatively, during the BRP (e.g., beam refinement procedure) of the beam training procedure, the respective devices may exchange frames to fine-tune beams that were determined during SLS. As such, the BRP phase may be run after the SLS phase, or may be run without SLS in cases where only small adjustments to beams are needed. In some cases, BRP may be combined with a data frame (e.g., training sequence follows data). For example, during a BRP phase, the wireless devices sweep across narrow beams (e.g., beams that are narrower than the wide beams 225 used in SLS) within the sector/wide beam 225 found during the SLS phase, and identify narrow beams within the identified sector/wide beam 225 that will be used to communicate with the peer device. In other words, the BRP may follow the SLS to further refine the beam information that will be used for wireless communications. Additionally, or alternatively, BRP may be run independently (e.g., without) the SLS to establish a narrow beam directed towards a peer device.

In this regard, depending on the degree of misalignment between beams at the AP-MLD 135 and the non-AP MLD 130, the devices may be configured to perform a full beam training procedure including SLS and BRP, or may be configured to perform a truncated or abbreviated beam training procedure including only BRP (e.g., no SLS).

In some cases, the AP-MLD 135 and the non-AP MLD 130 may negotiate with one another to determine a configuration of one or more D-SPs 230 that may be used for communications between the respective devices. In some cases, D-SPs 230 may be configured for communications between the respective devices such that the D-SPs 230 do not overlap with one another in the time domain. Moreover, in cases where the AP-MLD 135 is communicatively coupled to multiple clients (e.g., multiple non-AP MLDs 130, multiple STAs), each respective non-AP MLD 130 may be configured with a separate set of D-SPs 230 (e.g., each set of D-SPs 230 are dedicated to a single non-AP MLD 130). Moreover, in some cases, the AP-MLD 130 may activate or assign one or more O-SPs (within a BI) to a client to perform additional communications (e.g., flush pending buffer units) if the D-SP 230 was not sufficient to perform all buffered traffic that is to be exchanged between the respective devices.

As noted previously herein, communications over some radio frequency links may present several challenges, which may hinder adoption of such other radio frequency links (which may, in turn, limit an achievable throughput or diversity of a system). For example, the non-sub-7 bands, such as the 45 GHz and the 60 GHz bands, may be relatively more susceptible to propagation losses as compared to sub-7 bands. As such, beam refinement procedures may be utilized in sub-7 bands and in the 60 GHz band to identify beams within the respective bands that exhibit sufficient performance and are less susceptible to propagation loss. However, beam training procedures may not always be required for different bands, such as the 60 GHz band. As such, performance of beam training procedures, when not required for sufficient performance, may result in wasted communications resources, increased power consumption, and delayed communications within the band. However, beam training procedures may not always be required for different bands, such as the 60 GHz band. As such, performance of beam training procedures, when not required for sufficient performance, may result in wasted communications resources, increased power consumption, and delayed communications within the band.

Accordingly, aspects of the present disclosure are directed to techniques that enable wireless devices (e.g., AP MLD 135, non-AP MLD 130) to perform beam training procedures within a SP (e.g., D-SP 230) used for communications between the respective devices.

For example, as shown in FIG. 2, the AP MLD 135 may transmit a short (beacon) frame in each of its sectors (e.g., transmit a beacon frame using each beam 220) during the dedicated BTI 215 period. The beacon fame(s) transmitting during the BTI 215 may include any short frame carrying an identifier associated with the AP MLD 135 (e.g., BSSID associated with the AP MLD 135) and an identifier associated with the corresponding sector/beam 220 used to transmit the respective beacon fame (e.g., transmit sector ID). During the BTI 215, the non-AP MLD 130 monitor or listens for the beacon frames in a quasi-omnidirectional mode (e.g., using wide beams 225) to determine whether additional beam training is needed/expected or not. In some cases, the non-AP MLD 130 may listen/monitor during the BTI 215 with a wide beam 225 pointed towards the most recently used sector associated with the AP MLD 135.

If a beacon frame is received at the non-AP MLD 130 during the BTI 215 with a receive signal strength indicator (RSSI), an reference signal received power (RSRP), or other measurement above a certain threshold, then additional beam training may not be needed or expected (e.g., the beams at the respective devices are sufficiently pointed/directed at one another to perform sufficiently high quality communications). Comparatively, if beacon fames are received at the non-AP MLD 130 during the BTI 215 with an RSRP or other measurement below the threshold, this may imply that the beam 225 at the non-AP MLD 130 is pointing in the general direction of the AP MLD 130, but may need some refinement (e.g., further refinement through BRP). Further, if the non-AP MLD 130 does not receive any beacon frames during the BTI 215 (e.g., identifying an absence of signaling associated with a first beam training procedure performed during the BTI 225), this may indicate that the beam 225 at the non-AP MLD 130 is focused in the wrong direction (e.g., not in the general direction of the AP MLD 130), which may indicate that full beam training is needed or expected (e.g., SLS+BRP).

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Performance of sectorized beaconing during the BTI 215 may achieve several benefits. For example, although duplicating (beacon) frames in each sector may result in signaling overhead, the AP MLD 135-side sector sweep may be performed "for free" by performing sectorized beaconing, meaning that the AP MLD 135 may not be expected to perform subsequent sectorized beaconing following the BTI 215 in some cases. Therefore, the overhead of beaconing is amortized across multiple clients/non-AP MLDs 130. In other words, the AP MLD 135 may be able to perform a single sectorized beaconing during the BTI 215 for multiple clients, and may not be expected to repeat the sweep for each respective client. In other words, multiple clients may be able to utilize the information gathered during the BTI 215 for making training decisions (e.g., during subsequent SPs, such as the D-SP 230).

In the case of a new connection between the AP MLD 135 and the non-AP MLD 130, the respective devices may not know the sector (e.g., beams 220, 225) that is to be used. Accordingly, in such cases, the non-AP MLD 130 may listen/monitor during the BTI 215 in a quasi-omnidirectional mode (e.g., using wide beams).

According to some aspects of the present disclosure, techniques described herein may enable the wireless devices (e.g., AP MLD 135, non-AP MLD 130) to perform beam training procedures within (e.g., at the start of) D-SPs 230, O-SPs, or both. In such cases, information gathered during the BTI 215 may be useful during subsequent beam training procedures within D-SPs 230 and/or O-SPs.

Continuing with reference to FIG. 2, at the start of each D-SP 230 (and/or O-SP), the non-AP MLD 130 may be configured to transmit an initiating frame 235 that provides a buffer status report (BSR) along with an indication of whether the non-AP MLD 130 expects to perform refinement training during the D-SP 230 (e.g., indication as to whether a full or truncated/shortened beam training procedure is to be performed). The initiating frame 235 transmitted by the non-AP MLD 130 may include a quality of service (QoS) null frame with a control field carrying the BSR and a "BRP required" indication. If the initiating frame 235 is correctly received by the AP MLD 135, the AP MLD 135 may be configured to transmit a response frame 240 within a short interframe space (SIFS) of the D-SP 230. In some cases, the response frame 240 may additionally or alternatively indicate whether the AP MLD 135 expects to perform a beam training procedure during the D-SP 230. The response frame 240 from the AP MLD 135 may include an ACK frame or a blockAck frame with a field (e.g., bit) used to indicate if the AP MLD 135 is requesting BRP during the D-SP 230 (and/or a subsequent SP).

In this regard, at the start of each D-SP 230, the AP MLD 135, the non-AP MLD 130, or both, may be able to explicitly request/trigger a beam training procedure within the D-SP 230 (e.g., via the initiating frame 235 and/or the response frame 240). Moreover, the absence of a request/trigger for a beam training procedure may serve as an implicit indication that the respective device is not requesting a beam training procedure during the D-SP 230.

Based on the contents of the initiating frame 235 and the response frame 240 (and/or the failure of either frame being received by the respective device), the AP MLD 135 and the non-AP MLD 130 may or may not perform a beam training procedure during a time interval 245 of the D-SP 230. In particular, if a condition for performing beam training is satisfied, the AP MLD 135 may initiate a beam training procedure (e.g., BRP) by transmitting an appropriate training frame within the SIFS after the response frame 240. For example, the devices may be configured to perform a beam training procedure (e.g., SLS+BRP, or just BRP) during the time interval 245 if the initiating frame 235, the response frame 240, or both, include an indication of a request/trigger to perform a beam training procedure (e.g., perform beam training if BRP required=true in the initiating frame 235 and/or the response frame 240).

By way of another example, in cases where either of the initiating frame 235 and/or the response frame 240 are not successfully received by the respective device, this may serve as an implicit indication that the devices are expected to perform a beam training procedure during the D-SP 230. For instance, if the initiating frame 235 from the non-AP MLD 130 is not successfully received by the AP MLD 130 at the start of the D-SP 230 (or other SP) after a short timeout duration, the AP MLD 130 may enter an SLS initiator mode after some time period (e.g., after {duration of initiating frame—timeout duration>SIFS+<duration of response>+ SIFS} time). In other words, if the AP MLD 130 does not successfully receive the initiating frame 235, the AP MLD 135 may expect to perform a beam training procedure with SLS and BRP during the time interval 245.

Similarly, if the non-AP MLD 130 does not successfully receive the response frame 240 from the AP MLD 135 during SIFS after transmitting the initiating frame 235, the non-AP MLD 130 may enter an SLS responder mode after some time period (e.g., after {<duration of response>+SIFS} time). In other words, if the non-AP MLD 130 does not successfully receive the response frame 240, the non-AP MLD 130 may expect to perform a beam training procedure with SLS and BRP during the time interval 245. If the response frame 240 is lost or otherwise not successfully received, the non-AP MLD 130 may enter the SLS responder mode while the AP MLD 135 may continue to operate in a different mode, such as BRP, TF, DL. However, the AP MLD 135 may not receive a frame responsive to the response frame 240 or other communication, and may therefore fall back to the SLS initiator mode to perform a beam training procedure (e.g., SLS+BRP) during the time interval 245.

In cases where the devices exhibit beam alignment after the BTI 215 (e.g., devices have determined aligned beams 220-a and 255), the respective devices may be configured to communicate with one another during a frame exchange 250 period of the D-SP 230 using the determined beams 220-a, 255. Similarly, in cases where the devices perform a beam training procedure during the time interval 245, the devices may be configured to identify the beams 220-a, 255 that will be used for communications during the frame exchange 250.

In some aspects, if the BSR in the initiating frame 235 is nonzero (meaning that the non-AP MLD 130 has traffic to communicate), the AP MLD 135 may transmit a trigger frame to solicit the data/traffic (e.g., uplink data) from the non-AP MLD 130. In some cases, the trigger frame may be aggregated with downlink traffic transmitted by the AP MLD 135 if the AP MLD 135 has pending buffer units to communicate to the non-AP MLD 130. Similarly, if the AP MLD 135 has pending buffer units (e.g., traffic, data) to communicate to the non-AP MLD 130, the AP MLD 135 may initiate downlink messages to communicate the buffer units during the frame exchange 250.

In some aspects, the AP MLD 135 may indicate a last frame of a message to be communicated during the frame exchange 250, a last symbol or frame of the D-SP 230, or both. By indicating the last frame of traffic to be communicated and/or the last frame/symbol of the D-SP 230, the non-AP MLD 130 may be able to enter a lower power operational state (e.g., doze state) for the remainder of the D-SP 230 to reduce power consumption. For example, a last frame of a downlink message transmitted by the AP MLD 130 during the frame exchange 250 may indicate the end of the D-SP 230 (e.g., indicate MORE=0 or EOSP=1). By way of another example, the AP MLD 135 may transmit a QoS null frame indicating the last frame of traffic and/or an end of the D-SP (e.g., QoS null frame indicating MORE=0 or EOSP=1).

In some implementations, techniques shown and described in FIG. 2 may enable the wireless devices to perform beam training within the D-SP 230 in cases where the non-AP MLD 130 is a new client for the AP MLD 130, in which cases the devices may not have previously performed a beam training procedure. For example, upon establishing a new connection with the non-AP MLD 130, the AP MLD 135 may transmit beacons within each sector during the BTI 215, where the non-AP MLD 130 monitors in SLS responder mode (e.g., quasi-omnidirectional state) to identify the best Tx-sector at the AP MLD 135. In this example, the non-AP MLD 130 may refrain from transmitting an initiating frame 235 at the start of the D-SP 230, resulting in an initiating frame timeout. Similarly, the AP MLD 135 may not receive an initiating frame 235, and may therefore refrain from transmitting the response frame 240. In this example, the AP MLD 135 and the non-AP MLD 130 may perform a full beam training procedure (e.g., SLS+BRP) SIFS after the expected response frame 240 in order to determine the beams 220-a, 225 that will be used during the frame exchange 250 (and/or subsequent SPs).

In some implementations, a client device (e.g., non-AP MLD 130) may configure itself to operate in a (quasi) omnidirectional mode to receive the beacon frames during the BTI 215. In such cases, the non-AP MLD 130 may be configured to identify transmit sector ID(s) associated with the AP MLD 135 where the non-AP MLD 130 is able to receive beacon frame(s). In the (quasi) omnidirectional mode, it is possible for the non-AP MLD 130 to receive more than one beacon frame during the BTI 215. Moreover, the non-AP MLD 130 may be configured to compare RSSI(s) associated with received beacon frames to RSSI(s) (or other measurements) associated with beacon frames received during previous BTIs 215. In this regard, the non-AP MLD 130 may be able to identify changes in channel conditions from one BTI 215 to another to determine whether new beam training is expected or required. In other words, by comparing the RSSIs and sector IDs associated with beam frames received during each BTI 215, the non-AP MLD 130 (e.g., STA) may be able to determine if beam training (e.g., SLS+BRP or BRP) is needed or not. For example, if a beacon frame received in a previous BTI 215 has a higher RSSI in a different transmit sector as compared to the beacon frames received in the current BTI 215, the non-AP MLD 130 may determine that a new beam training procedure should be performed.

In some implementations, the non-AP MLD 130, the AP MLD 135, or both, may announce, indicate, and/or negotiate a retry count associated with performance of a beam training procedure. In the context of the present disclosure, the retry count may include a number/quantity of initiating/response frame exchanges that the devices will perform before falling back to training (e.g., before performing a new beam training procedure). For example, if the retry count is set to two, the respective devices may be configured to perform a new beam training procedure after two failed initiating/response frame exchanges. The time computation for fall back may be updated to account for the announced/indicated/negotiated retry count. In scenarios where a non-AP MLD 130 (e.g., STA) is unable to transmit an initiating frame due to channel conditions (such as OBSS), the non-AP MLD 130 may have until the last retry attempt to send the initiating frame.

Different example behaviors of the respective devices are further shown and described with reference to FIGS. 3-7.

While FIGS. 3-7 illustrate examples in which a non-AP MLD 130 (e.g., STA) transmits initiating frames, and receives response frames from an AP MLD 135 (e.g., AP), this is not a limitation of the present disclosure, unless noted otherwise herein. In particular, in some cases, the signaling illustrated in the initiating/response frame exchanges may be reversed, in which the AP-MLD 135 transmits an initiating frame at the start of each D-SP/O-SP, and the non-AP MLD 130 transmits a response frame (e.g., CTS) responsive to the initiating frame.

Moreover, in some cases, the respective devices may exchange a third frame (e.g., ACK frame) to confirm that the respective device successfully received the response frame (e.g., successfully received the CTS). Use of an ACK frame may be beneficial in cases where the response frame is lost or otherwise not successfully received. In such cases, if the ACK frame is not successfully received by the respective device (e.g., AP or STA), the STA (and/or the AP) may be configured to enter SLS training SIFS after the expected time of the ACK frame. Further, if either frame (e.g., initiating frame, response frame) is lost or otherwise not successfully received, both devices may be configured to enter SLS training SIFS+delta time after the expected CTS. For instance, in cases where an AP does not receive a confirmation/ACK frame in response to a response frame, the AP may enter an SLS initiator mode.

Figure 3:
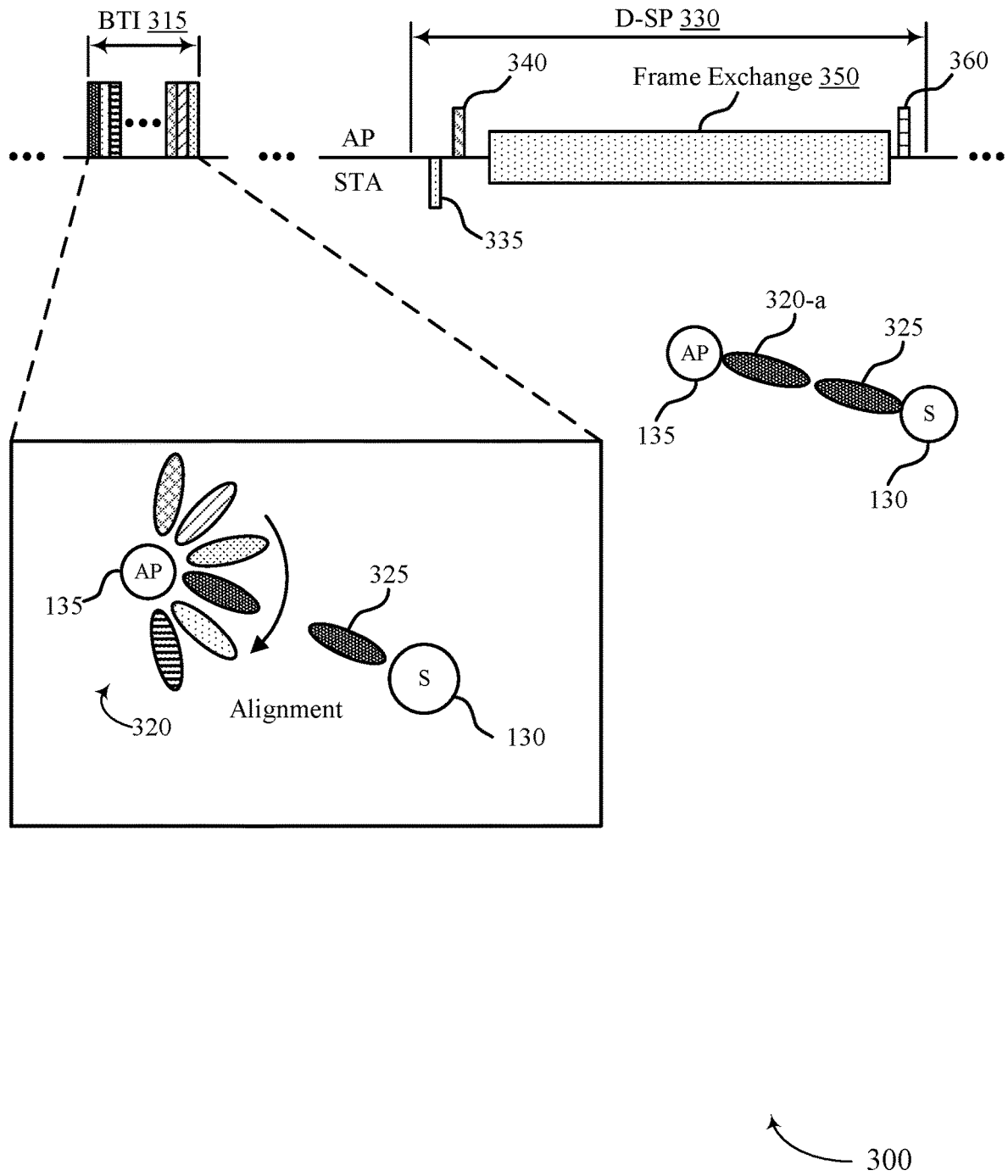
FIGS. 3 through 7 illustrate examples of beam training procedures that support beam training techniques in Wi-Fi frequency bands in accordance with one or more aspects of the present disclosure.

FIG. 3 illustrates an example of a beam training procedure 300 that supports beam training techniques in Wi-Fi frequency bands in accordance with one or more aspects of the present disclosure. Aspects of the beam training procedure 300 may implement, or be implemented by, aspects of the WLAN 100, the wireless communications system 200, or both. For example, the beam training procedure 300 illustrates communication between a non-AP MLD 130 and an AP MLD 135, which may be examples of the non-AP MLD 130 and the AP MLD 135, respectively, as illustrated by and described with reference to FIG. 1.

As noted previously herein with respect to FIG. 2, an AP MLD 130 may transmit beacon frames within each sector (e.g., using beams 320) during a BTI 315. In this example, a non-AP MLD 130 may monitor or listen for the beacon frames during the BTI 315, and receive a beacon frame with an RSRP or other measurement that satisfies (e.g., is greater than) a threshold using a beam 325. In this regard, the respective devices may determine that the beams 320-a and 325 are sufficiently well aligned during BTI 315. As such, the respective devices may not be expected to perform a beam training procedure during a D-SP 330. In this regard, the non-AP MLD 130 may transmit an initiating frame 335 towards the beginning of the D-SP 330, where the initiating frame 335 indicates that the non-AP MLD 130 is not requesting or triggering a beam training procedure during the D-SP 330 (e.g., BRP required=0). Similarly, the AP MLD 135 may transmit a response frame 340 in response to the initiating frame 335, where the response frame also indicates that the AP MLD 135 is not requesting or triggering a beam training procedure during the D-SP 330 (e.g., BRP required=0).

Accordingly, the respective devices may refrain from performing a beam training procedure during the D-SP 330, and may communicate messages with one another during the frame exchange 350 using the beams 320-a, 325 determined during the BTI 315. In some cases, where the AP-MLD 135 and/or the non-AP MLD 130 has additional data to be sent that will not be able to be communicated during the frame exchange 350 and/or D-SP 330, the respective devices may activate or trigger an additional SP (e.g., O-SP) to continue communications. For example, as shown in FIG. 3, the AP MLD 135 may transmit a frame 360 that activates, triggers, or otherwise indicates an O-SP that may be used to perform additional communications between the respective devices.

Figure 4:
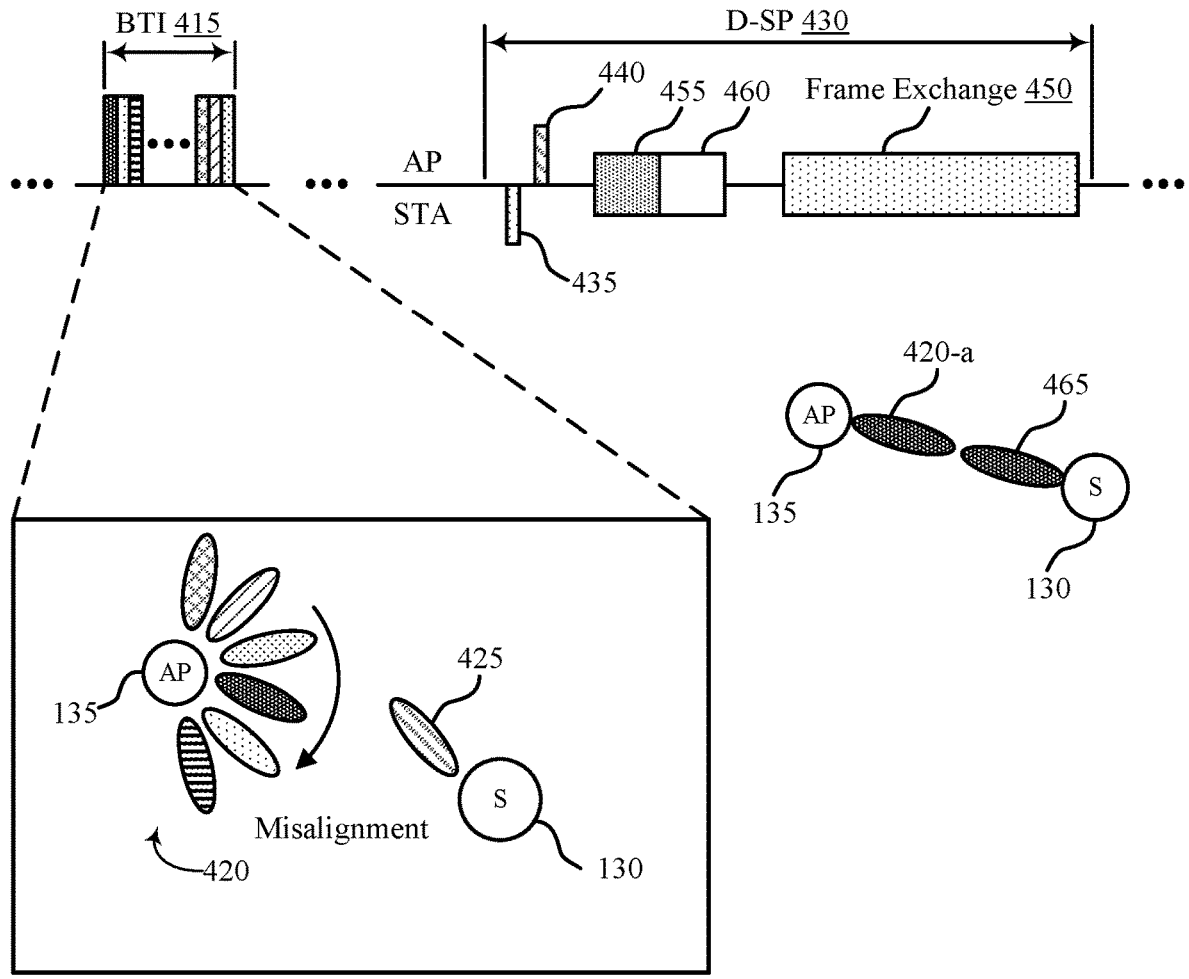

FIG. 4 illustrates an example of a beam training procedure 400 that supports beam training techniques in Wi-Fi frequency bands in accordance with one or more aspects of the present disclosure. Aspects of the beam training procedure 400 may implement, or be implemented by, aspects of the WLAN 100, the wireless communications system 200, the beam training procedure 300, or any combination thereof. For example, the beam training procedure 400 illustrates communication between a non-AP MLD 130 and an AP MLD 135, which may be examples of the non-AP MLD 130 and the AP MLD 135, respectively, as illustrated by and described with reference to FIG. 1.

As noted previously herein with respect to FIG. 2, an AP MLD 130 may transmit beacon frames within each sector (e.g., using beams 420) during a BTI 415. In this example, a non-AP MLD 130 may listen for the beacon frames during the BTI 415, and receive a beacon frame with an RSRP or other measurement that fails to satisfy (e.g., is less than) a threshold using a beam 425. In this regard, the non-AP MLD 130 may determine that the beam 425 is (slightly) misaligned with the AP MLD 130 during BTI 415, and may therefore determine that a beam training procedure may be performed during the D-SP 430.

As such, the non-AP MLD 130 may transmit an initiating frame 435 during the D-SP 430, where the initiating frame 435 indicates that the non-AP MLD 130 is requesting or triggering a beam training procedure during the D-SP 430 (e.g., BRP required=1). The AP MLD 135 may receive the initiating frame 435 and transmit a response frame 440 in response to the initiating frame 435, where the response frame 440 acknowledges the request/trigger for a beam training procedure during the D-SP 430. In this example, the respective devices may perform a beam training procedure (e.g., BRP) and/or exchange data during time intervals 460 and 455, respectively. In other words, BRP may be perform standalone (e.g., QoS null+training) or along with data (e.g., QoS data+training). By performing BRP during time interval 460, the respective devices may be configured to identify beams 420-a, 464 that are sufficiently aligned, and may subsequently perform communications with one another during frame exchange 450 using beams 420-a, 465.

Figure 5:
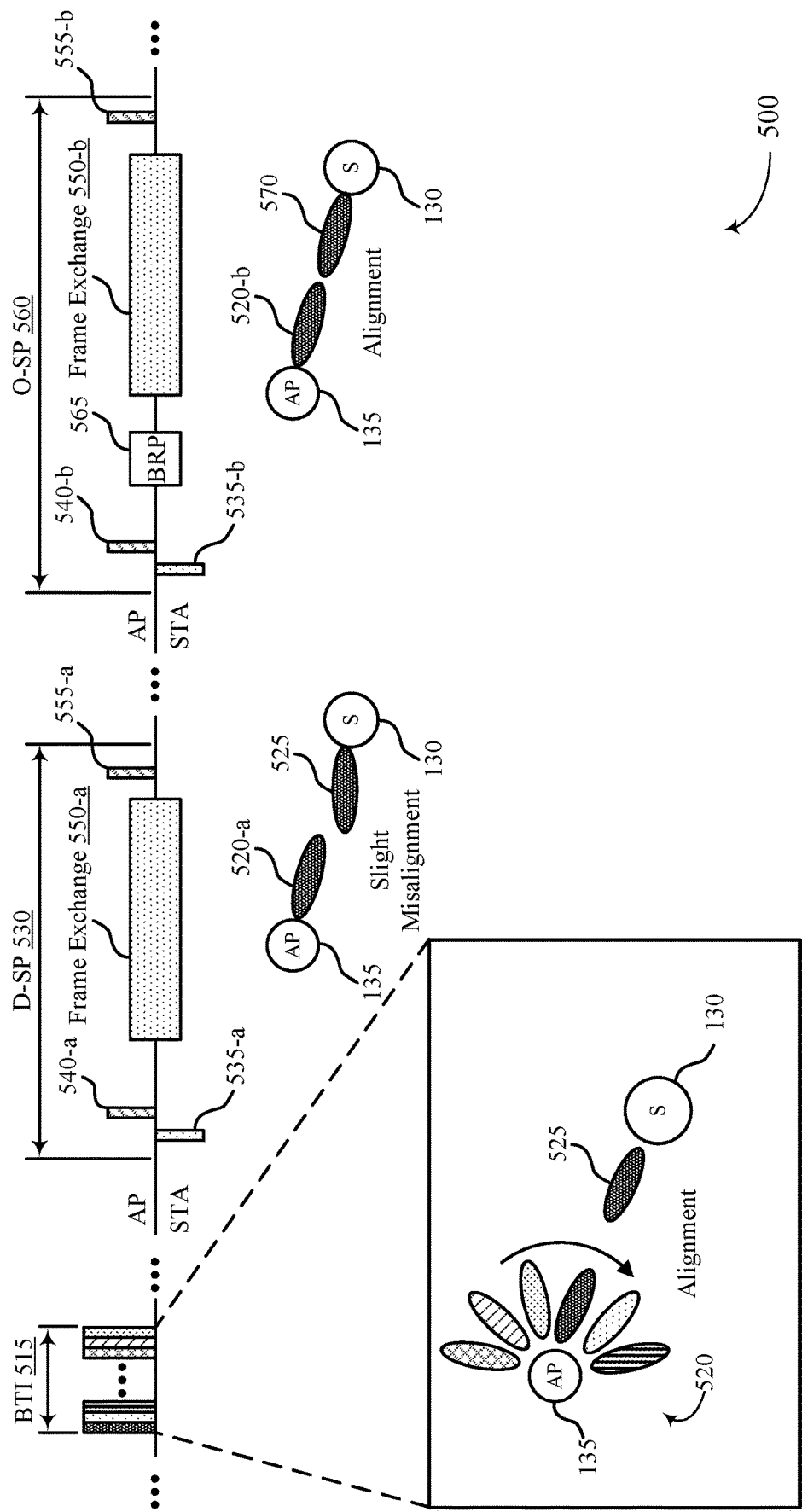

FIG. 5 illustrates an example of a beam training procedure 500 that supports beam training techniques in Wi-Fi frequency bands in accordance with one or more aspects of the present disclosure. Aspects of the beam training procedure 500 may implement, or be implemented by, aspects of the WLAN 100, the wireless communications system 200, the beam training procedures 300, 400, or any combination thereof. For example, the beam training procedure 500 illustrates communication between a non-AP MLD 130 and an AP MLD 135, which may be examples of the non-AP MLD 130 and the AP MLD 135, respectively, as illustrated by and described with reference to FIG. 1.

As noted previously herein with respect to FIG. 2, an AP MLD 135 may transmit beacon frames within each sector (e.g., using beams 520) during a BTI 515. In this example, a non-AP MLD 130 may listen for the beacon frames during the BTI 515, and receive a beacon frame with an RSRP or other measurement that satisfies (e.g., is greater than) a threshold using a beam 525. In this regard, the non-AP MLD 130 may determine that the beam 525 is aligned with the AP MLD 135. As such, the respective devices may not be expected to perform a beam training procedure during a D-SP 530. In this regard, the non-AP MLD 130 may transmit an initiating frame 535-a towards the beginning of the D-SP 530, where the initiating frame 535-a indicates that the non-AP MLD 130 is not requesting or triggering a beam training procedure during the D-SP 530 (e.g., BRP required=0). Similarly, the AP MLD 135 may transmit a response frame 540-a in response to the initiating frame 535-a, where the response frame also indicates that the AP MLD 135 is not requesting or triggering a beam training procedure during the D-SP 530 (e.g., BRP required=0).

However, in some cases, such as due to mobility of the non-AP MLD 130, the relative orientations of the non-AP MLD 130 and the AP MLD 135 may change within a beacon interval, thereby causing the beams at the respective devices to misalign. In such cases, initiating frame/response frame sequences at the beginning of each SP may enable the devices to adapt to the latest channel conditions. Moreover, the non-AP MLD 130, the AP MLD 135, or both, may be able to detect a misalignment based on the performance of a frame exchange during a previous SP, and trigger a new beam training (e.g., based on RSSI, error rate, retry count, MCS, machine learning, etc.).

For example, over the course of the D-SP 530, the AP MLD 135, the non-AP MLD 130, or both, may detect a misalignment between the beams 520-a and 525 (e.g., based on RSSI, error rate, etc.). In this example, the AP MLD 135, the non-AP MLD 130, or both, may transmit a frame 555-a indicating or triggering a new beam training procedure and/or activating an O-SP 560. In this example, an initiating frame 535-b, a response frame 540-b, or both, within the O-SP 560 may indicate that the respective device(s) is/are requesting to perform a new beam training procedure during the O-SP 560 (e.g., BRP required=1). Subsequently, the devices may perform a beam training procedure (e.g., only BRP) during a time interval 565 to determine one or more new beams (e.g., beams 520-b, 570) that will be used to perform communications during a frame exchange 550-b.

In some cases, where the AP-MLD 135 and/or the non-AP MLD 130 has additional data to be sent that will not be able to be communicated during the frame exchange 550-b and/or O-SP 560, the respective devices may activate or trigger an additional SP (e.g., O-SP) to continue communications. For example, as shown in FIG. 5, the AP MLD 135 may transmit a frame 555-b that activates, triggers, or otherwise indicates an O-SP that may be used to perform additional communications between the respective devices.

Figure 6:
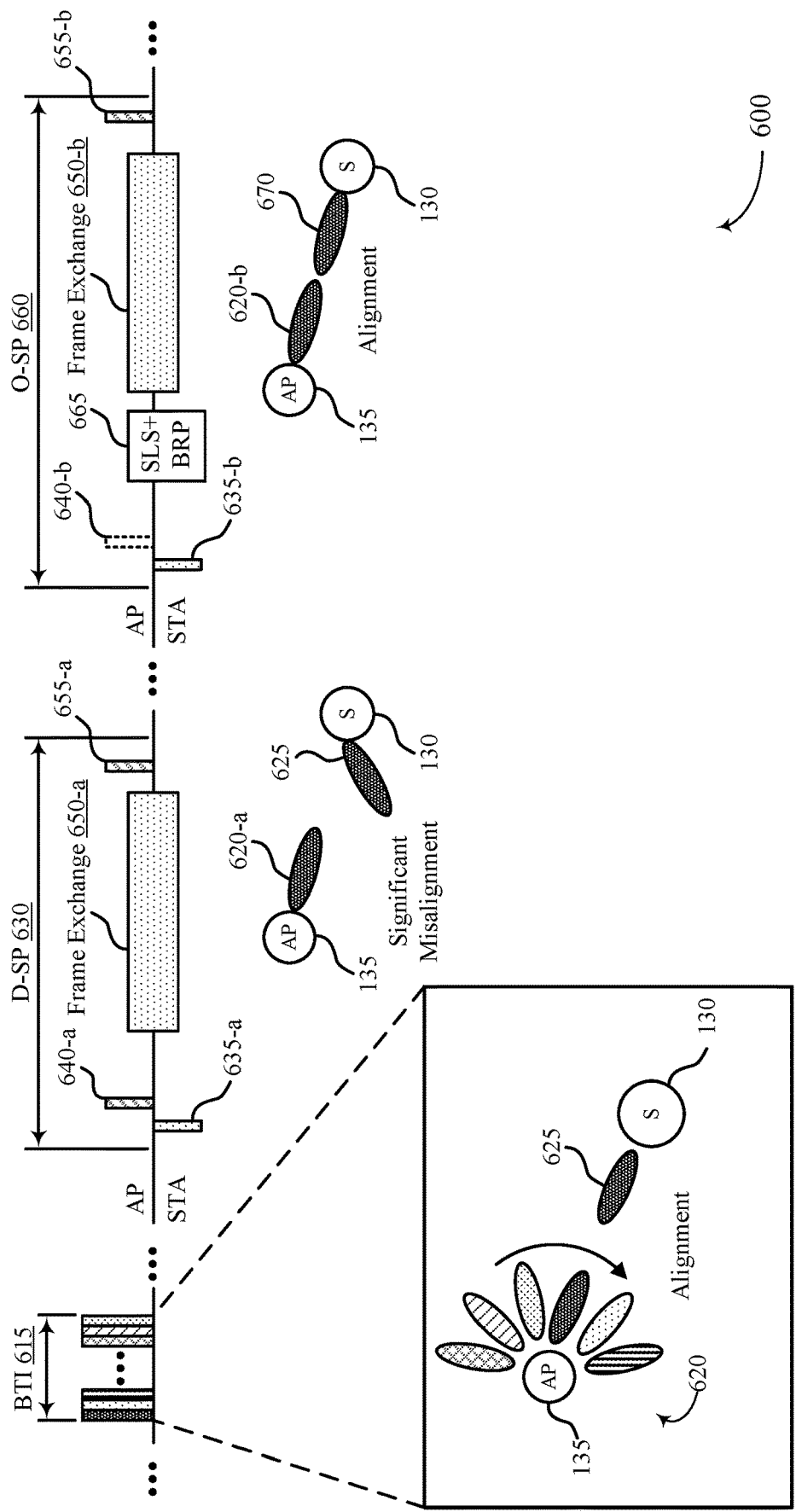

FIG. 6 illustrates an example of a beam training procedure 600 that supports beam training techniques in Wi-Fi frequency bands in accordance with one or more aspects of the present disclosure. Aspects of the beam training procedure 600 may implement, or be implemented by, aspects of the WLAN 100, the wireless communications system 200, the beam training procedures 300, 400, 500, or any combination thereof. For example, the beam training procedure 600 illustrates communication between a non-AP MLD 130 and an AP MLD 135, which may be examples of the non-AP MLD 130 and the AP MLD 135, respectively, as illustrated by and described with reference to FIG. 1.

As noted previously herein with respect to FIG. 2, an AP MLD 135 may transmit beacon frames within each sector (e.g., using beams 620) during a BTI 615. In this example, a non-AP MLD 130 may listen for the beacon frames during the BTI 615, and receive a beacon frame with an RSRP or other measurement that satisfies (e.g., is greater than) a threshold using a beam 625. In this regard, the non-AP MLD 130 may determine that the beam 525 is aligned with the AP MLD 135. As such, the respective devices may not be expected to perform a beam training procedure during a D-SP 630. In this regard, the non-AP MLD 130 may transmit an initiating frame 635-a towards the beginning of the D-SP 630, where the initiating frame 635-a indicates that the non-AP MLD 130 is not requesting or triggering a beam training procedure during the D-SP 630 (e.g., BRP required=0). Similarly, the AP MLD 135 may transmit a response frame 640-a in response to the initiating frame 635-a, where the response frame also indicates that the AP MLD 135 is not requesting or triggering a beam training procedure during the D-SP 630 (e.g., BRP required=0).

Similar to the example shown and described in FIG. 5, the relative orientations of the non-AP MLD 130 and the AP MLD 135 may change within a beacon interval, thereby causing the beams at the respective devices to misalign. For example, over the course of the D-SP 630, the AP MLD 135, the non-AP MLD 130, or both, may detect a misalignment between the beams 620-a and 625 (e.g., based on RSSI, error rate, etc.). As compared to the misalignment illustrated in FIG. 5, which may be considered to be a slight or minor misalignment, the misalignment illustrated in FIG. 6 may be considered a significant misalignment which may significantly affect a quality of wireless communications between the devices.

In this example, the AP MLD 135, the non-AP MLD 130, or both, may transmit a frame 655-a indicating or triggering a new beam training procedure and/or activating an O-SP 660. In this example, the non-AP MLD 130 may transmit an initiating frame 635-b which indicates that the non-AP MLD 130 is requesting to perform a new beam training procedure during the O-SP 660 (e.g., BRP required=1). However, due to the significant misalignment between the beams, the initiating frame 635-b may not be successfully received by the AP MLD 135. As such, the AP MLD 135 may not transmit a response frame 640-b, and the non-AP MLD 130 may not receive any response frame 640-b. As such, due to the failed initiating/response frame exchange, the respective devices may enter into a full beam training procedure (e.g., SLS+BRP) during time interval 665 and after the expected response frame 640-b in order to determine one or more new beams (e.g., beams 620-b, 670) that will be used to perform communications during a frame exchange 650-b.

In some cases, where the AP-MLD 135 and/or the non-AP MLD 130 has additional data to be sent that will not be able to be communicated during the frame exchange 650-b and/or O-SP 560, the respective devices may activate or trigger an additional SP (e.g., O-SP) to continue communications. For example, as shown in FIG. 6, the AP MLD 135 may transmit a frame 655-b that activates, triggers, or otherwise indicates an O-SP that may be used to perform additional communications between the respective devices.

Figure 7:
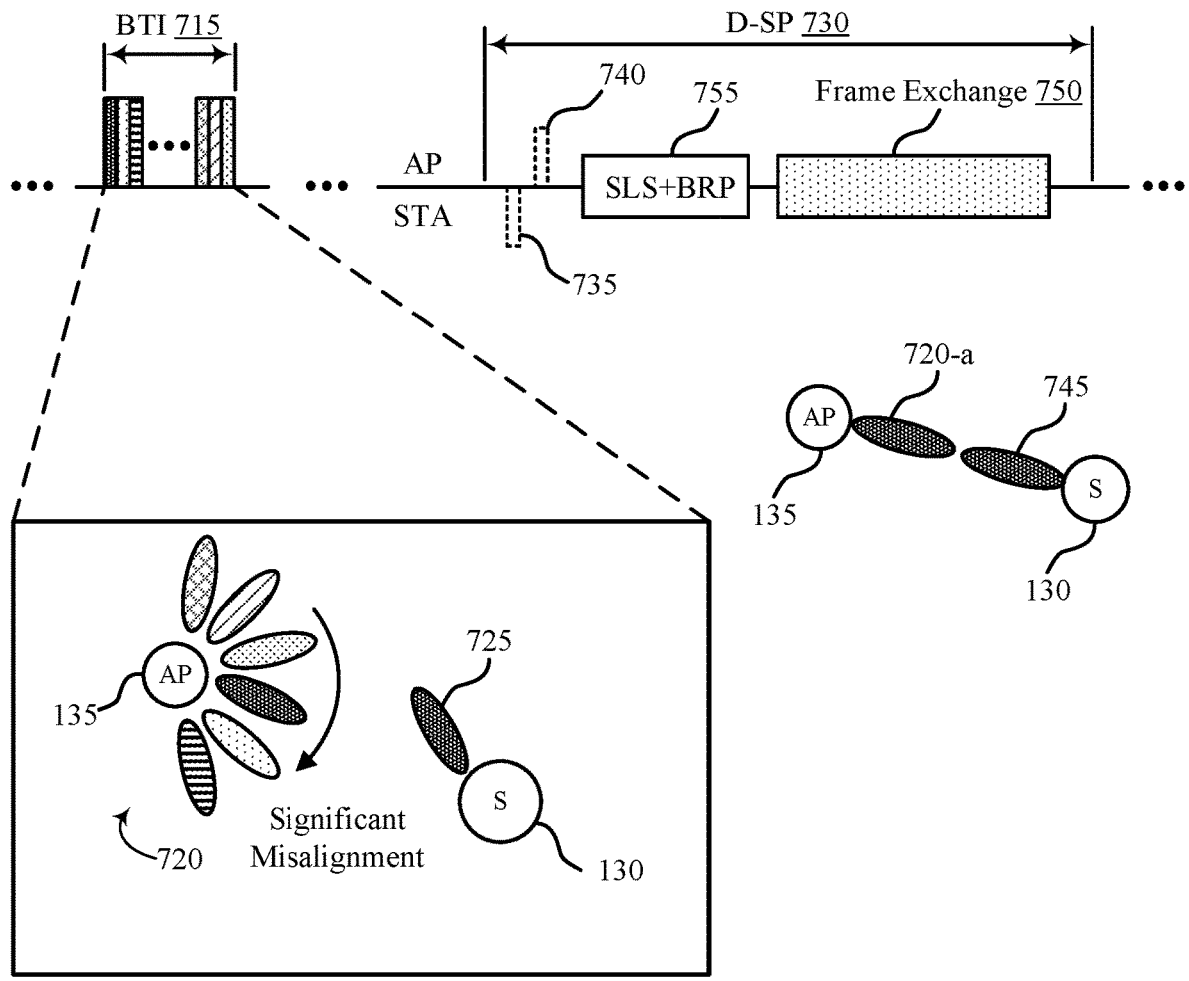

FIG. 7 illustrates an example of a beam training procedure 700 that supports beam training techniques in Wi-Fi frequency bands in accordance with one or more aspects of the present disclosure. Aspects of the beam training procedure 700 may implement, or be implemented by, aspects of the WLAN 100, the wireless communications system 200, the beam training procedures 300, 400, 500, 600, or any combination thereof. For example, the beam training procedure 700 illustrates communication between a non-AP MLD 130 and an AP MLD 135, which may be examples of the non-AP MLD 130 and the AP MLD 135, respectively, as illustrated by and described with reference to FIG. 1.

As noted previously herein with respect to FIG. 2, an AP MLD 135 may transmit beacon frames within each sector (e.g., using beams 720) during a BTI 715. In this example, a non-AP MLD 130 may listen for the beacon frames during the BTI 715, and receive a beacon frame with an RSRP or other measurement that fails to satisfy (e.g., is less than) a threshold using a beam 725. In this regard, the non-AP MLD 130 may identify a significant misalignment between the beam 725 and the direction of the AP MLD 135 (e.g., identifying an absence of signaling associated with a first beam training procedure performed during the BTI 715). For example, the non-AP MLD 130 may be beamformed while listening for beacon frames from the AP MLD 135, and may not detect any beacon frames using the beam 725 (indicating a significant misalignment).

In this example, both devices may refrain from transmitting an initiating frame 735 and response frame 740 during the D-SP 730 in order to trigger a beam training procedure during the D-SP 730. Additionally, or alternatively, the non-AP MLD 130 may transmit an initiating frame to trigger beam training, but the initiating frame 735 may not be received by the AP MLD 135 due to the significant misalignment (thereby triggering an initiating frame timeout), in which case the AP MLD 135 may not transmit a response frame 740. As such, the devices may perform a full beam training procedure (e.g., SLS+BRP) during a time interval 755 in order to identify beams 720-a, 745 that will be used for communicating during the frame exchange 750.

Figure 8:
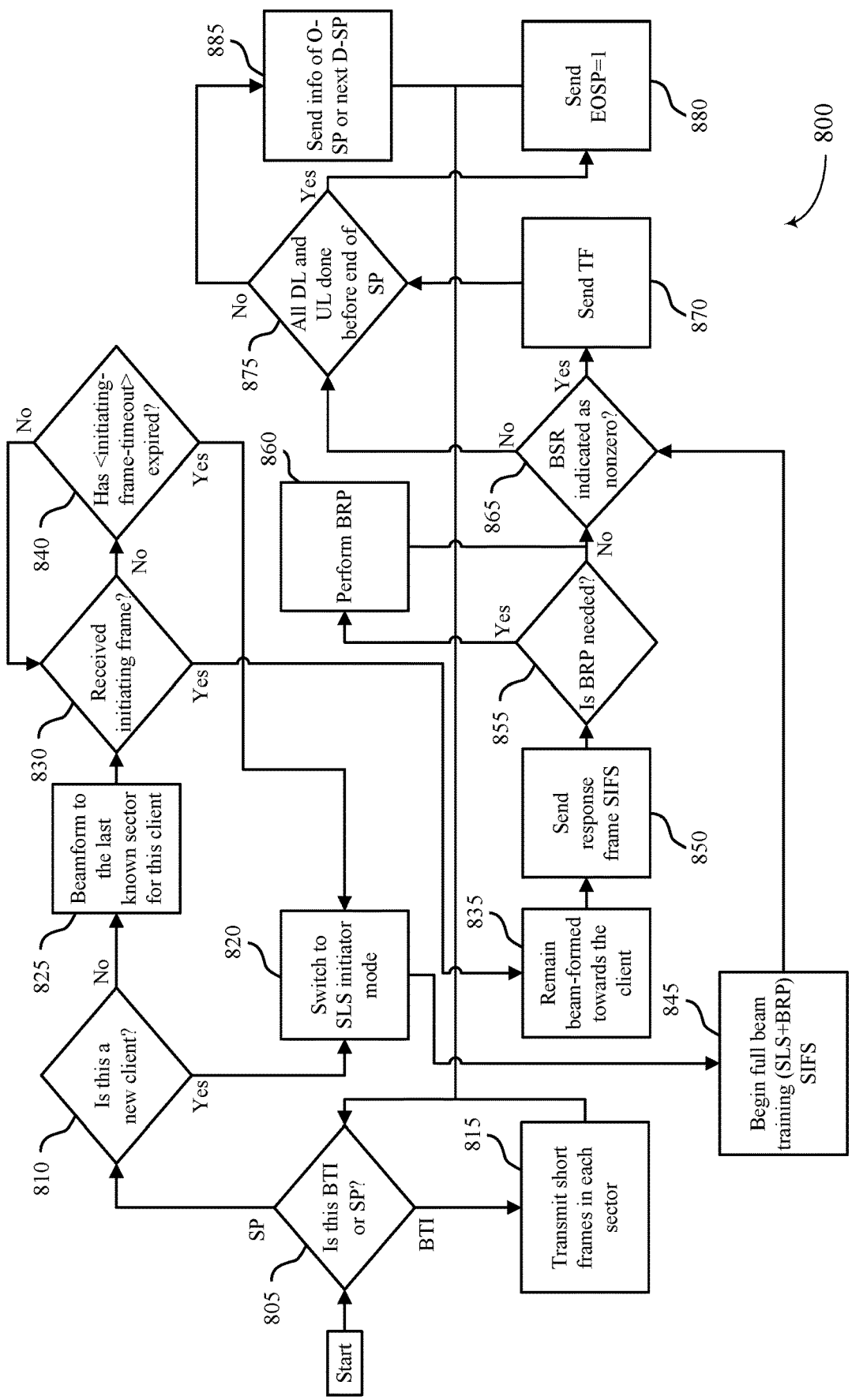
FIGS. 8 and 9 illustrate examples of flow diagrams that support beam training techniques in Wi-Fi frequency bands in accordance with one or more aspects of the present disclosure.

FIG. 8 illustrates an example of a flow diagram 800 that supports beam training techniques in Wi-Fi frequency bands in accordance with one or more aspects of the present disclosure. Aspects of the flow diagram 800 may implement, or be implemented by, aspects of the WLAN 100, the wireless communications system 200, the beam training procedures 300, 400, 500, 600, 700, or any combination thereof.

For example, the flow diagram 800 illustrates logic that may be performed by an AP MLD 135 when determining if, and when, to perform a beam training procedure with a non-AP MLD 130, as illustrated by and described with reference to FIG. 1.

At 805, the AP determines whether the AP is communicating within a BTI or SP. If the AP is communicating within a BTI, the flow diagram 800 proceeds to 815. At 815, the AP may transmit short (e.g., beacon) frames in each sector and return to 805. If the AP is communicating within an SP at 805, the flow diagram 800 proceeds to 810. At 810, the AP determines whether the AP is communicating with a new client. If the AP is communicating with a new client, the flow diagram 800 proceeds to 820. At 820, the AP switches to an SLS initiator mode and the flow diagram 800 proceeds to 845. At 845, the AP may begin full beam training (SLS+BRP) SIFS after expected time when a response frame is to be sent and proceeds to 865.

If the AP is not communicating with a new client at 810, the flow diagram 800 proceeds to 825. At 825, the AP beamforms to the last known sector for the client and proceeds to 830. At 830, the AP determines whether the AP has received the initiating frame. If the AP has not received the initiating frame, the flow diagram 800 proceeds to 840. At 840, the AP determines if <initiating-frame-timeout> has expired. If the <initiating-frame-timeout> has not expired, the flow diagram 800 returns to 830. If the <initiating-frame-timeout> has expired, the flow diagram 800 proceeds to 820 and may proceed as described above.

If the AP has received the initiating frame at 830, the flow diagram 800 proceeds to 835. At 835, the AP remains beam-formed towards the client and proceeds to 850. At 850, The AP sends a response frame SIFS after initiating frame is received, which may indicate if BRP is needed, and proceeds to 855. At 855, the AP determines if BRP is needed (e.g., from indication in the initiating or response frames). If BRP is needed, the flow diagram 800 proceeds to 860. At 860, the AP performs BRP to refine the beam towards the client and proceeds to 865. Also, if BRP is not needed at 855, the flow diagram 800 proceeds to 865. At 865, the AP determines if the initiating frame indicates BSR as nonzero. If BSR is indicated as nonzero, the flow diagram 800 proceeds to 870. At 870, the AP sends TF to solicit UL from client. TF may be aggregated with DL (e.g., if DL BU(s) are present), and the process flow proceeds to 875. If BSR is not indicated as nonzero, the flow diagram 800 proceeds to 875. At 875, the AP determines if all DL and UL are done before the end of SP. If all DL and UL are done, the flow diagram 800 proceeds to 880. At 880, the AP sends EOSP=1 in the last DL frame (e.g., QoS null if no pending DL), and the process flow returns to 805. If all DL and UL are not done, the flow diagram 800 proceeds to 885. At 885, the AP sends information of O-SP and/or next D-SP to continue, and the flow diagram 800 returns to 805.

Figure 9:
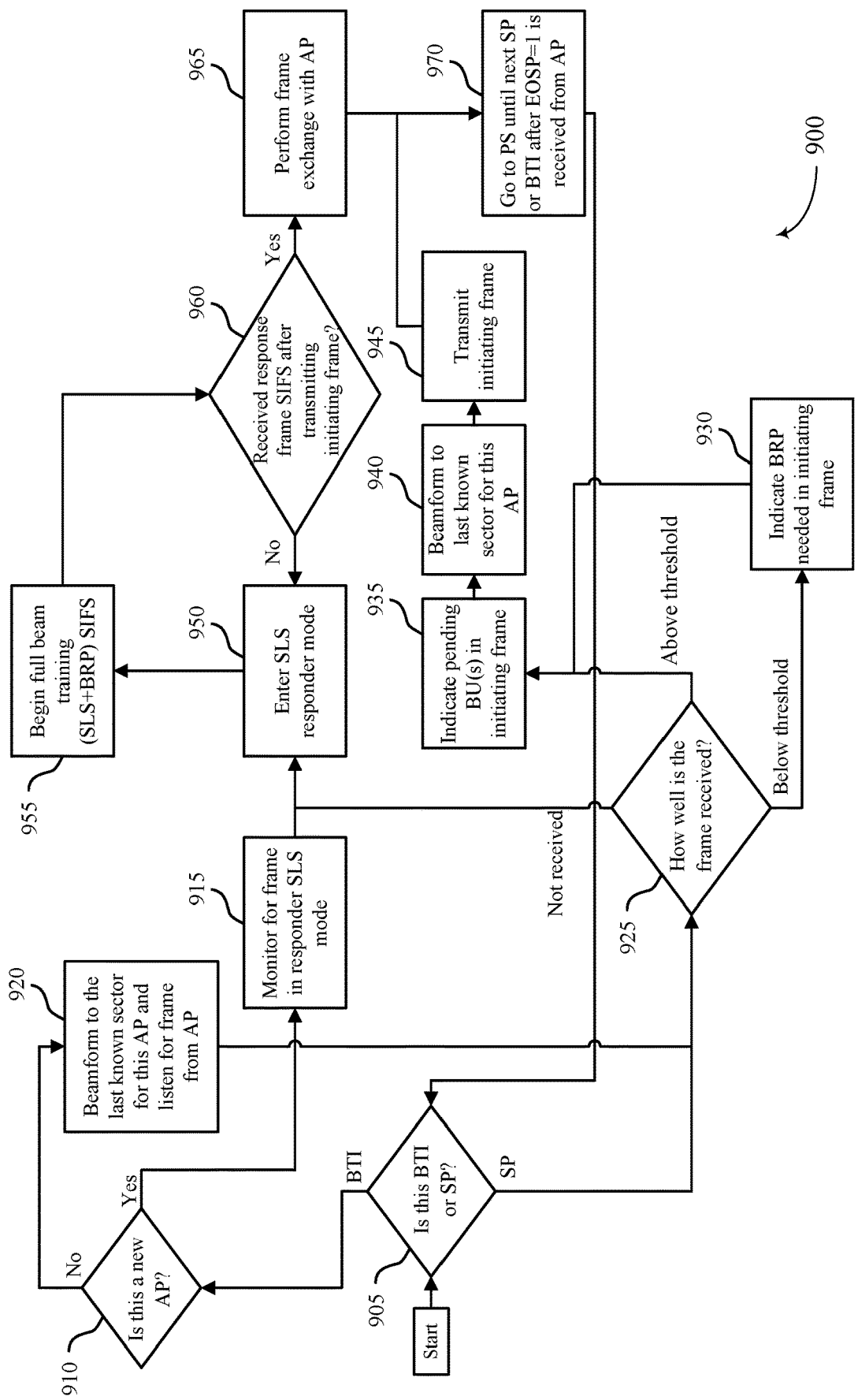

FIG. 9 illustrates an example of a flow diagram 900 that supports beam training techniques in Wi-Fi frequency bands in accordance with one or more aspects of the present disclosure. Aspects of the flow diagram 900 may implement, or be implemented by, aspects of the WLAN 100, the wireless communications system 200, the beam training procedures 300, 400, 500, 600, 700, or any combination thereof.

For example, the flow diagram 900 illustrates logic that may be performed by a non-AP MLD 130 when determining if, and when, to perform a beam training procedure with an AP MLD 135, as illustrated by and described with reference to FIG. 1.

At 905, the client determines whether the client is communicating within a BTI or SP. If the client is communicating within a BTI, the flow diagram 900 proceeds to 910. At 910, the client determines if the client is communicating with a new AP. If the AP is new, the flow diagram 900 proceeds to 915. At 915, the client monitors for (e.g., beacon) frame in responder SLS mode (e.g., quasi-omni) and proceeds to 950. At 950, the client enters SLS responder mode (e.g., quasi-omni) and proceeds to 955. At 955, the client begins full beam training (SLS+BRP) SIFS after expected time when response frame is to be received and proceeds to 960.

At 960, the client determines if the response frame SIFS was received after transmitting the initiating frame. If the response was not received after transmitting the initiating frame, the flow diagram 900 returns to 950. If the response was not received after transmitting the initiating frame, the flow diagram 900 proceeds to 965. At 965, the client performs frame exchange with the AP while beamformed and proceeds to 970.

If the AP is not new at 910, the flow diagram 900 proceeds to 920. At 920, the client beamforms to the last known sector for the AP and listens for a (e.g., beacon) frame from the AP. The flow diagram 900 proceeds to 925. Also, if the client determines that the client is communicating in SP at 905, the flow diagram 900 proceeds to 925. At 925, the client determines how well the (e.g., beacon) frame is received. The client may determine that the frame was received above a threshold, below the threshold, or not received. If the frame is not received, the flow diagram 900 proceeds to 950 and may follow the process as described above. If the frame is received below the threshold, the flow diagram 900 proceeds to 930. At 930, the client indicates that BRP is needed in initiating frame and proceeds to 935. Also, if the frame is received above the threshold, the flow diagram 900 proceeds to 935.

At 935, the client indicates pending BUs in the initiating frame and proceeds to 940. At 940, the client beamforms to the last know sector for the AP and proceeds to 945. At 945, the client transmits the initiating frame and proceeds to 970. At 970, the client may go to PS until the next SP or BTI after EOSP=1 is received from the AP, and the flow diagram 900 returns to 905.

Figure 10:
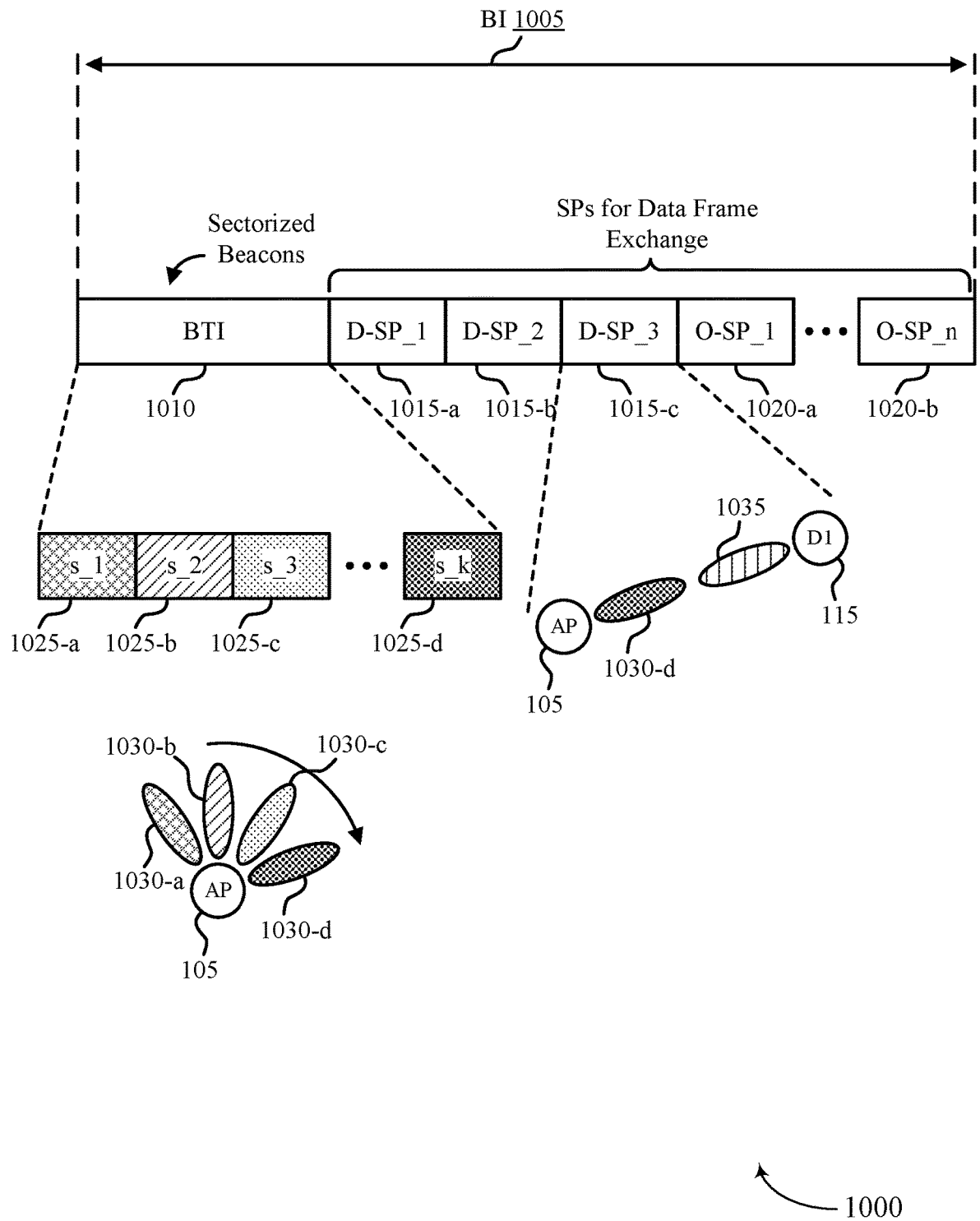
FIG. 10 illustrates an example of a beam training procedure that supports beam training techniques in Wi-Fi frequency bands in accordance with one or more aspects of the present disclosure.

FIG. 10 illustrates an example of a beam training procedure 1000 that supports beam training techniques in Wi-Fi frequency bands in accordance with one or more aspects of the present disclosure. Aspects of the flow diagram 900 may implement, or be implemented by, aspects of the WLAN 100, the wireless communications system 200, the beam training procedures 300, 400, 500, 600, 700, the flow diagrams 800, 900, or any combination thereof.

For example, the beam training procedure 1000 illustrates communication between a non-AP MLD 130 and an AP MLD 135, which may be examples of the non-AP MLD 130 and the AP MLD 135, respectively, as illustrated by and described with reference to FIG. 1.

For example, a STA 115 and an AP 105, or a non-AP MLD 130 and an AP MLD 135 (which may be an example of a STA 115 and an AP 105, ora non-AP MLD 130 and an AP MLD 135 as illustrated by or described with reference to FIGS. 1-2, respectively), may perform the beam training procedure 1000 to measure a signal strength associated with one or more beam pairs and to select a beam pair associated with a suitable or greatest signal strength.

In some implementations, the beam training procedure 1000 may be a beacon frame-based beam training procedure according to which communicating devices may perform beam training via one or more sectorized beacons. The beam training procedure 1000 illustrated in FIG. 10 may include a BI 1005 that is divided up into three parts: (1) a BTI 1010, (2) D-SPs 1015, and (3) O-SPs 1020.

For example, a BI 1005 may include a BTI 1010 during which an AP 105 may transmit sectorized beacons in different beamformed directions during different beam training resources 1025 (which may generally refer to any one or more of a beam training resource 1025-a, a beam training resource 1025-b, a beam training resource 1025-c, and a beam training resource 1025-d). In other words, the AP 105 may perform a sector sweep (e.g., SLS) of short beacon frames during the BTI 1010. The beacon fames may include short frames that STAs may use as a reference for evaluating if beam training is needed or not.

For instance, as shown in FIG. 10, a beam training resource 1025-a may be associated with a directional beam 1030-a (which may be denoted as $s_1$) and the AP 105 may accordingly transmit a sectorized beacon frame during the beam training resource 1025-a using the directional beam 1030-a. Similarly, the beam training resource 1025-b may be associated with a directional beam 1030-b (which may be denoted as $s_2$), the beam training resource 1025-c may be associated with a directional beam 1030-c (which may be denoted as $s_3$), and the beam training resource 1025-d may be associated with a directional beam 1030-d (which may be denoted as $s_k$). As such, the AP 105 may sweep across a set of directional beams 1030 (which may generally refer to any one or more of the directional beam 1030-a, the directional beam 1030-b, the directional beam 1030-c, or the directional beam 1030-d) during the BTI 1010. A STA 115 may measure the various directional beams 1030 used by the AP 105 using a and identify a suitable beam pair that the AP 105 and the STA 115 may use for exchanging data. Accordingly, the AP 105 and the STA 115 may communicate data during an SP for data frame exchange using the suitable beam pair.

For example, the STA 115 and the AP 105 may communicate during one or more of a D-SP 1015-a, a D-SP 1015-b, and a D-SP 1015-c using the suitable beam pair. Additionally, or alternatively, the STA 115 and the AP 105 may perform beam training during any one or more of the D-SP 1015-a, the D-SP 1015-b, and the D-SP 1015-c. As illustrated by the beam training procedure 1000, the AP 105 may use the directional beam 1030-d and the STA 115 may use a directional beam 1035 during the D-SP 1015-c. The STA 115 and the AP 105 also may communicate during one or more open SPs (O-SPs) 1020 (which may generally refer to any one or more of an O-SP 1020-a and an O-SP 1020-b).

In accordance with the implementations described herein, a non-AP MLD 130 (or a STA 115 associated with a non-AP MLD 130) and an AP MLD 135 (or an AP 105 associated with an AP MLD 135) may perform the beam training procedure 1000 using a 60 GHz link in scenarios in which the non-AP MLD 130 and the AP MLD 135 support 60 GHz link beacon frames. In some implementations, the non-AP MLD 130 and the AP MLD 135 may conditionally support beacon frame transmissions using the GHz link. For example, the AP MLD 135 may transmit one or more sectorized beacon frames to the non-AP MLD 130 using the 60 GHz link in accordance with a satisfaction of a condition associated with 60 GHz link beacon frame transmissions.

The beam training procedure 1000 illustrated in FIG. 10 may be used to illustrate beam training procedures performed between wireless devices following a new association, or a beam training procedure performed between wireless devices after one of the wireless devices has resumes after a long idle period. In particular, different steps of a beam training procedure (e.g., sector-level training procedure (SLS), BRP, or both, may be performed during different portions of the BI 1005 illustrated in FIG. 10.

For example, in accordance with a first implementation, an STA (e.g., non-AP MLD 130) may monitors several BTIs 1010 in a quasi-omnidirectional mode to determine the general location of the AP MLD 135, and may performs responder-side SLS and BRP during an associated D-SP 1015. In this regard, the AP MLD 130 may transmit signals as part of the SLS during the BTI(s) 1010, and the non-AP MLD 130 may transmit signals as part of the SLS during D-SPs 1015, where the BRP is performed during the D-SP(s) 1015. Stated differently, the non-AP MLD 130 may receive signals as part of the sector-level training procedure using a wide beam within one or more BTIs 1010, and may transmit signals as part of the sector-level training procedure during one or more D-SPs 1015. One drawback of this implementation is that the beam training procedure 1000 may take place over several BTIs 1010, which may result in longer beam training. However, such delay may be acceptable for use cases that do not require frames to be exchanged on 60 GHz immediately after association.

By way of another example, in accordance with a second implementation, the AP MLD 130 and the non-AP MLD 130 (STA) may perform both SLS and BRP during the D-SP 1015. In this implementation, a portion of the D-SP 1015 (after association or after returning from idle state) may be used towards beam training.

Figure 11:
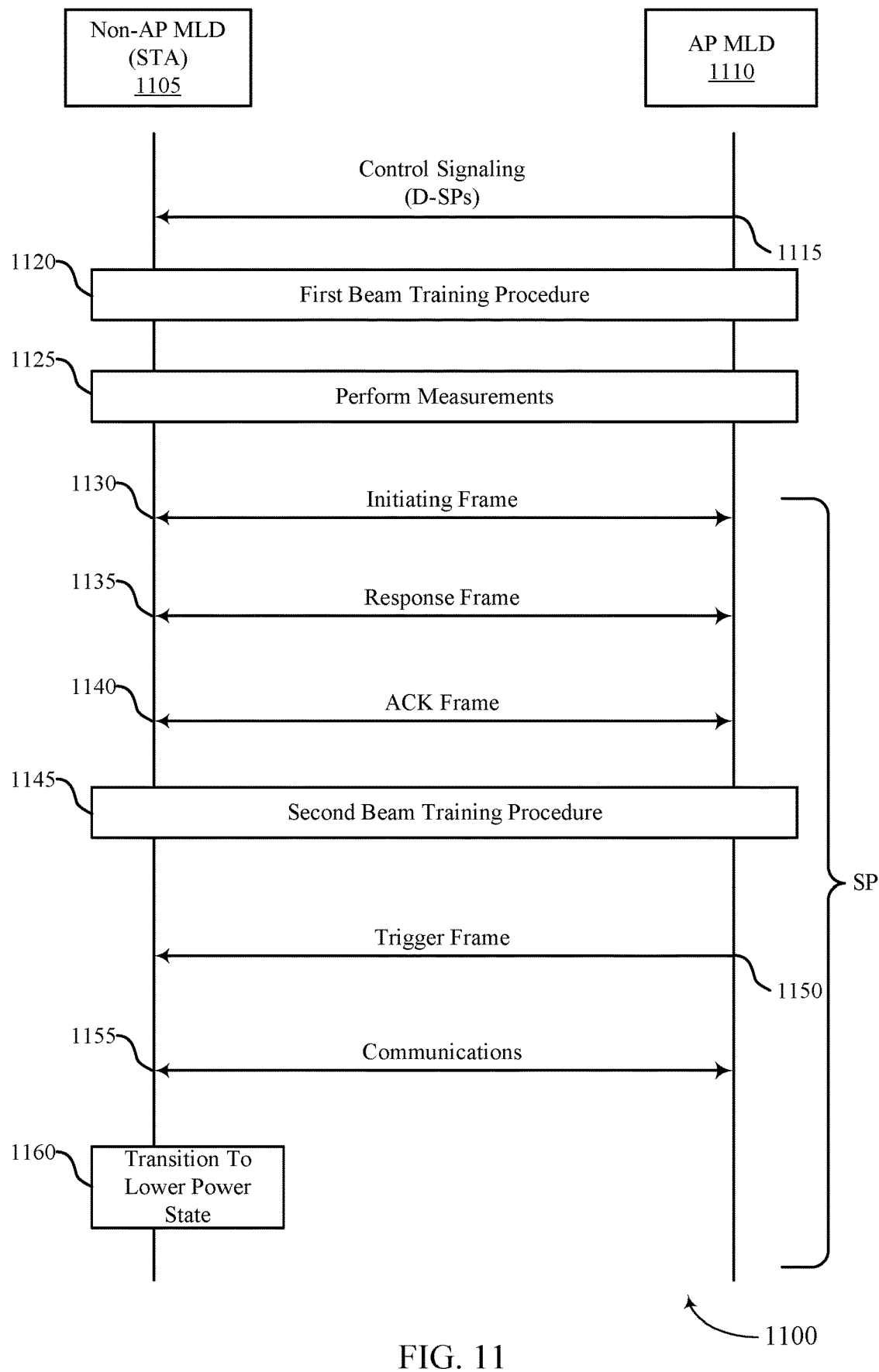
FIG. 11 illustrates an example of a process flow that supports beam training techniques in Wi-Fi frequency bands in accordance with one or more aspects of the present disclosure.

FIG. 11 illustrates an example of a process flow 1100 that supports beam training techniques in Wi-Fi frequency bands in accordance with one or more aspects of the present disclosure. Aspects of the process flow 1100 may implement, or be implemented by, aspects of the WLAN 100, the wireless communications system 200, the beam training procedures 300, 400, 500, 600, 700, the flow diagrams 800, 900, the beam training procedure 1000, or any combination thereof. For example, the process flow 1100 illustrates hand-shake signaling between a non-AP MLD 1105 and an AP MLD 1110 that may be used to determine whether (or what type/extent) of beam training procedures are expected to be performed during an SP configured for communications between the respective devices, as shown and described with respect to FIGS. 1-10.

The process flow 1100 may include a non-AP MLD 1105 and an AP MLD 1110, which may be examples of non-AP MLDs 130, AP MLDs 135, STAs, and other wireless devices described with reference to FIGS. 1-10. For example, the non-AP MLD 1105 and the AP MLD 1110 illustrated in FIG. 11 may include examples of the non-AP MLD 130 and the AP MLD 135, respectively, as illustrated in FIG. 2.

In some examples, the operations illustrated in process flow 1100 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 1115, the non-AP MLD 1105 may receive control signaling from the AP MLD 1110, where the control signaling indicates a set of SPs (e.g., D-SPs) associated with the first wireless device. In other words, the AP MLD 1110 may configure the non-AP MLD 1105 with a set of D-SPs that may be used for communications between the respective devices.

At 1120, the non-AP MLD 1105 and the AP MLD 1110 may perform a first beam training procedure with one another. As described previously herein, the respective devices may perform a beam training procedure with one another during a BTI in order to identify beams (e.g., Tx/Rx beams) that will be used for communications with one another, as shown and described in FIG. 2. The first beam training procedure may include SLS and BRP, or just BRP. In some cases, the devices may perform the first beam training procedure at 1120 based on communicating the control signaling at 1115.

At 1125, the non-AP MLD 1105, the AP MLD 1110, or both, may perform measurements on signals received from the other respective device. In particular, the devices may perform measurements on signals received using beams (e.g., Rx beams) selected based on the first beam training procedure. In some aspects, the performed measurements may be used by the respective devices to determine whether the devices should perform a new beam training procedure to update beams that will be used for communications with one another. As such, the devices may perform the measurements at 1125 based on communicating the control signaling at 1115, performing the first beam training procedure at 1120, or both.

At 1130, the non-AP MLD 1105 or the AP MLD 1110 may transmit an initiating frame within an SP (e.g., D-SP). In some aspects, the non-AP MLD 1105 or the AP MLD 1110 may transmit the initiating frame using a Tx beam selected based on the first beam training procedure at 1120 (and the other respective device may receive the response frame using an Rx beam selected based on the first beam training procedure). As such, the non-AP MLD 1105 or the AP MLD 1110 may transmit the initiating frame at 1130 based on communicating the control signaling at 1115, performing the first beam training procedure at 1120, performing the measurements at 1125, or any combination thereof.

In some aspects, the initiating frame may include an indication as to whether the non-AP MLD 1105 or the AP MLD 1110 is requesting to perform a second beam training procedure during the SP. In some cases, the initiating frame may indicate a level, type, or extent of beam training (e.g., indicate whether the device is requesting to perform BRP, or SLS+BRP). For example, in cases where the non-AP MLD 1105 transmits the initiating frame, non-AP MLD 1105 may use the initiating frame to request or trigger a second beam training procedure during the SP. For instance, in cases where measurements performed at 1125 fail to satisfy a threshold, the non-AP MLD 1105 may request to perform a new beam training procedure during the SP via the initiating frame. Conversely, in cases where measurements performed at 1125 satisfy a threshold, the initiating frame may indicate that the non-AP MLD 1105 is not requesting to perform a new beam training procedure during the SP. In some cases, an absence of an explicit request for a beam training procedure may serve as an indication that the respective device is not requesting a new beam training procedure.

In some implementations, the initiating frame may include a QoS null frame including a control field. In such cases, the control field may include a buffer status report, the indication as to whether the respective device is requesting to perform the second beam training procedure, or both. For example, in cases where the non-AP MLD 1110 transmits the initiating frame, the initiating frame may include a buffer status report associated with traffic to be communicated from the non-AP MLD 1105 to the AP MLD 1110.

At 1135, the non-AP MLD 1105 or the AP MLD 1110 may transmit a response frame within the SP (e.g., D-SP), where the response frame is transmitted based on (e.g., in response to) the initiating frame at 1130. For example, in cases where the non-AP MLD 1110 transmits the initiating frame at 1130, the AP MLD 1110 may transmit the response frame based on receiving the initiating frame. Conversely, in cases where the AP MLD 1105 transmits the initiating frame at 1130, the non-AP MLD 1105 may transmit the response frame based on receiving the initiating frame.

As noted previously herein with respect to the initiating frame, the non-AP MLD 1105 or the AP MLD 1110 may transmit the response frame using a Tx beam selected based on the first beam training procedure at 1120 (and the other respective device may receive the response frame using an Rx beam selected based on the first beam training procedure). As such, the non-AP MLD 1105 or the AP MLD 1110 may transmit the initiating frame at 1130 based on communicating the control signaling at 1115, performing the first beam training procedure at 1120, performing the measurements at 1125, receiving the initiating frame at 1130, or any combination thereof.

Moreover, as described with respect to the initiating frame, the response frame may include an indication as to whether the non-AP MLD 1105 or the AP MLD 1110 is requesting to perform a second beam training procedure during the SP. In some cases, the response frame may indicate a level, type, or extent of beam training (e.g., indicate whether the device is requesting to perform BRP, or SLS+BRP). For example, in cases where the AP MLD 1105 transmits the response frame, non-AP MLD 1105 may use the initiating frame to request or trigger a second beam training procedure during the SP. In this regard, any description associated with the initiating frame at 1130 may apply to the response frame at 1135, unless noted otherwise herein. Moreover, in cases where the initiating frame indicates a request to perform a second beam training procedure, the response frame may include an acknowledgment of the request for the second beam training procedure. Further, the response frame may include a request for the second beam training procedure even in cases where the initiating frame did not include such a request.

At 1140, the non-AP MLD 1105 or the AP MLD 1110 may transmit an ACK frame within the SP (e.g., D-SP), where the ACK frame is transmitted based on (e.g., in response to) the response frame at 1130. For example, in cases where the non-AP MLD 1105 receives the response frame at 1135, the non-AP MLD 1105 may transmit the ACK frame based on receiving the response frame. Conversely, in cases where the AP MLD 1105 receives the response frame at 1135, the AP MLD 1110 may transmit the ACK frame based on receiving the response frame.

At 1145, the non-AP MLD 1105 and the AP MLD 1110 may perform a second beam training procedure with one another during the SP (e.g., D-SP). The devices may be configured to perform the second beam training procedure to update or select new Tx/Rx beams that will be used for communications between the respective devices. As noted previously herein, the second beam training procedure may include BRP, or SLS+BRP. The devices may be configured to perform the second beam training procedure during the SP at 1145 based on communicating the control signaling at 1115, performing the first beam training procedure at 1120, performing the measurements at 1125, communicating the initiating frame at 1130, communicating the response frame at 1135, communicating the ACK frame at 1140, or any combination thereof.

For example, the devices may be configured to perform the second beam training procedure if the initiating frame, the response frame, or both, includes an indication that the respective device is requesting to perform the second beam training procedure. Additionally, or alternatively, the devices may be configured to perform the second beam training procedure if the devices determine that wireless channel conditions between the respective devices have changed relative to a previous BTI or SP (e.g., based on the measurements at 1125).

Additionally, or alternatively, the devices may be configured to perform the second beam training procedure if the initiating frame, the response frame, the ACK frame, or any combination thereof, is not successfully received by the other respective device. In other words, if either of the initiating frame and/or the response frame is lost or otherwise not successfully received, the devices may fall back or default to a beam training mode (e.g., SLS initiator mode) in order to perform the second beam training procedure during the SP. In this regard, the devices may automatically begin transmitting beacon frames (or monitoring for beacon frames) as part of the second beam training procedure based on identifying an absence of the initiating frame or the response frame (and/or the ACK frame). In some aspects, the devices may signal or negotiate a retry count, and may be configured to perform the second beam training procedure if a quantity of failed frame exchanges (e.g., failed initiating/response frame exchange) satisfies a threshold quantity associated with the retry count.

At 1150, the non-AP MLD 1105 may receive a trigger frame from the AP MLD 1110, where the trigger frame schedules traffic (e.g., uplink traffic) from the non-AP MLD 1105 to the AP MLD 1110. For example, in cases where the non-AP MLD 1105 transmits the initiating frame including a buffer status report, the AP MLD 1105 may transmit the trigger frame scheduling the traffic associated with the buffer status report. In some aspects, the trigger frame may be transmitted with downlink traffic from the AP MLD 1110 to the non-AP MLD 1105. The AP MLD 1110 may transmit the trigger frame at 1150 based on communicating the control signaling at 1115, performing the first beam training procedure at 1120, performing the measurements at 1125, communicating the initiating frame at 1130, communicating the response frame at 1135, communicating the ACK frame at 1140, performing the second beam training procedure at 1145, or any combination thereof.

At 1155, the non-AP MLD 1105 and the AP MLD 1110 may communicate (e.g., transmit, receive) one or more messages with one another using one or more beams (e.g., Tx/Rx beams) that were selected based on the second beam training procedure at 1145. Moreover, the devices may communicate the messages with one another at 1155 based on communicating the control signaling at 1115, performing the first beam training procedure at 1120, performing the measurements at 1125, communicating the initiating frame at 1130, communicating the response frame at 1135, communicating the ACK frame at 1140, performing the second beam training procedure at 1145, communicating the trigger frame at 1150, or any combination thereof.

In some implementations, messages communicated between the respective devices may indicate an end of traffic/communications to be exchanged between the devices, an end of the SP, or both. For example, the non-AP MLD 1105 may receive one or more messages from the AP MLD 1110, where a last frame of the one or more messages indicate an end of the one or more messages, an end of the SP, or both.

Additionally, or alternatively, the one or more messages (e.g., frames) may indicate or activate additional SPs (e.g., O-SPs) for communications between the devices. For example, in cases where either device has additional traffic that will not be able to be communicated during the SP (e.g., D-SP), the AP MLD 1110 may transmit a message indicating or activating an additional O-SP that will be used to communicate the additional traffic between the devices.

At 1160, the non-AP MLD 1110 may transition to an operational state associated with a lower power consumption (e.g., sleep state). In particular, the non-AP MLD 1105 may transition to a lower power operational state based on an end of the SP, based on the messages at 1155 indicating an end of the SP and/or an end of traffic to be communicated between the devices, or both.

Figure 12:
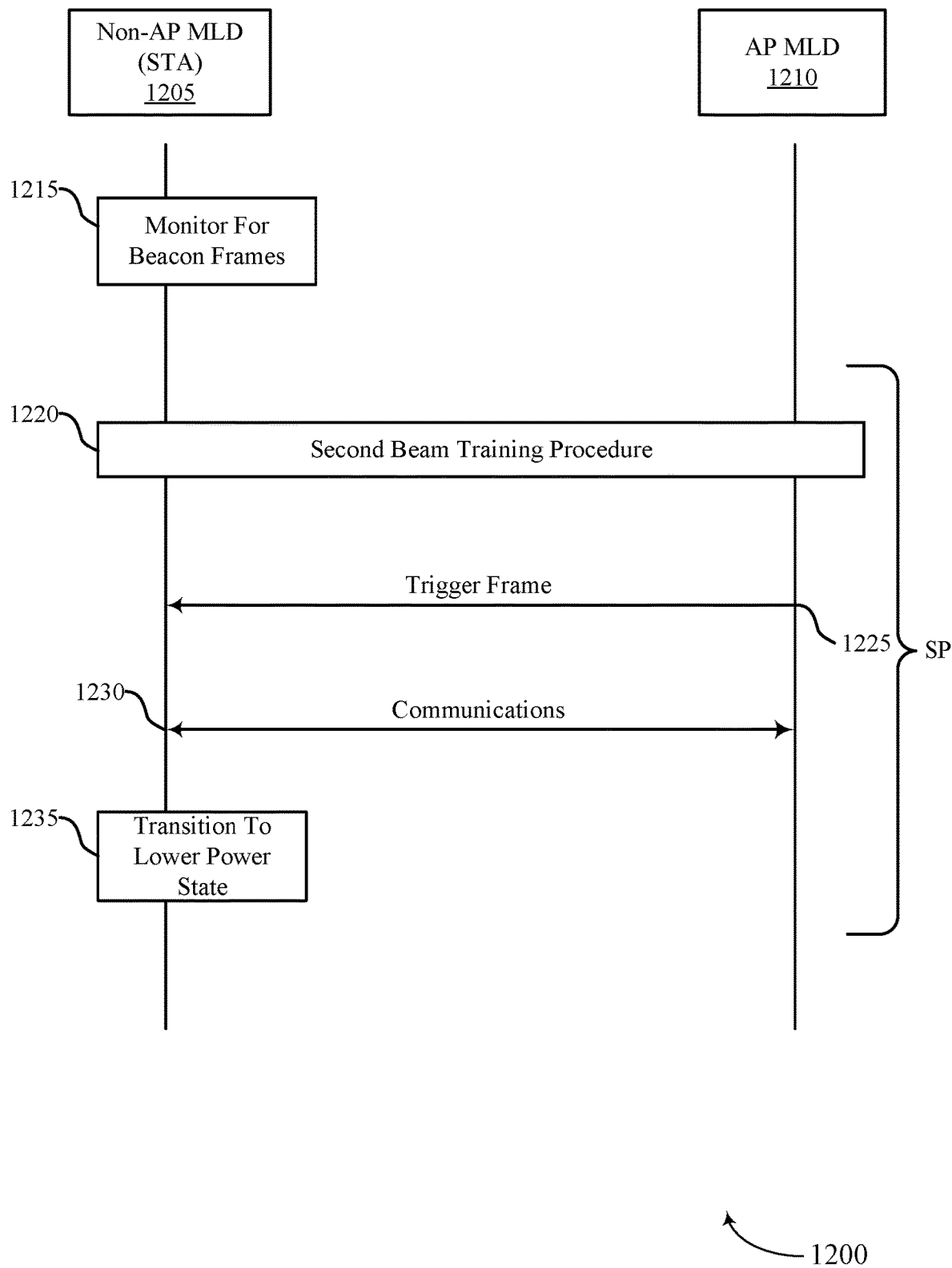
FIG. 12 illustrates an example of a process flow that supports beam training techniques in Wi-Fi frequency bands in accordance with one or more aspects of the present disclosure.

FIG. 12 illustrates an example of a process flow 1200 that supports beam training techniques in Wi-Fi frequency bands in accordance with one or more aspects of the present disclosure. Aspects of the process flow 1200 may implement, or be implemented by, aspects of the WLAN 100, the wireless communications system 200, the beam training procedures 300, 400, 500, 600, 700, the flow diagrams 800, 900, the beam training procedure 1000, the process flow 1100, or any combination thereof. For example, the process flow 1200 illustrates hand-shake signaling between a non-AP MLD 1205 and an AP MLD 1210 that may be used to determine whether (or what type/extent) of beam training procedures are expected to be performed during an SP configured for communications between the respective devices, as shown and described with respect to FIGS. 1-11.

The process flow 1200 may include a non-AP MLD 1205 and an AP MLD 1210, which may be examples of non-AP MLDs 130, AP MLDs 135, STAs, and other wireless devices described with reference to FIGS. 1-11. For example, the non-AP MLD 1205 and the AP MLD 1210 illustrated in FIG. 12 may include examples of the non-AP MLD 130 and the AP MLD 135, respectively, as illustrated in FIG. 2.

In some examples, the operations illustrated in process flow 1200 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 1215, the non-AP MLD 1205 may monitor for beacon frames transmitted by the AP MLD 1210. For example, as shown in FIGS. 2-7, the non-AP MLD 1205 may monitor for beacon frames during a BTI. In some aspects, the non-AP MLD 1205 may monitor for beacon frames as part of a beam training procedure attempted to be performed between the respective devices. The non-AP MLD 1205 may be configured to monitor for beacon frames in a beam formed or non-beamformed mode (e.g., quasi omnidirectional mode).

For example, in cases where the devices have previously performed a beam training procedure with one another, the non-AP MLD 1205 may monitor for beacon frames in a beam formed mode using an Rx beam selected based on the previously-performed beam training procedure. Comparatively, in cases where the devices have not previously performed a beam training procedure (such as a new association between the respective devices), the non-AP MLD 1205 may monitor for beacon frames while operating in a quasi omnidirectional mode.

In some aspects, the non-AP MLD 1205 may detect a significant misalignment between beams at the respective devices based on the monitoring at 1215 (as shown in FIG. 7). Additionally, or alternatively, the non-AP MLD 1205 may not receive or detect any beacon frames from the AP MLD 1210 based on the monitoring (as shown in FIG. 2). In such cases, the devices may be configured to automatically determine that the devices are to perform a beam training procedure within a subsequent SP. As such, the process flow 1200 may proceed to 1220.

At 1220, the non-AP MLD 1205 and the AP MLD 1210 may perform a beam training procedure with one another during the SP (e.g., D-SP). The devices may be configured to perform the beam training procedure to initially select beams that will be used for communications (in the case of a new association with one another), to update or select new Tx/Rx beams that will be used for communications, or both. As noted previously herein, the second beam training procedure may include BRP, or SLS+BRP.

As compared to process flow 1100 illustrated in FIG. 11, in which the devices exchange initiating and response frames with one another at the beginning of the SP, the devices may perform the beam training procedure at 1220 in process flow 1200 without performing the initiating/response frame exchange. In particular, the devices may refrain from transmitting the initiating/response frames (and proceed directly to the beam training procedure) based on the devices having not performed a previous beam training procedure with one another, based on detecting a significant misalignment between beams at 1215, or both.

The devices may be configured to perform the second beam training procedure during the SP at 1145 based on communicating the control signaling at 1115, performing the first beam training procedure at 1120, performing the measurements at 1125, communicating the initiating frame at 1130, communicating the response frame at 1135, communicating the ACK frame at 1140, or any combination thereof.

At 1225, the non-AP MLD 1205 may receive a trigger frame from the AP MLD 1210, where the trigger frame schedules traffic (e.g., uplink traffic) from the non-AP MLD 1205 to the AP MLD 1210. In some aspects, the trigger frame may be transmitted with downlink traffic from the AP MLD 1210 to the non-AP MLD 1205. The AP MLD 1210 may transmit the trigger frame at 1225 performing the beam training procedure at 1220.

At 1230, the non-AP MLD 1205 and the AP MLD 1210 may communicate (e.g., transmit, receive) one or more messages with one another using one or more beams (e.g., Tx/Rx beams) that were selected based on the beam training procedure at 1220. Moreover, the devices may communicate the messages with one another at 1230 based on communicating the trigger frame at 1225.

In some implementations, messages communicated between the respective devices may indicate an end of traffic/communications to be exchanged between the devices, an end of the SP, or both. For example, the non-AP MLD 1205 may receive one or more messages from the AP MLD 1210, where a last frame of the one or more messages indicate an end of the one or more messages, an end of the SP, or both. Additionally, or alternatively, the one or more messages (e.g., frames) may indicate or activate additional SPs (e.g., O-SPs) for communications between the devices. For example, in cases where either device has additional traffic that will not be able to be communicated during the SP (e.g., D-SP), the AP MLD 1210 may transmit a message indicating or activating an additional O-SP that will be used to communicate the additional traffic between the devices.

At 1235, the non-AP MLD 1210 may transition to an operational state associated with a lower power consumption (e.g., sleep state). In particular, the non-AP MLD 1205 may transition to a lower power operational state based on an end of the SP, based on the messages at 1230 indicating an end of the SP and/or an end of traffic to be communicated between the devices, or both.

Figure 13:
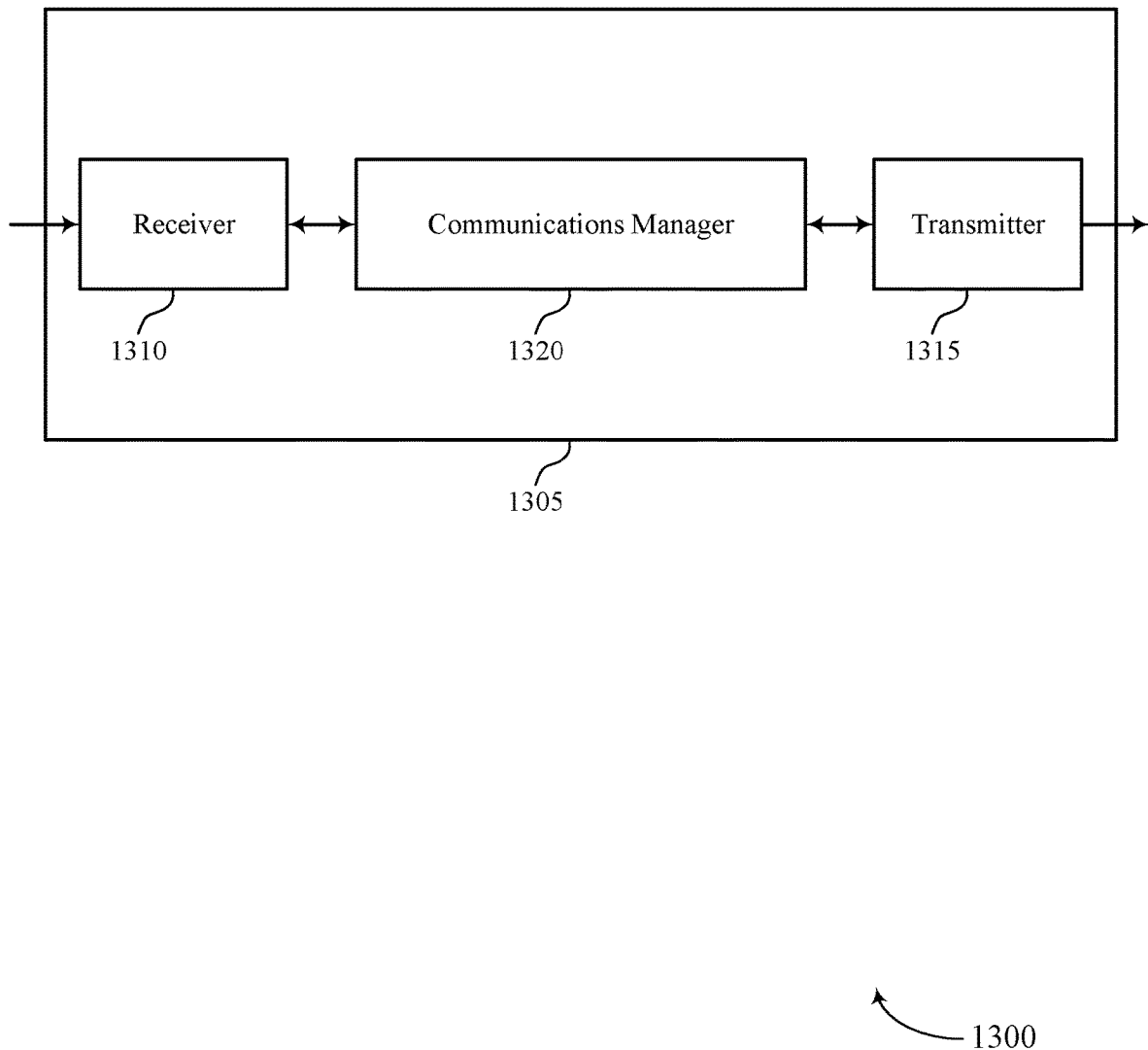
FIGS. 13 and 14 show block diagrams of devices that support beam training techniques in Wi-Fi frequency bands in accordance with one or more aspects of the present disclosure.

FIG. 13 shows a block diagram 1300 of a device 1305 that supports beam training techniques in Wi-Fi frequency bands in accordance with one or more aspects of the present disclosure. The device 1305 may be an example of aspects of an STA, an AP, or both, as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to beam training techniques in Wi-Fi frequency bands). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to beam training techniques in Wi-Fi frequency bands). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of beam training techniques in Wi-Fi frequency bands as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor.

If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a first wireless device in accordance with examples as disclosed herein. For example, the communications manager 1320 may be configured as or otherwise support a means for transmitting, to a second wireless device during an SP, an initiating frame using a transmit beam based on a first beam training procedure performed between the first wireless device and the second wireless device prior to the SP. The communications manager 1320 may be configured as or otherwise support a means for performing a second beam training procedure during the SP based on an absence of a response frame from the second wireless device, based on an indication within the response frame received from the second wireless device, or based on identification of a change in a wireless channel relative to a previous beam training interval or previous SP, the response frame being in response to the initiating frame. The communications manager 1320 may be configured as or otherwise support a means for communicating one or more messages with the second wireless device using one or more beams based on the second beam training procedure.

Additionally, or alternatively, the communications manager 1320 may support wireless communications at a first wireless device in accordance with examples as disclosed herein. For example, the communications manager 1320 may be configured as or otherwise support a means for monitoring for signals from a second wireless device during a BTI, the signals associated with a first beam training procedure between the first wireless device and the second wireless device. The communications manager 1320 may be configured as or otherwise support a means for performing a second beam training procedure during an SP in response to the signals being monitored or an absence of the signals associated with the first beam training procedure. The communications manager 1320 may be configured as or otherwise support a means for communicating one or more messages with the second wireless device using one or more beams based on the second beam training procedure.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques that enable wireless devices (e.g., AP MLD 135, non-AP MLD 130) to perform beam training procedures within an SP used for communications between the respective devices. By exchanging initiating frames and/or response frames within a SP, wireless devices (e.g., AP MLD, non-AP MLD) may be able to determine whether or not the wireless devices are expected to perform a new beam training procedure within the SP. As such, techniques described herein may enable the wireless devices to perform beam training procedures within SPs to enable more efficient and reliable wireless communications between the respective devices.

Figure 14:
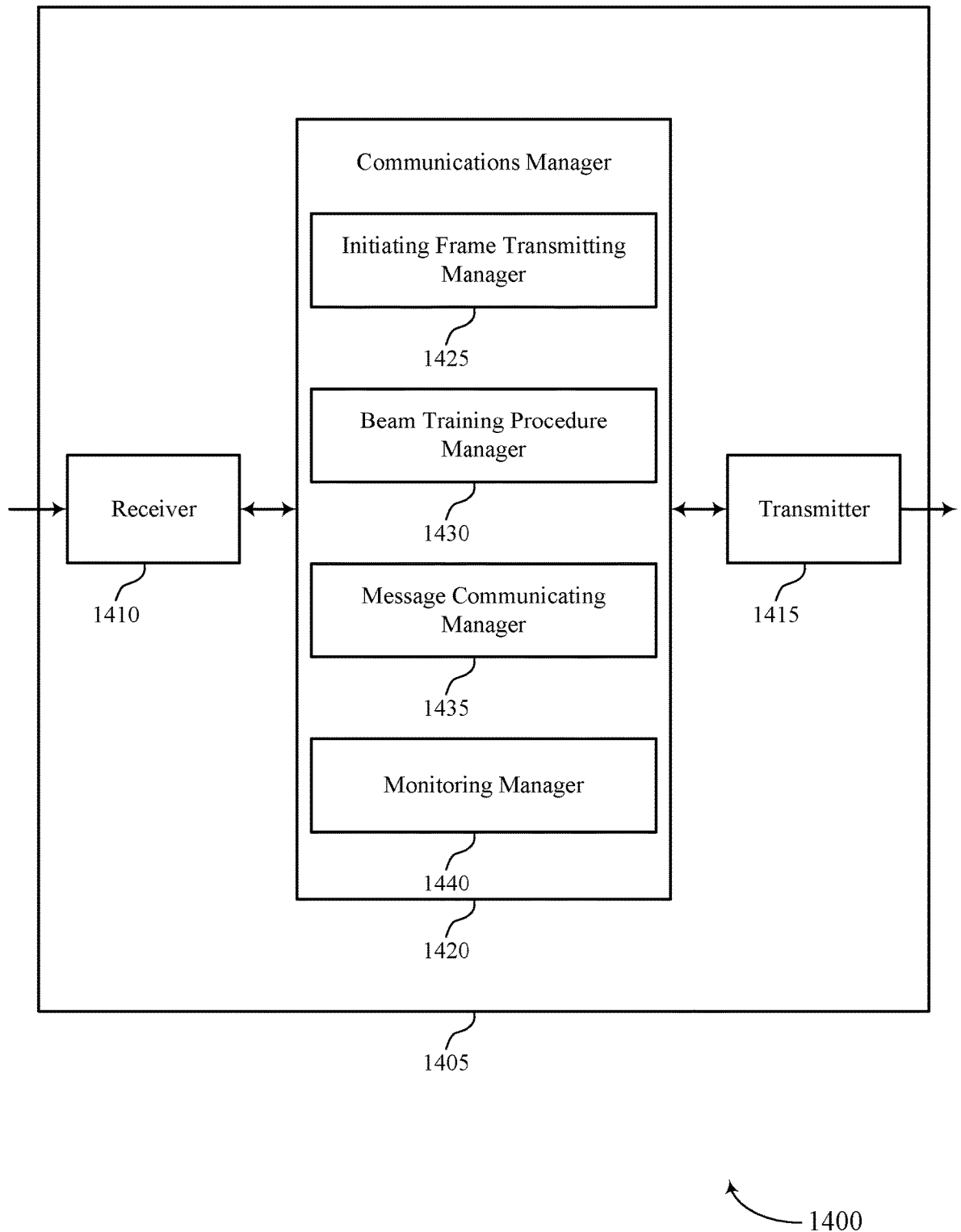

FIG. 14 shows a block diagram 1400 of a device 1405 that supports beam training techniques in Wi-Fi frequency bands in accordance with one or more aspects of the present disclosure. The device 1405 may be an example of aspects of a device 1305 or an STA 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to beam training techniques in Wi-Fi frequency bands). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to beam training techniques in Wi-Fi frequency bands). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of beam training techniques in Wi-Fi frequency bands as described herein. For example, the communications manager 1420 may include an initiating frame transmitting manager 1425, a beam training procedure manager 1430, a message communicating manager 1435, a monitoring manager 1440, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a first wireless device in accordance with examples as disclosed herein. The initiating frame transmitting manager 1425 may be configured as or otherwise support a means for transmitting, to a second wireless device during an SP, an initiating frame using a transmit beam based on a first beam training procedure performed between the first wireless device and the second wireless device prior to the SP. The beam training procedure manager 1430 may be configured as or otherwise support a means for performing a second beam training procedure during the SP based on an absence of a response frame from the second wireless device, based on an indication within the response frame received from the second wireless device, or based on identification of a change in a wireless channel relative to a previous beam training interval or previous SP, the response frame being in response to the initiating frame. The message communicating manager 1435 may be configured as or otherwise support a means for communicating one or more messages with the second wireless device using one or more beams based on the second beam training procedure.

Additionally, or alternatively, the communications manager 1420 may support wireless communications at a first wireless device in accordance with examples as disclosed herein. The monitoring manager 1440 may be configured as or otherwise support a means for monitoring for signals from a second wireless device during a BTI, the signals associated with a first beam training procedure between the first wireless device and the second wireless device. The beam training procedure manager 1430 may be configured as or otherwise support a means for performing a second beam training procedure during an SP in response to the signals being monitored or an absence of the signals associated with the first beam training procedure. The message communicating manager 1435 may be configured as or otherwise support a means for communicating one or more messages with the second wireless device using one or more beams based on the second beam training procedure.

Figure 15:
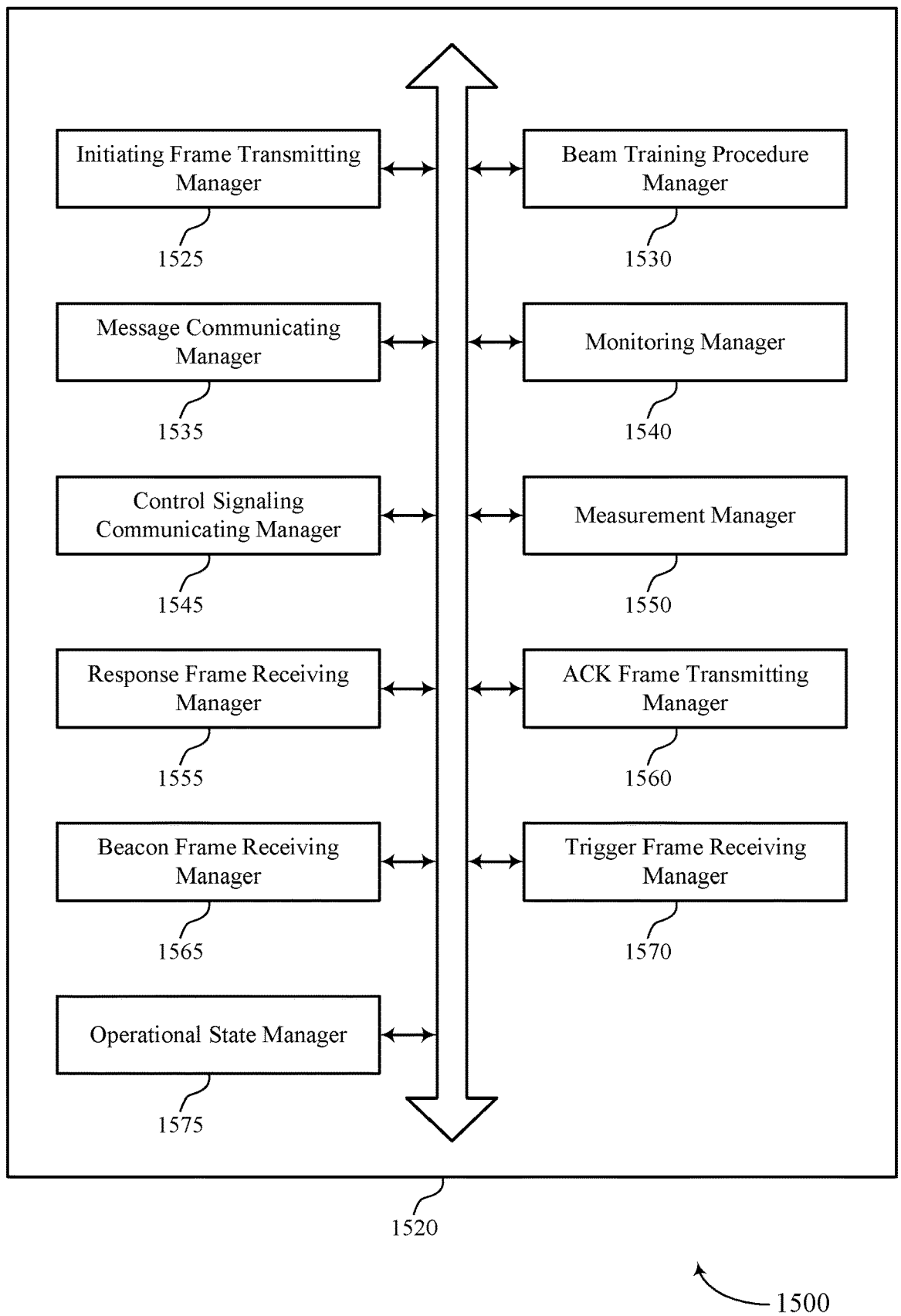
FIG. 15 shows a block diagram of a communications manager that supports beam training techniques in Wi-Fi frequency bands in accordance with one or more aspects of the present disclosure.

FIG. 15 shows a block diagram 1500 of a communications manager 1520 that supports beam training techniques in Wi-Fi frequency bands in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of beam training techniques in Wi-Fi frequency bands as described herein. For example, the communications manager 1520 may include an initiating frame transmitting manager 1525, a beam training procedure manager 1530, a message communicating manager 1535, a monitoring manager 1540, a control signaling communicating manager 1545, a measurement manager 1550, a response frame receiving manager 1555, an ACK frame transmitting manager 1560, a beacon frame receiving manager 1565, a trigger frame receiving manager 1570, an operational state manager 1575, or any combination thereof. Each of these components may communicate, directly or indirectly, with one another (e.g., via one or more buses).

The communications manager 1520 may support wireless communications at a first wireless device in accordance with examples as disclosed herein. The initiating frame transmitting manager 1525 may be configured as or otherwise support a means for transmitting, to a second wireless device during an SP, an initiating frame using a transmit beam based on a first beam training procedure performed between the first wireless device and the second wireless device prior to the SP. The beam training procedure manager 1530 may be configured as or otherwise support a means for performing a second beam training procedure during the SP based on an absence of a response frame from the second wireless device, based on an indication within the response frame received from the second wireless device, or based on identification of a change in a wireless channel relative to a previous beam training interval or previous SP, the response frame being in response to the initiating frame. The message communicating manager 1535 may be configured as or otherwise support a means for communicating one or more messages with the second wireless device using one or more beams based on the second beam training procedure.

In some examples, the control signaling communicating manager 1545 may be configured as or otherwise support a means for communicating, with the second wireless device, control signaling indicating a set of multiple SPs associated with the first wireless device, the set of multiple SPs including the SP, where the initiating frame is transmitted based on the control signaling. In some examples, the initiating frame includes an indication as to whether the first wireless device is requesting to perform the second beam training procedure with the second wireless device during the SP.

In some examples, the measurement manager 1550 may be configured as or otherwise support a means for performing one or more measurements on signals received from the second wireless device via a receive beam based on the first beam training procedure, where the initiating frame is transmitted based on whether the one or more measurements satisfy one or more thresholds.

In some examples, the initiating frame includes an indication that the first wireless device is requesting to perform the second beam training procedure based on the one or more measurements failing to satisfy the one or more thresholds. In some examples, the initiating frame includes an indication that the first wireless device is not requesting to perform the second beam training procedure based on the one or more measurements satisfying the one or more thresholds.

In some examples, the initiating frame includes a buffer status report associated with traffic to be communicated from the first wireless device to the second wireless device, and the message communicating manager 1535 may be configured as or otherwise support a means for transmitting the traffic to the second wireless device using the one or more beams and based on the buffer status report.

In some examples, the trigger frame receiving manager 1570 may be configured as or otherwise support a means for receiving, from the second wireless device, a trigger frame scheduling the traffic based on the buffer status report, where the traffic is transmitted based on the trigger frame.

In some examples, the message communicating manager 1535 may be configured as or otherwise support a means for receiving downlink traffic from the second wireless device with the trigger frame. In some examples, the one or more messages are received from the second wireless device using a receive beam based on the second beam training procedure. In some examples, a last frame of the one or more messages indicate an end of the one or more messages, an end of the SP, or both. In some examples, the first wireless device receives the one or more messages while in a first operational state associated with a first power consumption, and the operational state manager 1575 may be configured as or otherwise support a means for transitioning to a second operational state associated with a second power consumption that is less than the first power consumption based on the one or more messages indicating the end of the one or more messages, the end of the SP, or both.

In some examples, the message communicating manager 1535 may be configured as or otherwise support a means for communicating one or more additional messages with the second wireless device during a second SP using the one or more beams based on the second beam training procedure. In some examples, the one or more messages include an indication of the second SP for communications between the first wireless device and the second wireless device. In some examples, the one or more additional messages are communicated based on the indication of the second SP.

In some examples, the initiating frame includes the indication that the first wireless device is requesting to perform the second beam training procedure with the second wireless device, and the response frame receiving manager 1555 may be configured as or otherwise support a means for receiving the response frame from the second wireless device based on the initiating frame, where the response frame includes an acknowledgment of the second beam training procedure, where the second beam training procedure is performed based on the acknowledgment.

In some examples, the initiating frame includes the indication that the first wireless device is requesting to perform the second beam training procedure with the second wireless device, and the response frame receiving manager 1555 may be configured as or otherwise support a means for identifying the absence of the response frame from the second wireless device based on the initiating frame. In some examples, the initiating frame includes the indication that the first wireless device is requesting to perform the second beam training procedure with the second wireless device, and the monitoring manager 1540 may be configured as or otherwise support a means for monitoring for signals from the second wireless device as part of the second beam training procedure based on the absence of the response frame.

In some examples, the response frame receiving manager 1555 may be configured as or otherwise support a means for receiving, via the response frame, an indication that the second wireless device is requesting to perform the second beam training procedure with the first wireless device, where the second beam training procedure is performed based on receiving the response frame.

In some examples, the initiating frame transmitting manager 1525 may be configured as or otherwise support a means for identifying that a quantity of failed frame exchanges between the first wireless device and the second wireless device satisfies a threshold quantity based on transmitting the initiating frame, where the second beam training procedure is performed based on the identifying.

In some examples, the response frame receiving manager 1555 may be configured as or otherwise support a means for receiving the response frame based on the initiating frame being transmitted. In some examples, the ACK frame transmitting manager 1560 may be configured as or otherwise support a means for transmitting, to the second wireless device, an ACK frame based on the response frame, where the second beam training procedure is performed based on the ACK frame.

In some examples, the initiating frame includes a QoS null frame including a control field, the control field including a buffer status report, the indication as to whether the first wireless device is requesting to perform the second beam training procedure, or both. In some examples, the first wireless device includes an STA, a first MLD, or both. In some examples, the second wireless device includes an AP, a second MLD, or both. In some examples, the first wireless device includes the AP and. In some examples, the second wireless device includes the STA.

Additionally, or alternatively, the communications manager 1520 may support wireless communications at a first wireless device in accordance with examples as disclosed herein. The monitoring manager 1540 may be configured as or otherwise support a means for monitoring for signals from a second wireless device during a BTI, the signals associated with a first beam training procedure between the first wireless device and the second wireless device. In some examples, the beam training procedure manager 1530 may be configured as or otherwise support a means for performing a second beam training procedure during an SP in response to the signals being monitored or an absence of the signals associated with the first beam training procedure. In some examples, the message communicating manager 1535 may be configured as or otherwise support a means for communicating one or more messages with the second wireless device using one or more beams based on the second beam training procedure.

In some examples, to support monitoring, the monitoring manager 1540 may be configured as or otherwise support a means for monitoring for a beacon frame in a beamformed mode.

In some examples, the beacon frame receiving manager 1565 may be configured as or otherwise support a means for receiving a beacon frame from the second wireless device based on the signals being monitored, the beacon frame associated with the first beam training procedure. In some examples, the initiating frame transmitting manager 1525 may be configured as or otherwise support a means for refraining from transmission of an initiating frame within the SP based on the beam training procedure including an initial beam training procedure between the first wireless device and the second wireless device, where the second beam training procedure is performed based on the initiating frame being refrained from transmission.

In some examples, the initiating frame transmitting manager 1525 may be configured as or otherwise support a means for identifying an absence of an initiating frame communicated between the first wireless device and the second wireless device within the SP, where the second beam training procedure is performed based on the absence of the initiating frame.

Figure 16:
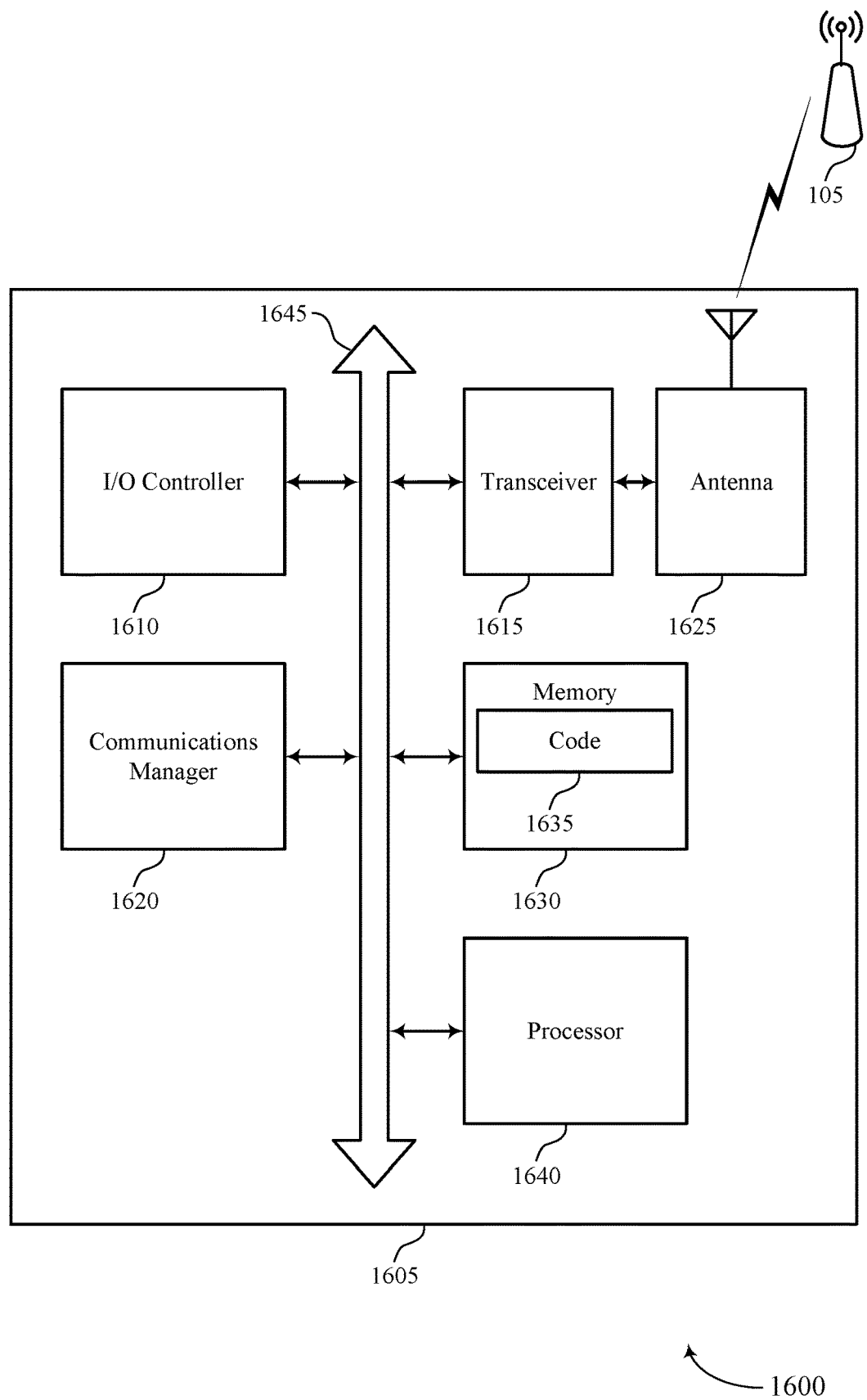
FIG. 16 shows a diagram of a system including a device that supports beam training techniques in Wi-Fi frequency bands in accordance with one or more aspects of the present disclosure.

FIG. 16 shows a diagram of a system 1600 including a device 1605 that supports beam training techniques in Wi-Fi frequency bands in accordance with one or more aspects of the present disclosure. The device 1605 may be an example of or include the components of a device 1305, a device 1405, an STA, an AP, or any combination thereof, as described herein. The device 1605 may include components for bi-directional voice and data communications including components for transmitting and receiving communications, such as a communications manager 1620, an I/O controller 1610, a transceiver 1615, an antenna 1625, a memory 1630, code 1635, and a processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. In some other cases, the I/O controller 1610 may represent or interact with a modem, a keyboard, a mouse, a touchscreen, or a similar device. In some cases, the I/O controller 1610 may be implemented as part of a processor, such as the processor 1640. In some cases, a user may interact with the device 1605 via the I/O controller 1610 or via hardware components controlled by the I/O controller 1610.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets and provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting beam training techniques in Wi-Fi frequency bands). For example, the device 1605 or a component of the device 1605 may include a processor 1640 and memory 1630 coupled with or to the processor 1640, the processor 1640 and memory 1630 configured to perform various functions described herein.

The communications manager 1620 may support wireless communications at a first wireless device in accordance with examples as disclosed herein. For example, the communications manager 1620 may be configured as or otherwise support a means for transmitting, to a second wireless device during an SP, an initiating frame using a transmit beam based on a first beam training procedure performed between the first wireless device and the second wireless device prior to the SP. The communications manager 1620 may be configured as or otherwise support a means for performing a second beam training procedure during the SP based on an absence of a response frame from the second wireless device, based on an indication within the response frame received from the second wireless device, or based on identification of a change in a wireless channel relative to a previous beam training interval or previous SP, the response frame being in response to the initiating frame. The communications manager 1620 may be configured as or otherwise support a means for communicating one or more messages with the second wireless device using one or more beams based on the second beam training procedure.

Additionally, or alternatively, the communications manager 1620 may support wireless communications at a first wireless device in accordance with examples as disclosed herein. For example, the communications manager 1620 may be configured as or otherwise support a means for monitoring for signals from a second wireless device during a BTI, the signals associated with a first beam training procedure between the first wireless device and the second wireless device. The communications manager 1620 may be configured as or otherwise support a means for performing a second beam training procedure during an SP in response to the signals being monitored or an absence of the signals associated with the first beam training procedure. The communications manager 1620 may be configured as or otherwise support a means for communicating one or more messages with the second wireless device using one or more beams based on the second beam training procedure.

By including or configuring the communications manager 1620 in accordance with examples as described herein, the device 1605 may support techniques that enable wireless devices (e.g., AP MLD 135, non-AP MLD 130) to perform beam training procedures within an SP used for communications between the respective devices. By exchanging initiating frames and/or response frames within a SP, wireless devices (e.g., AP MLD, non-AP MLD) may be able to determine whether or not the wireless devices are expected to perform a new beam training procedure within the SP. As such, techniques described herein may enable the wireless devices to perform beam training procedures within SPs to enable more efficient and reliable wireless communications between the respective devices.

Figure 17:
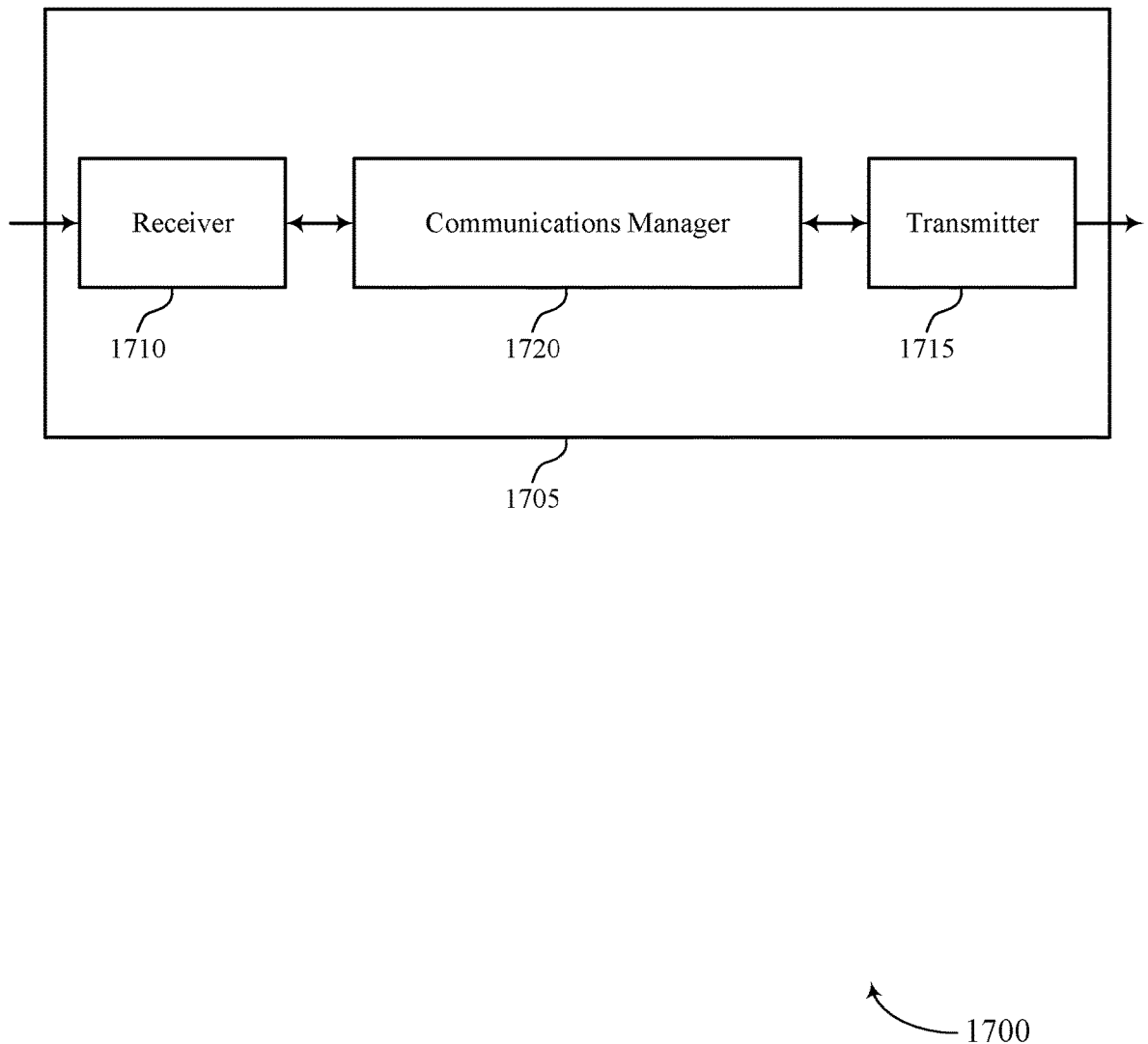
FIGS. 17 and 18 show block diagrams of devices that support beam training techniques in Wi-Fi frequency bands in accordance with one or more aspects of the present disclosure.

FIG. 17 shows a block diagram 1700 of a device 1705 that supports beam training techniques in Wi-Fi frequency bands in accordance with one or more aspects of the present disclosure. The device 1705 may be an example of aspects of an AP, an STA, or both, as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for receiving information such as packets, user data, control information, or any combination thereof associated with various information channels (e.g., control channels, data channels, information channels related to beam training techniques in Wi-Fi frequency bands). Information may be passed on to other components of the device 1705. The receiver 1710 may utilize a single antenna or a set of multiple antennas.

The transmitter 1715 may provide a means for transmitting signals generated by other components of the device 1705. The transmitter 1715 may utilize a single antenna or a set of multiple antennas.

The communications manager 1720, the receiver 1710, the transmitter 1715, or various combinations thereof or various components thereof may be examples of means for performing various aspects of beam training techniques in Wi-Fi frequency bands as described herein. For example, the communications manager 1720, the receiver 1710, the transmitter 1715, or various combinations or components thereof may support a method for performing one or more of the functions described herein.

In some examples, the communications manager 1720, the receiver 1710, the transmitter 1715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1720, the receiver 1710, the transmitter 1715, or various combinations or components thereof may be implemented in code (e.g., as communications management software or firmware) executed by a processor. If implemented in code executed by a processor, the functions of the communications manager 1720, the receiver 1710, the transmitter 1715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1720 may be configured to perform various operations (e.g., receiving, obtaining, monitoring, outputting, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to obtain information, output information, or perform various other operations as described herein.

The communications manager 1720 may support wireless communications at a first wireless device in accordance with examples as disclosed herein. For example, the communications manager 1720 may be configured as or otherwise support a means for monitoring for an initiating frame from a second wireless device during an SP, where the initiating frame is monitored using a receive beam based on a first beam training procedure performed between the first wireless device and the second wireless device prior to the SP. The communications manager 1720 may be configured as or otherwise support a means for performing a second beam training procedure during the SP based on an absence of the initiating frame, based on the initiating frame being received and including an indication that the second wireless device is requesting to perform a second beam training procedure with the first wireless device, or based on identification of a change in a wireless channel during a previous beam training interval or previous SP. The communications manager 1720 may be configured as or otherwise support a means for communicating one or more messages with the second wireless device using one or more beams based on the second beam training procedure.

By including or configuring the communications manager 1720 in accordance with examples as described herein, the device 1705 (e.g., a processor controlling or otherwise coupled with the receiver 1710, the transmitter 1715, the communications manager 1720, or a combination thereof) may support techniques that enable wireless devices (e.g., AP MLD 135, non-AP MLD 130) to perform beam training procedures within an SP used for communications between the respective devices. By exchanging initiating frames and/or response frames within a SP, wireless devices (e.g., AP MLD, non-AP MLD) may be able to determine whether or not the wireless devices are expected to perform a new beam training procedure within the SP. As such, techniques described herein may enable the wireless devices to perform beam training procedures within SPs to enable more efficient and reliable wireless communications between the respective devices.

Figure 18:
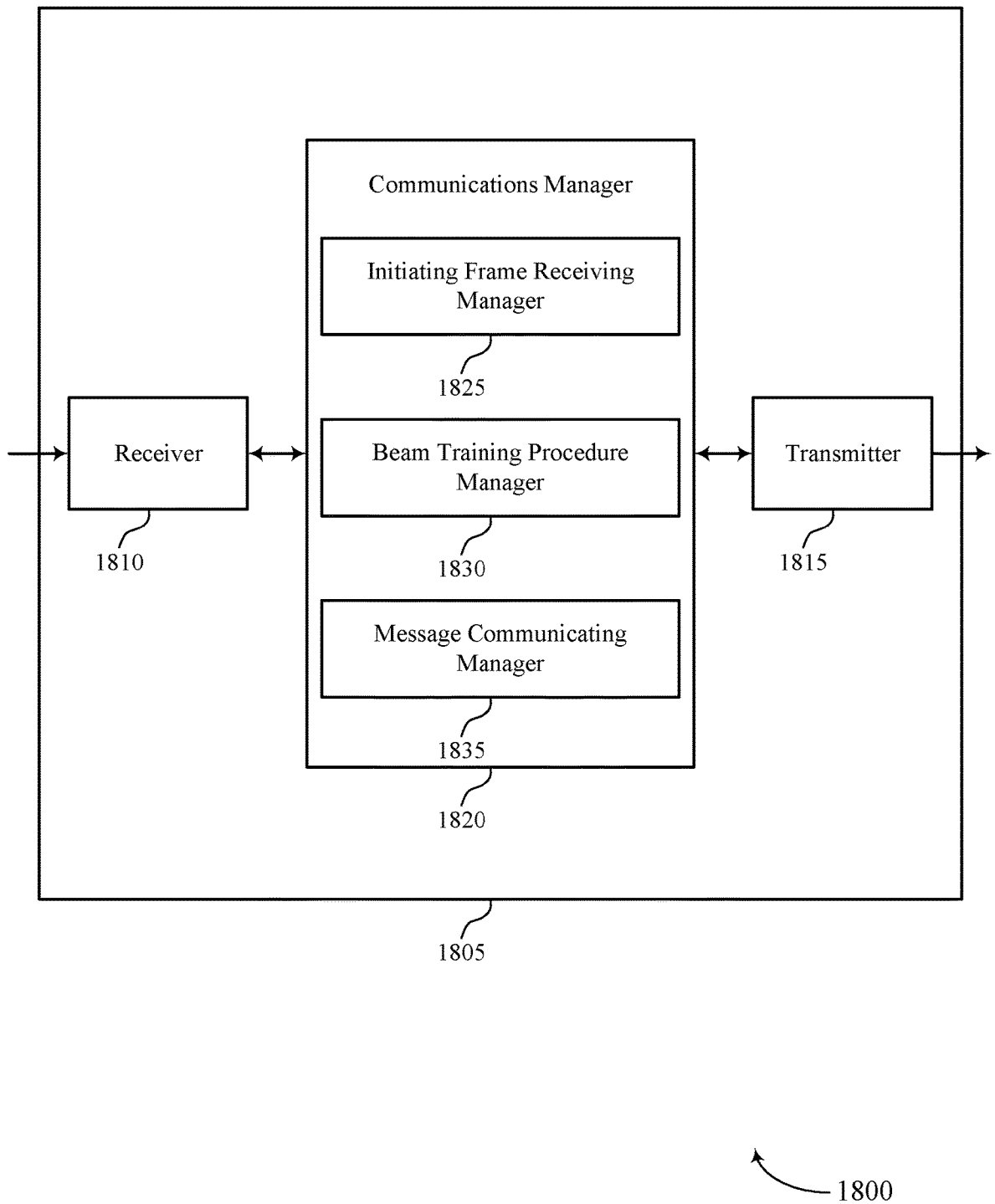

FIG. 18 shows a block diagram 1800 of a device 1805 that supports beam training techniques in Wi-Fi frequency bands in accordance with one or more aspects of the present disclosure. The device 1805 may be an example of aspects of a device 1705, an AP, and/or an STA as described herein. The device 1805 may include a receiver 1810, a transmitter 1815, and a communications manager 1820. The device 1805 may also include a processor. Each of these components may be in communication with one another (e.g., via one or more buses).

The receiver 1810 may provide a means for receiving information such as packets, user data, control information, or any combination thereof associated with various information channels (e.g., control channels, data channels, information channels related to beam training techniques in Wi-Fi frequency bands). Information may be passed on to other components of the device 1805. The receiver 1810 may utilize a single antenna or a set of multiple antennas.

The transmitter 1815 may provide a means for transmitting signals generated by other components of the device 1805. The transmitter 1815 may utilize a single antenna or a set of multiple antennas.

The device 1805, or various components thereof, may be an example of means for performing various aspects of beam training techniques in Wi-Fi frequency bands as described herein. For example, the communications manager 1820 may include an initiating frame receiving manager 1825, a beam training procedure manager 1830, a message communicating manager 1835, or any combination thereof. The communications manager 1820 may be an example of aspects of a communications manager 1720 as described herein. In some examples, the communications manager 1820, or various components thereof, may be configured to perform various operations (e.g., receiving, obtaining, monitoring, outputting, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to obtain information, output information, or perform various other operations as described herein.

The communications manager 1820 may support wireless communications at a first wireless device in accordance with examples as disclosed herein. The initiating frame receiving manager 1825 may be configured as or otherwise support a means for monitoring for an initiating frame from a second wireless device during an SP, where the initiating frame is monitored using a receive beam based on a first beam training procedure performed between the first wireless device and the second wireless device prior to the SP. The beam training procedure manager 1830 may be configured as or otherwise support a means for performing a second beam training procedure during the SP based on an absence of the initiating frame, based on the initiating frame being received and including an indication that the second wireless device is requesting to perform a second beam training procedure with the first wireless device, or based on identification of a change in a wireless channel during a previous beam training interval or previous SP. The message communicating manager 1835 may be configured as or otherwise support a means for communicating one or more messages with the second wireless device using one or more beams based on the second beam training procedure.

Figure 19:
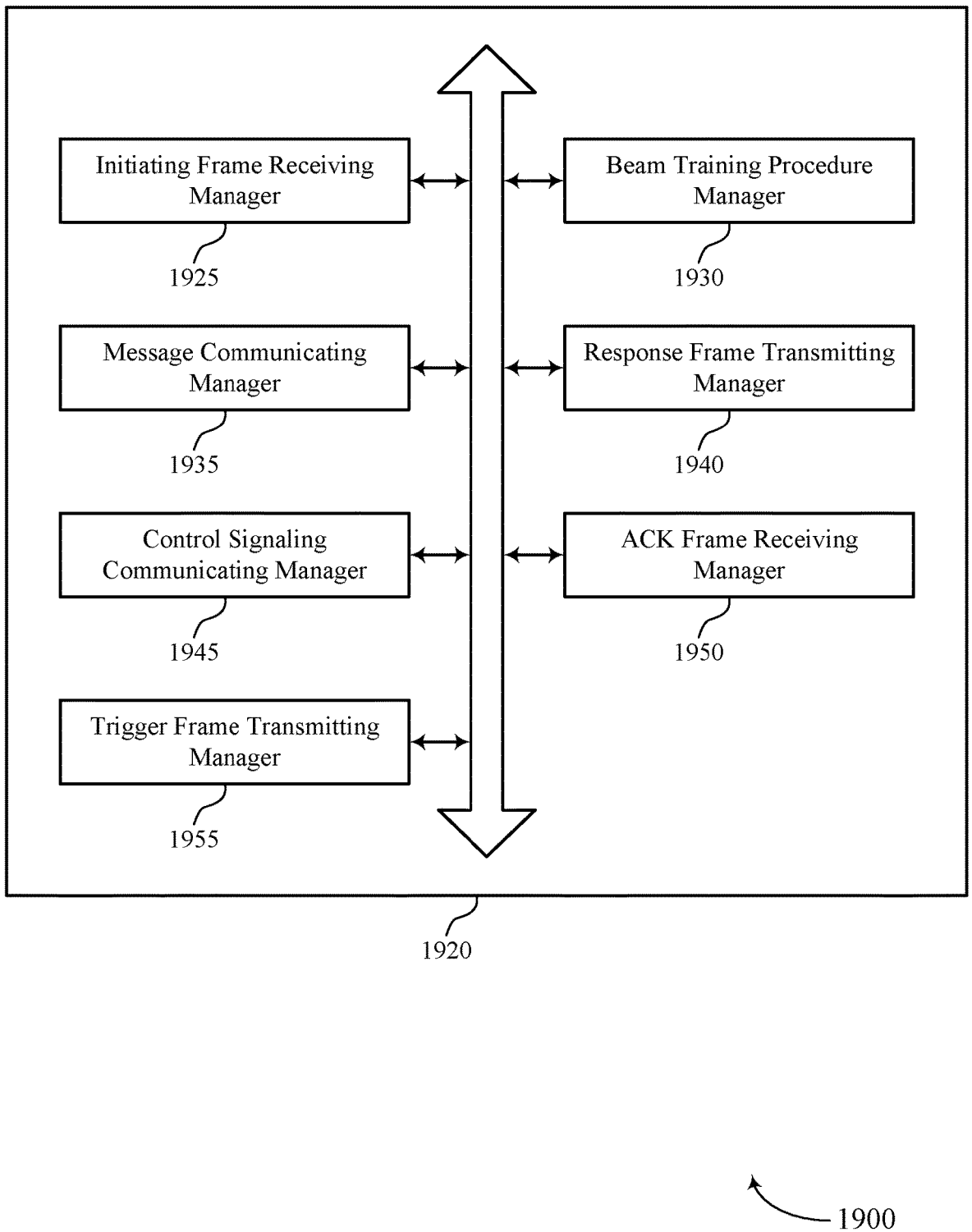
FIG. 19 shows a block diagram of a communications manager that supports beam training techniques in Wi-Fi frequency bands in accordance with one or more aspects of the present disclosure.

FIG. 19 shows a block diagram 1900 of a communications manager 1920 that supports beam training techniques in Wi-Fi frequency bands in accordance with one or more aspects of the present disclosure. The communications manager 1920 may be an example of aspects of a communications manager 1720, a communications manager 1820, or both, as described herein. The communications manager 1920, or various components thereof, may be an example of means for performing various aspects of beam training techniques in Wi-Fi frequency bands as described herein. For example, the communications manager 1920 may include an initiating frame receiving manager 1925, a beam training procedure manager 1930, a message communicating manager 1935, a response frame transmitting manager 1940, a control signaling communicating manager 1945, an ACK frame receiving manager 1950, a trigger frame transmitting manager 1955, or any combination thereof. Each of these components may communicate, directly or indirectly, with one another (e.g., via one or more buses).

The communications manager 1920 may support wireless communications at a first wireless device in accordance with examples as disclosed herein. The initiating frame receiving manager 1925 may be configured as or otherwise support a means for monitoring for an initiating frame from a second wireless device during an SP, where the initiating frame is monitored using a receive beam based on a first beam training procedure performed between the first wireless device and the second wireless device prior to the SP. The beam training procedure manager 1930 may be configured as or otherwise support a means for performing a second beam training procedure during the SP based on an absence of the initiating frame, based on the initiating frame being received and including an indication that the second wireless device is requesting to perform a second beam training procedure with the first wireless device, or based on identification of a change in a wireless channel during a previous beam training interval or previous SP. The message communicating manager 1935 may be configured as or otherwise support a means for communicating one or more messages with the second wireless device using one or more beams based on the second beam training procedure.

In some examples, the initiating frame receiving manager 1925 may be configured as or otherwise support a means for receiving the initiating frame. In some examples, the response frame transmitting manager 1940 may be configured as or otherwise support a means for transmitting a response frame to the second wireless device based on the initiating frame, where the second beam training procedure is performed based on the response frame being transmitted.

In some examples, the initiating frame receiving manager 1925 may be configured as or otherwise support a means for identifying an absence of the initiating frame from the second wireless device based on the initiating frame being monitored, where the second beam training procedure is performed based on the absence of the initiating frame.

In some examples, the control signaling communicating manager 1945 may be configured as or otherwise support a means for communicating, with the second wireless device, control signaling indicating a set of multiple SPs associated with the first wireless device, the set of multiple SPs including the SP, where the initiating frame is monitored for based on the control signaling.

In some examples, the initiating frame includes an indication as to whether the second wireless device is requesting to perform the second beam training procedure with the first wireless device during the SP.

In some examples, the initiating frame receiving manager 1925 may be configured as or otherwise support a means for receiving, via the initiating frame and based on the monitoring, a buffer status report associated with traffic to be communicated from the second wireless device to the first wireless device. In some examples, the message communicating manager 1935 may be configured as or otherwise support a means for receiving the traffic from the second wireless device using the one or more beams and based on the buffer status report.

In some examples, the trigger frame transmitting manager 1955 may be configured as or otherwise support a means for transmitting, to the second wireless device, a trigger frame scheduling the traffic based on the buffer status report, where the traffic is received based on the trigger frame.

In some examples, the message communicating manager 1935 may be configured as or otherwise support a means for transmitting downlink traffic from the second wireless device along with the trigger frame. In some examples, a last frame of the one or more messages indicate an end of the one or more messages, an end of the SP, or both.

In some examples, the one or more messages include an indication of a second SP for communications between the first wireless device and the second wireless device, and the message communicating manager 1935 may be configured as or otherwise support a means for communicating one or more additional messages with the second wireless device during the second SP using the one or more beams based on the second beam training procedure.

In some examples, the initiating frame receiving manager 1925 may be configured as or otherwise support a means for receiving, via the initiating frame and based on the monitoring, the indication that the second wireless device is requesting to perform the second beam training procedure with the second wireless device. In some examples, the response frame transmitting manager 1940 may be configured as or otherwise support a means for transmitting a response frame to the second wireless device based on the initiating frame, where the response frame includes an acknowledgment of the second beam training procedure, where the second beam training procedure is performed based on the acknowledgment.

In some examples, the response frame transmitting manager 1940 may be configured as or otherwise support a means for transmitting a response frame based at last in part on receiving the initiating frame, where the response frame includes an indication that the first wireless device is requesting to perform the second beam training procedure with the second wireless device, where the second beam training procedure is performed based on transmitting the response frame.

In some examples, the initiating frame receiving manager 1925 may be configured as or otherwise support a means for identifying that a quantity of failed frame exchanges between the first wireless device and the second wireless device satisfies a threshold quantity based on the monitoring, where the second beam training procedure is performed based on the identifying.

In some examples, the response frame transmitting manager 1940 may be configured as or otherwise support a means for transmitting a response frame based on receiving the initiating frame. In some examples, the ACK frame receiving manager 1950 may be configured as or otherwise support a means for receiving, from the second wireless device, an ACK frame based on transmitting the response frame, where the second beam training procedure is performed based on receiving the ACK frame.

In some examples, the initiating frame includes a QoS null frame including a control field, the control field including a buffer status report, the indication as to whether the first wireless device is requesting to perform the second beam training procedure, or both. In some examples, the first wireless device includes an STA, a first MLD, or both. In some examples, the second wireless device includes an AP, a second MLD, or both. In some examples, the first wireless device includes the AP and. In some examples, the second wireless device includes the STA.

Figure 20:
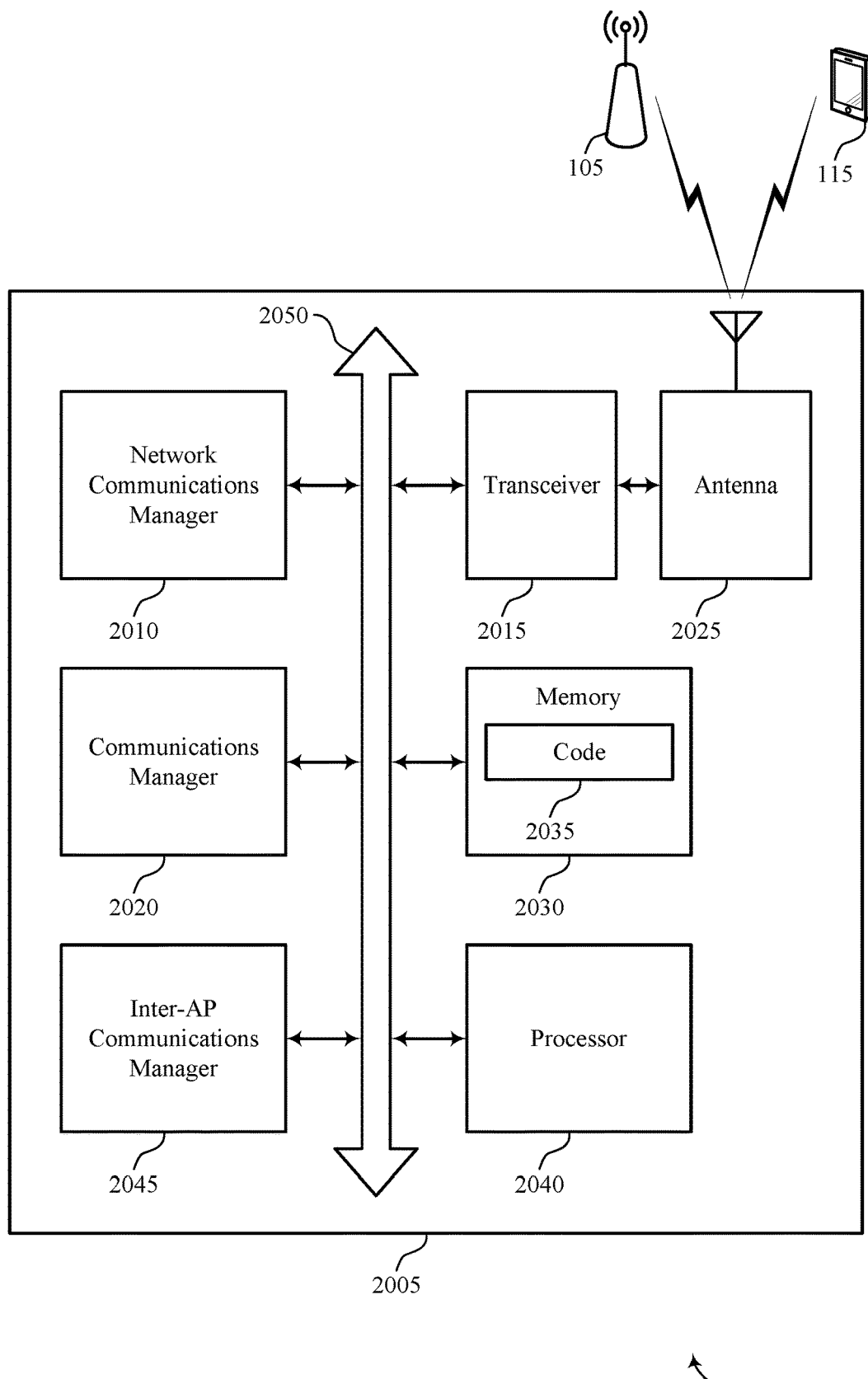
FIG. 20 shows a diagram of a system including a device that supports beam training techniques in Wi-Fi frequency bands in accordance with one or more aspects of the present disclosure.

FIG. 20 shows a diagram of a system 2000 including a device 2005 that supports beam training techniques in Wi-Fi frequency bands in accordance with one or more aspects of the present disclosure. The device 2005 may be an example of or include the components of a device 1705, a device 1805, or an AP as described herein. The device 2005 may include components for bi-directional voice and data communications including components for transmitting and receiving communications, such as a communications manager 2020, a network communications manager 2010, a transceiver 2015, an antenna 2025, a memory 2030, code 2035, a processor 2040, and an inter-AP communications manager 2045. These components may be in electronic communication or otherwise coupled (e.g., operatively, communicatively, functionally, electronically, electrically) via one or more buses (e.g., a bus 2050).

The network communications manager 2010 may manage communications with a core network (e.g., via one or more wired backhaul links). For example, the network communications manager 2010 may manage the transfer of data communications for client devices, such as one or more STAs 115.

In some cases, the device 2005 may include a single antenna 2025. However, in some other cases the device 2005 may have more than one antenna 2025, which may be capable of concurrently transmitting or receiving multiple wireless transmissions. The transceiver 2015 may communicate bi-directionally, via the one or more antennas 2025, wired, or wireless links as described herein. For example, the transceiver 2015 may represent a wireless transceiver and may communicate bi-directionally with another wireless transceiver. The transceiver 2015 may also include a modem to modulate the packets and provide the modulated packets to one or more antennas 2025 for transmission, and to demodulate packets received from the one or more antennas 2025. The transceiver 2015, or the transceiver 2015 and one or more antennas 2025, may be an example of a transmitter 1715, a transmitter 1815, a receiver 1710, a receiver 1810, or any combination thereof or component thereof, as described herein.

The memory 2030 may include RAM and ROM. The memory 2030 may store computer-readable, computer-executable code 2035 including instructions that, when executed by the processor 2040, cause the device 2005 to perform various functions described herein. In some cases, the memory 2030 may contain, among other things, a BIOS which may control basic hardware or software operation such as the interaction with peripheral components or devices.

The processor 2040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In some other cases, a memory controller may be integrated into the processor 2040. The processor 2040 may be configured to execute computer-readable instructions stored in a memory (e.g., the memory 2030) to cause the device 2005 to perform various functions (e.g., functions or tasks supporting beam training techniques in Wi-Fi frequency bands). For example, the device 2005 or a component of the device 2005 may include a processor 2040 and memory 2030 coupled with or to the processor 2040, the processor 2040 and memory 2030 configured to perform various functions described herein.

The inter-station communications manager 2045 may manage communications with other APs 105, and may include a controller or scheduler for controlling communications with STAs 115 in cooperation with other APs 105. For example, the inter-station communications manager 2045 may coordinate scheduling for transmissions to APs 105 for various interference mitigation techniques such as beamforming or joint transmission. In some examples, the inter-station communications manager 2045 may provide an X2 interface within an LTE/LTE-A wireless communication network technology to provide communication between APs 105.

The communications manager 2020 may support wireless communications at a first wireless device in accordance with examples as disclosed herein. For example, the communications manager 2020 may be configured as or otherwise support a means for monitoring for an initiating frame from a second wireless device during an SP, where the initiating frame is monitored using a receive beam based on a first beam training procedure performed between the first wireless device and the second wireless device prior to the SP. The communications manager 2020 may be configured as or otherwise support a means for performing a second beam training procedure during the SP based on an absence of the initiating frame, based on the initiating frame being received and including an indication that the second wireless device is requesting to perform a second beam training procedure with the first wireless device, or based on identification of a change in a wireless channel during a previous beam training interval or previous SP. The communications manager 2020 may be configured as or otherwise support a means for communicating one or more messages with the second wireless device using one or more beams based on the second beam training procedure.

By including or configuring the communications manager 2020 in accordance with examples as described herein, the device 2005 may support techniques that enable wireless devices (e.g., AP MLD 135, non-AP MLD 130) to perform beam training procedures within an SP used for communications between the respective devices. By exchanging initiating frames and/or response frames within a SP, wireless devices (e.g., AP MLD, non-AP MLD) may be able to determine whether or not the wireless devices are expected to perform a new beam training procedure within the SP. As such, techniques described herein may enable the wireless devices to perform beam training procedures within SPs to enable more efficient and reliable wireless communications between the respective devices.

Figure 21:
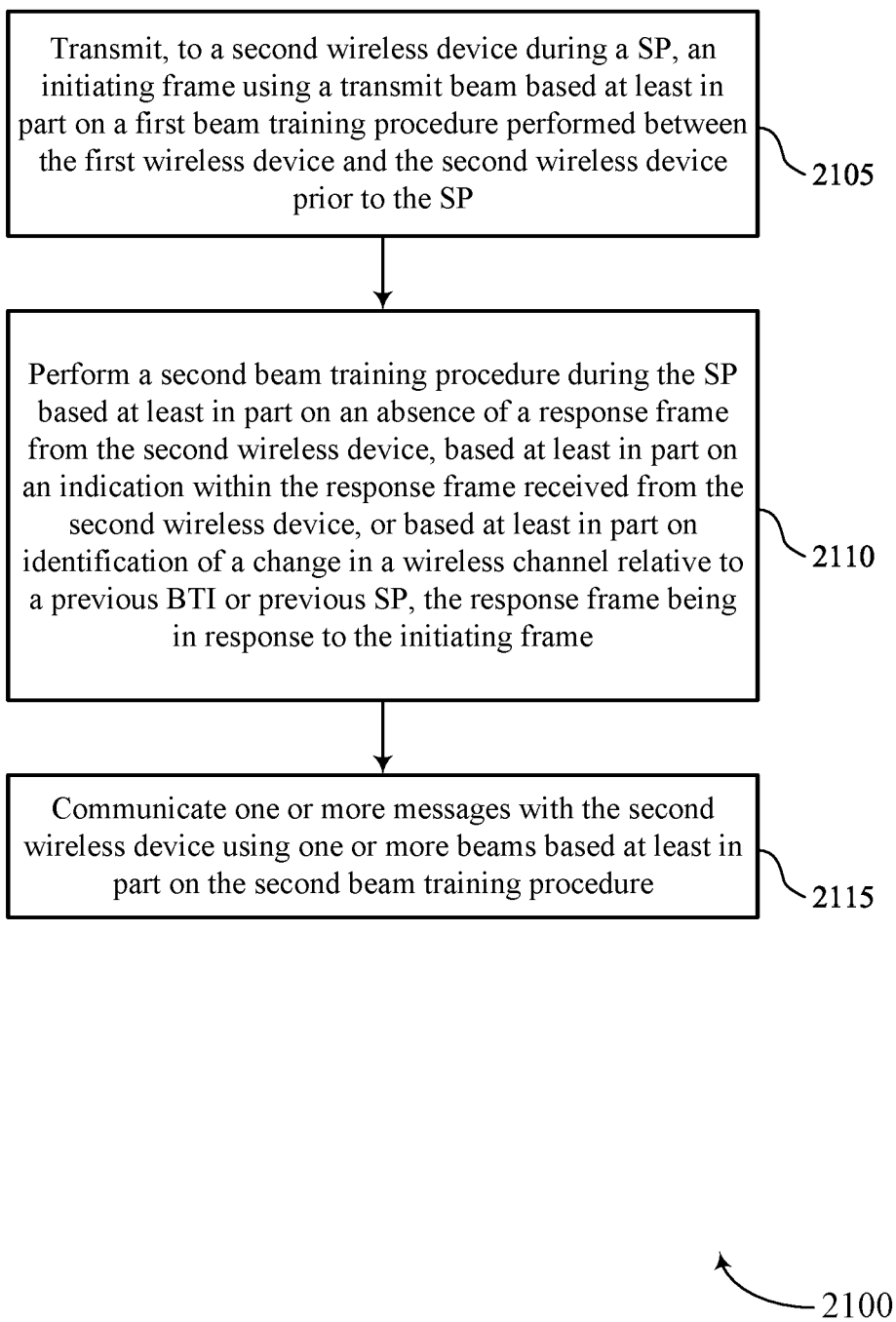
FIGS. 21 through 23 show flowcharts illustrating methods that support beam training techniques in Wi-Fi frequency bands in accordance with one or more aspects of the present disclosure.

FIG. 21 shows a flowchart illustrating a method 2100 that supports beam training techniques in Wi-Fi frequency bands in accordance with one or more aspects of the present disclosure. The operations of the method 2100 may be implemented by an STA or its components as described herein. For example, the operations of the method 2100 may be performed by an STA as described with reference to FIGS. FIG. 1 through 16. In some examples, an STA may execute a set of instructions to control the functional elements of the STA to perform the described functions.

Additionally, or alternatively, the STA may perform aspects of the described functions using special-purpose hardware.

At 2105, the method may include transmitting, to a second wireless device during an SP, an initiating frame using a transmit beam based on a first beam training procedure performed between the first wireless device and the second wireless device prior to the SP. The operations of 2105 may be performed in accordance with examples as disclosed herein. In some examples, aspects of the operations of 2105 may be performed by an initiating frame transmitting manager 1525 as described with reference to FIG. 15.

At 2110, the method may include performing a second beam training procedure during the SP based on an absence of a response frame from the second wireless device, based on an indication within the response frame received from the second wireless device, or based on identification of a change in a wireless channel relative to a previous beam training interval or previous SP, the response frame being in response to the initiating frame. The operations of 2110 may be performed in accordance with examples as disclosed herein. In some examples, aspects of the operations of 2110 may be performed by a beam training procedure manager 1530 as described with reference to FIG. 15.

At 2115, the method may include communicating one or more messages with the second wireless device using one or more beams based on the second beam training procedure. The operations of 2115 may be performed in accordance with examples as disclosed herein. In some examples, aspects of the operations of 2115 may be performed by a message communicating manager 1535 as described with reference to FIG. 15.

Figure 22:
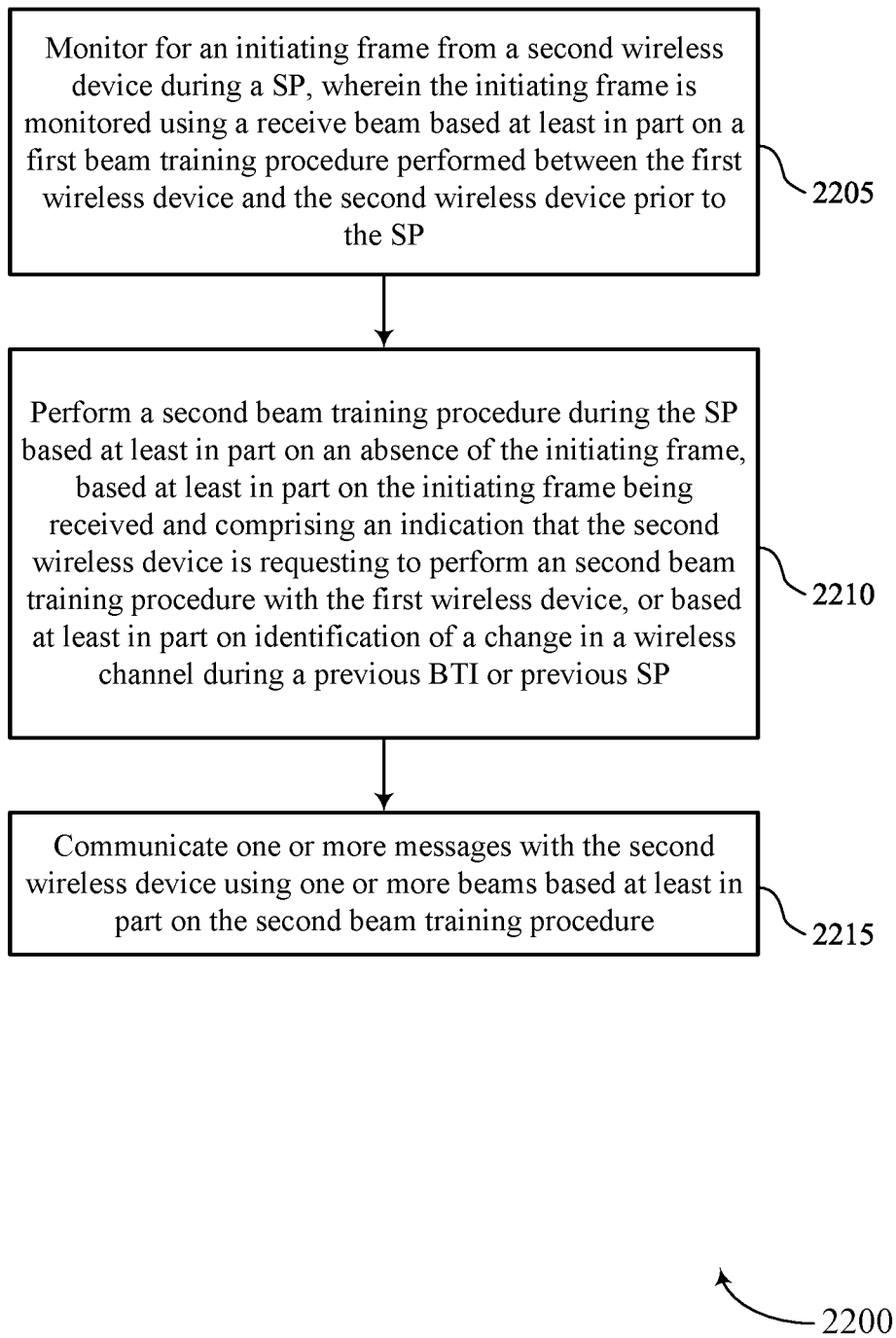

FIG. 22 shows a flowchart illustrating a method 2200 that supports beam training techniques in Wi-Fi frequency bands in accordance with one or more aspects of the present disclosure. The operations of the method 2200 may be implemented by an AP or its components as described herein. For example, the operations of the method 2200 may be performed by an AP as described with reference to FIGS. FIGS. 1 through 12 and 17 through 20. In some examples, an AP may execute a set of instructions to control the functional elements of the AP to perform the described functions. Additionally, or alternatively, the AP may perform aspects of the described functions using special-purpose hardware.

At 2205, the method may include monitoring for an initiating frame from a second wireless device during an SP, where the initiating frame is monitored using a receive beam based on a first beam training procedure performed between the first wireless device and the second wireless device prior to the SP. The operations of 2205 may be performed in accordance with examples as disclosed herein. In some examples, aspects of the operations of 2205 may be performed by an initiating frame receiving manager 1925 as described with reference to FIG. 19.

At 2210, the method may include performing a second beam training procedure during the SP based on an absence of the initiating frame, based on the initiating frame being received and including an indication that the second wireless device is requesting to perform a second beam training procedure with the first wireless device, or based on identification of a change in a wireless channel during a previous beam training interval or previous SP. The operations of 2210 may be performed in accordance with examples as disclosed herein. In some examples, aspects of the operations of 2210 may be performed by a beam training procedure manager 1930 as described with reference to FIG. 19.

At 2215, the method may include communicating one or more messages with the second wireless device using one or more beams based on the second beam training procedure. The operations of 2215 may be performed in accordance with examples as disclosed herein. In some examples, aspects of the operations of 2215 may be performed by a message communicating manager 1935 as described with reference to FIG. 19.

Figure 23:
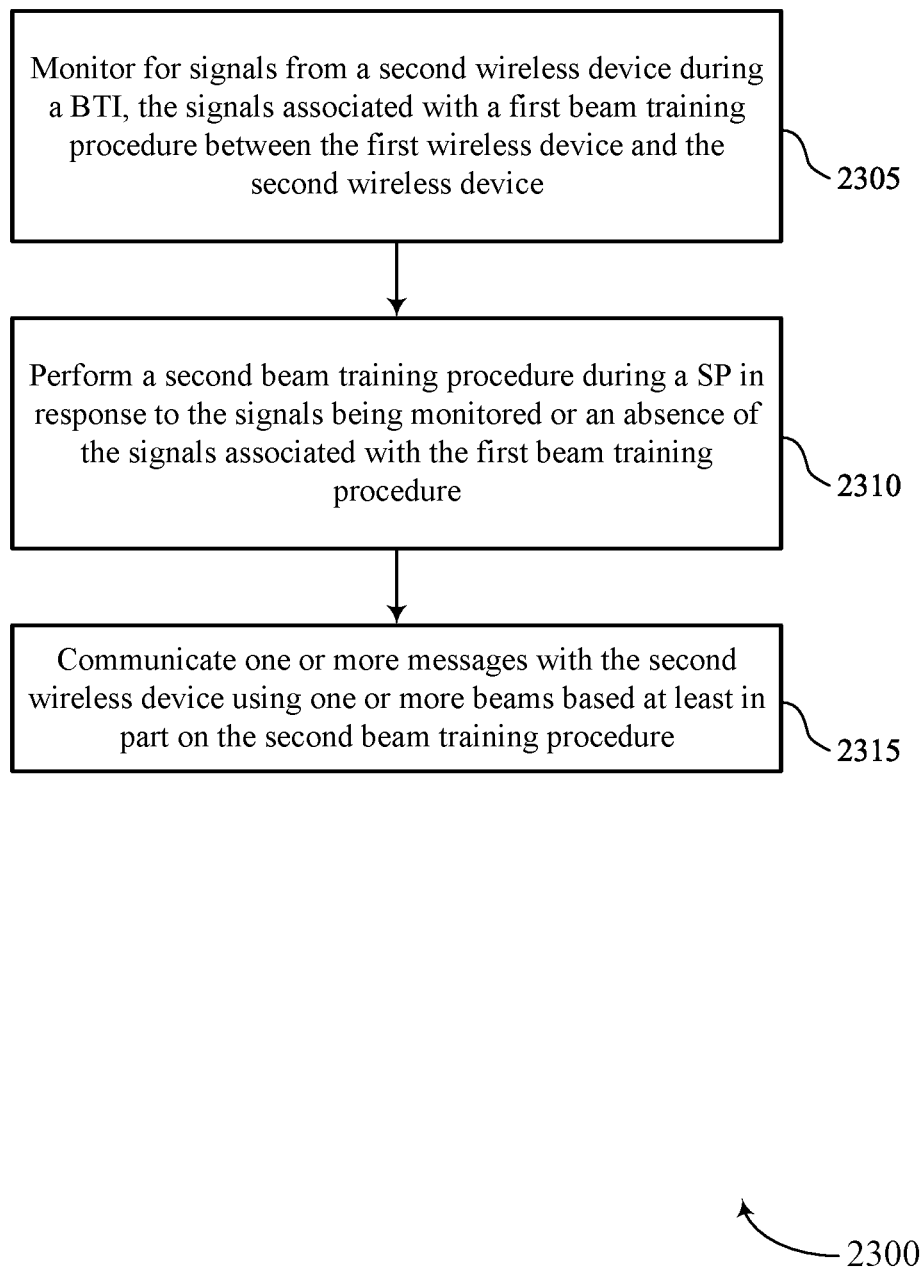

FIG. 23 shows a flowchart illustrating a method 2300 that supports beam training techniques in Wi-Fi frequency bands in accordance with one or more aspects of the present disclosure. The operations of the method 2300 may be implemented by an STA or its components as described herein. For example, the operations of the method 2300 may be performed by an STA as described with reference to FIGS. FIG. 1 through 16. In some examples, an STA may execute a set of instructions to control the functional elements of the STA to perform the described functions. Additionally, or alternatively, the STA may perform aspects of the described functions using special-purpose hardware.

At 2305, the method may include monitoring for signals from a second wireless device during a BTI, the signals associated with a first beam training procedure between the first wireless device and the second wireless device. The operations of 2305 may be performed in accordance with examples as disclosed herein. In some examples, aspects of the operations of 2305 may be performed by a monitoring manager 1540 as described with reference to FIG. 15.

At 2310, the method may include performing a second beam training procedure during an SP in response to the signals being monitored or an absence of the signals associated with the first beam training procedure. The operations of 2310 may be performed in accordance with examples as disclosed herein. In some examples, aspects of the operations of 2310 may be performed by a beam training procedure manager 1530 as described with reference to FIG. 15.

At 2315, the method may include communicating one or more messages with the second wireless device using one or more beams based on the second beam training procedure. The operations of 2315 may be performed in accordance with examples as disclosed herein. In some examples, aspects of the operations of 2315 may be performed by a message communicating manager 1535 as described with reference to FIG. 15.

It should be noted that the methods described herein describe possible implementations, and that the operations and the steps may be rearranged or otherwise modified and that other implementations are possible. Furthermore, aspects from two or more of the methods may be combined.

The following provides an overview of aspects of the present disclosure:

Aspect 1: A method for wireless communications at a first wireless device, comprising: transmitting, to a second wireless device during a SP, an initiating frame using a transmit beam based at least in part on a first beam training procedure performed between the first wireless device and the second wireless device prior to the SP; performing a second beam training procedure during the SP based at least in part on an absence of a response frame from the second wireless device, based at least in part on an indication within the response frame received from the second wireless device, or based at least in part on identification of a change in a wireless channel relative to a previous beam training interval or previous SP, the response frame being in response to the initiating frame; and communicating one or more messages with the second wireless device using one or more beams based at least in part on the second beam training procedure.

Aspect 2: The method of aspect 1, further comprising: communicating, with the second wireless device, control signaling indicating a plurality of SPs associated with the first wireless device, the plurality of SPs including the SP, wherein the initiating frame is transmitted based at least in part on the control signaling.

Aspect 3: The method of any of aspects 1 through 2, wherein the initiating frame comprises an indication as to whether the first wireless device is requesting to perform the second beam training procedure with the second wireless device during the SP.

Aspect 4: The method of any of aspects 1 through 3, further comprising: performing one or more measurements on signals received from the second wireless device via a receive beam based at least in part on the first beam training procedure, wherein the initiating frame is transmitted based at least in part on whether the one or more measurements satisfy one or more thresholds.

Aspect 5: The method of aspect 4, wherein. the initiating frame comprises an indication that the first wireless device is requesting to perform the second beam training procedure based on the one or more measurements failing to satisfy the one or more thresholds, or the initiating frame comprises an indication that the first wireless device is not requesting to perform the second beam training procedure based on the one or more measurements satisfying the one or more thresholds Aspect 6: The method of any of aspects 1 through 5, wherein the initiating frame comprises a buffer status report (BSR) associated with traffic to be communicated from the first wireless device to the second wireless device, the method further comprising: transmitting the traffic to the second wireless device using the one or more beams and based at least in part on the BSR.

Aspect 7: The method of aspect 6, further comprising: receiving, from the second wireless device, a trigger frame scheduling the traffic based at least in part on the BSR, wherein the traffic is transmitted based at least in part on the trigger frame.

Aspect 8: The method of aspect 7, further comprising: receiving downlink traffic from the second wireless device with the trigger frame.

Aspect 9: The method of any of aspects 1 through 8, wherein. the one or more messages are received from the second wireless device using a receive beam based at least in part on the second beam training procedure, a last frame of the one or more messages indicate an end of the one or more messages, an end of the SP, or both Aspect 10: The method of aspect 9, wherein the first wireless device receives the one or more messages while in a first operational state associated with a first power consumption, the method further comprising: transitioning to a second operational state associated with a second power consumption that is less than the first power consumption based at least in part on the one or more messages indicating the end of the one or more messages, the end of the SP, or both.

Aspect 11: The method of any of aspects 1 through 10, further comprising: communicating one or more additional messages with the second wireless device during a second SP using the one or more beams based at least in part on the second beam training procedure.

Aspect 12: The method of aspect 11, wherein the one or more messages comprise an indication of the second SP for communications between the first wireless device and the second wireless device, the one or more additional messages is communicated based at least in part on the indication of the second SP.

Aspect 13: The method of any of aspects 1 through 12, wherein the initiating frame comprises the indication that the first wireless device is requesting to perform the second beam training procedure with the second wireless device, the method further comprising: receiving the response frame from the second wireless device based at least in part on the initiating frame, wherein the response frame comprises an acknowledgment of the second beam training procedure, wherein the second beam training procedure is performed based at least in part on the acknowledgment.

Aspect 14: The method of any of aspects 1 through 13, wherein the initiating frame comprises the indication that the first wireless device is requesting to perform the second beam training procedure with the second wireless device, the method further comprising: identifying the absence of the response frame from the second wireless device based at least in part on the initiating frame; and monitoring for signals from the second wireless device as part of the second beam training procedure based at least in part on the absence of the response frame.

Aspect 15: The method of any of aspects 1 through 14, further comprising: receiving, via the response frame, an indication that the second wireless device is requesting to perform the second beam training procedure with the first wireless device, wherein the second beam training procedure is performed based at least in part on receiving the response frame.

Aspect 16: The method of any of aspects 1 through 15, further comprising: identifying that a quantity of failed frame exchanges between the first wireless device and the second wireless device satisfies a threshold quantity based at least in part on transmitting the initiating frame, wherein the second beam training procedure is performed based at least in part on the identifying.

Aspect 17: The method of any of aspects 1 through 16, further comprising: receiving the response frame based at least in part on the initiating frame being transmitted; and transmitting, to the second wireless device, an acknowledgment frame based at least in part on the response frame, wherein the second beam training procedure is performed based at least in part on the acknowledgment frame.

Aspect 18: The method of any of aspects 1 through 17, wherein the initiating frame comprises a quality of service null frame comprising a control field, the control field comprising a BSR, the indication as to whether the first wireless device is requesting to perform the second beam training procedure, or both.

Aspect 19: The method of any of aspects 1 through 18, wherein. the first wireless device comprises an STA, a first multi-link device, or both, and the second wireless device comprises an AP, a second multi-link device, or both, or the first wireless device comprises the AP and the second wireless device comprises the STA Aspect 20: A method for wireless communications at a first wireless device, comprising: monitoring for an initiating frame from a second wireless device during a SP, wherein the initiating frame is monitored performed using a receive beam based at least in part on a first beam training procedure performed between the first wireless device and the second wireless device prior to the SP; performing a second beam training procedure during the SP based at least in part on an absence of the initiating frame, based at least in part on the initiating frame being received and comprising an indication that the second wireless device is requesting to perform a second beam training procedure with the first wireless device, or based at least in part on identification of a change in a wireless channel during a previous beam training interval or previous SP; and communicating one or more messages with the second wireless device using one or more beams based at least in part on the second beam training procedure.

Aspect 21: The method of aspect 20, further comprising: receiving the initiating frame; and transmitting a response frame to the second wireless device based at least in part on the initiating frame, wherein the second beam training procedure is performed based at least in part on the response frame being transmitted.

Aspect 22: The method of any of aspects 20 through 21, further comprising: identifying an absence of the initiating frame from the second wireless device based at least in part on the initiating frame being monitored, wherein the second beam training procedure is performed based at least in part on the absence of the initiating frame.

Aspect 23: The method of any of aspects 20 through 22, further comprising: communicating, with the second wireless device, control signaling indicating a plurality of SPs associated with the first wireless device, the plurality of SPs including the SP, wherein the initiating frame is monitored for based at least in part on the control signaling.

Aspect 24: The method of any of aspects 20 through 23, wherein the initiating frame comprises an indication as to whether the second wireless device is requesting to perform the second beam training procedure with the first wireless device during the SP.

Aspect 25: The method of any of aspects 20 through 24, further comprising: receiving, via the initiating frame and based at least in part on the monitoring, a BSR associated with traffic to be communicated from the second wireless device to the first wireless device; and receiving the traffic from the second wireless device using the one or more beams and based at least in part on the BSR.

Aspect 26: The method of aspect 25, further comprising: transmitting, to the second wireless device, a trigger frame scheduling the traffic based at least in part on the BSR, wherein the traffic is received based at least in part on the trigger frame.

Aspect 27: The method of aspect 26, further comprising: transmitting downlink traffic from the second wireless device along with the trigger frame.

Aspect 28: The method of any of aspects 20 through 27, wherein a last frame of the one or more messages indicate an end of the one or more messages, an end of the SP, or both.

Aspect 29: The method of any of aspects 20 through 28, wherein the one or more messages comprise an indication of a second SP for communications between the first wireless device and the second wireless device, the method further comprising: communicating one or more additional messages with the second wireless device during the second SP using the one or more beams based at least in part on the second beam training procedure.

Aspect 30: The method of any of aspects 20 through 29, further comprising: receiving, via the initiating frame and based at least in part on the monitoring, the indication that the second wireless device is requesting to perform the second beam training procedure with the second wireless device; and transmitting a response frame to the second wireless device based at least in part on the initiating frame, wherein the response frame comprises an acknowledgment of the second beam training procedure, wherein the second beam training procedure is performed based at least in part on the acknowledgment.

Aspect 31: The method of any of aspects 20 through 30, further comprising: transmitting a response frame based at last in part on receiving the initiating frame, wherein the response frame comprises an indication that the first wireless device is requesting to perform the second beam training procedure with the second wireless device, wherein the second beam training procedure is performed based at least in part on the response frame being transmitted.

Aspect 32: The method of any of aspects 20 through 31, further comprising: identifying that a quantity of failed frame exchanges between the first wireless device and the second wireless device satisfies a threshold quantity based at least in part on the monitoring, wherein the second beam training procedure is performed based at least in part on the identifying.

Aspect 33: The method of any of aspects 20 through 32, further comprising: transmitting a response frame based at least in part on the initiating frame being received; and receiving, from the second wireless device, an acknowledgment frame based at least in part on transmitting the response frame, wherein the second beam training procedure is performed based at least in part on the acknowledgment frame.

Aspect 34: The method of any of aspects 20 through 33, wherein the initiating frame comprises a quality of service null frame comprising a control field, the control field comprising a buffer status report, the indication as to whether the first wireless device is requesting to perform the second beam training procedure, or both.

Aspect 35: The method of any of aspects 20 through 34, wherein. the first wireless device comprises an STA, a first multi-link device, or both, and the second wireless device comprises an AP, a second multi-link device, or both, or the first wireless device comprises the AP and the second wireless device comprises the STA Aspect 36: A method for wireless communications at a first wireless device, comprising: monitoring for signals from a second wireless device during a BTI, the signals associated with a first beam training procedure between the first wireless device and the second wireless device; performing a second beam training procedure during a SP in response to the signals being monitored or an absence of the signals associated with the first beam training procedure; and communicating one or more messages with the second wireless device using one or more beams based at least in part on the second beam training procedure.

Aspect 37: The method of aspect 36, wherein the monitoring comprises: monitoring for a beacon frame in a beam-formed mode.

Aspect 38: The method of any of aspects 36 through 37, further comprising: receiving a beacon frame from the second wireless device based at least in part on the signals being monitored, the beacon frame associated with the first beam training procedure; and refraining from transmission of an initiating frame within the SP based at least in part on the beam training procedure comprising an initial beam training procedure between the first wireless device and the second wireless device, wherein the second beam training procedure is performed based at least in part on the initiating frame being refrained from transmission.

Aspect 39: The method of any of aspects 36 through 38, further comprising: identifying an absence of an initiating frame communicated between the first wireless device and the second wireless device within the SP, wherein the second beam training procedure is performed based at least in part on the absence of the initiating frame.

Aspect 40: An apparatus for wireless communications at a first wireless device, comprising a processor; memory coupled with the processor; and instructions stored in the memory and executable by the processor to cause the apparatus to perform a method of any of aspects 1 through 19.

Aspect 41: An apparatus for wireless communications at a first wireless device, comprising at least one means for performing a method of any of aspects 1 through 19.

Aspect 42: A non-transitory computer-readable medium storing code for wireless communications at a first wireless device, the code comprising instructions executable by a processor to perform a method of any of aspects 1 through 19.

Aspect 43: An apparatus for wireless communications at a first wireless device, comprising a processor; memory coupled with the processor; and instructions stored in the memory and executable by the processor to cause the apparatus to perform a method of any of aspects 20 through 35.

Aspect 44: An apparatus for wireless communications at a first wireless device, comprising at least one means for performing a method of any of aspects 20 through 35.

Aspect 45: A non-transitory computer-readable medium storing code for wireless communications at a first wireless device, the code comprising instructions executable by a processor to perform a method of any of aspects 20 through 35.

Aspect 46: An apparatus for wireless communications at a first wireless device, comprising a processor; memory coupled with the processor; and instructions stored in the memory and executable by the processor to cause the apparatus to perform a method of any of aspects 36 through 39.

Aspect 47: An apparatus for wireless communications at a first wireless device, comprising at least one means for performing a method of any of aspects 36 through 39.

Aspect 48: A non-transitory computer-readable medium storing code for wireless communications at a first wireless device, the code comprising instructions executable by a processor to perform a method of any of aspects 36 through 39.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first wireless device, comprising:
   a processor;
   memory coupled with the processor; and
   instructions stored in the memory and executable by the processor to cause the apparatus to:
   transmit, to a second wireless device during a service period, an initiating frame using a transmit beam based at least in part on a first beam training procedure performed between the first wireless device and the second wireless device prior to the service period;
   perform a second beam training procedure during the service period based at least in part on an absence of a response frame from the second wireless device, based at least in part on an indication within the response frame received from the second wireless device, or based at least in part on identification of a change in a wireless channel relative to a previous beam training interval or previous service period, the response frame being in response to the initiating frame; and
   communicate one or more messages with the second wireless device using one or more beams based at least in part on the second beam training procedure.

2. The apparatus of claim 1, wherein the instructions are further executable by the processor to cause the apparatus to:
   communicate, with the second wireless device, control signaling indicating a plurality of service periods associated with the first wireless device, the plurality of service periods including the service period, wherein the initiating frame is transmitted based at least in part on the control signaling.

3. The apparatus of claim 1, wherein the initiating frame comprises an indication as to whether the first wireless device is requesting to perform the second beam training procedure with the second wireless device during the service period.

4. The apparatus of claim 1, wherein the instructions are further executable by the processor to cause the apparatus to:
   perform one or more measurements on signals received from the second wireless device via a receive beam based at least in part on the first beam training procedure, wherein the initiating frame is transmitted based at least in part on whether the one or more measurements satisfy one or more thresholds.

5. The apparatus of claim 4, wherein the initiating frame comprises an indication that the first wireless device is requesting to perform the second beam training procedure based on the one or more measurements failing to satisfy the one or more thresholds, or wherein the initiating frame comprises an indication that the first wireless device is not requesting to perform the second beam training procedure based on the one or more measurements satisfying the one or more thresholds.

6. The apparatus of claim 1, wherein the initiating frame comprises a buffer status report associated with traffic to be communicated from the first wireless device to the second wireless device, and the instructions are further executable by the processor to cause the apparatus to:
   transmit the traffic to the second wireless device using the one or more beams and based at least in part on the buffer status report.

7. The apparatus of claim 6, wherein the instructions are further executable by the processor to cause the apparatus to:
   receive, from the second wireless device, a trigger frame scheduling the traffic based at least in part on the buffer status report, wherein the traffic is transmitted based at least in part on the trigger frame.

8. The apparatus of claim 7, wherein the instructions are further executable by the processor to cause the apparatus to:
   receive downlink traffic from the second wireless device with the trigger frame.

9. The apparatus of claim 1, wherein: the one or more messages are received from the second wireless device using a receive beam based at least in part on the second beam training procedure, wherein a last frame of the one or more messages indicate an end of the one or more messages, an end of the service period, or both.

10. The apparatus of claim 9, wherein the first wireless device receives the one or more messages while in a first operational state associated with a first power consumption, and the instructions are further executable by the processor to cause the apparatus to:
transition to a second operational state associated with a second power consumption that is less than the first power consumption based at least in part on the one or more messages indicating the end of the one or more messages, the end of the service period, or both.

11. The apparatus of claim 1, wherein the instructions are further executable by the processor to cause the apparatus to:
communicate one or more additional messages with the second wireless device during a second service period using the one or more beams based at least in part on the second beam training procedure.

12. The apparatus of claim 11, wherein the one or more messages comprise an indication of the second service period for communications between the first wireless device and the second wireless device, wherein the one or more additional messages are communicated based at least in part on the indication of the second service period.

13. The apparatus of claim 1, wherein the initiating frame comprises the indication that the first wireless device is requesting to perform the second beam training procedure with the second wireless device, and the instructions are further executable by the processor to cause the apparatus to:
receive the response frame from the second wireless device based at least in part on the initiating frame, wherein the response frame comprises an acknowledgment of the second beam training procedure, wherein the second beam training procedure is performed based at least in part on the acknowledgment.

14. The apparatus of claim 1, wherein the initiating frame comprises the indication that the first wireless device is requesting to perform the second beam training procedure with the second wireless device, and the instructions are further executable by the processor to cause the apparatus to:
identify the absence of the response frame from the second wireless device based at least in part on the initiating frame; and
monitor for signals from the second wireless device as part of the second beam training procedure based at least in part on the absence of the response frame.

15. The apparatus of claim 1, wherein the instructions are further executable by the processor to cause the apparatus to:
receive, via the response frame, an indication that the second wireless device is requesting to perform the second beam training procedure with the first wireless device, wherein the second beam training procedure is performed based at least in part on receiving the response frame.

16. The apparatus of claim 1, wherein the instructions are further executable by the processor to cause the apparatus to:
identify that a quantity of failed frame exchanges between the first wireless device and the second wireless device satisfies a threshold quantity based at least in part on transmitting the initiating frame, wherein the second beam training procedure is performed based at least in part on the identifying.

17. The apparatus of claim 1, wherein the instructions are further executable by the processor to cause the apparatus to:
receive the response frame based at least in part on the initiating frame being transmitted; and
transmit, to the second wireless device, an acknowledgment frame based at least in part on the response frame, wherein the second beam training procedure is performed based at least in part on the acknowledgment frame.

18. The apparatus of claim 1, wherein the initiating frame comprises a quality of service null frame comprising a control field, the control field comprising a buffer status report, the indication as to whether the first wireless device is requesting to perform the second beam training procedure, or both.

19. The apparatus of claim 1,
wherein the first wireless device comprises a station (STA), a first multi-link device, or both, and wherein the second wireless device comprises an access point (AP), a second multi-link device, or both, or
wherein the first wireless device comprises the AP and wherein the second wireless device comprises the STA.

20. An apparatus for wireless communications at a first wireless device, comprising:
a processor;
memory coupled with the processor; and
instructions stored in the memory and executable by the processor to cause the apparatus to:
monitor for an initiating frame from a second wireless device during a service period, wherein the initiating frame is monitored using a receive beam based at least in part on a first beam training procedure performed between the first wireless device and the second wireless device prior to the service period;
perform a second beam training procedure during the service period based at least in part on an absence of the initiating frame, based at least in part on the initiating frame being received and comprising an indication that the second wireless device is requesting to perform a second beam training procedure with the first wireless device, or based at least in part on identification of a change in a wireless channel during a previous beam training interval or previous service period; and
communicate one or more messages with the second wireless device using one or more beams based at least in part on the second beam training procedure.

21. The apparatus of claim 20, wherein the instructions are further executable by the processor to cause the apparatus to:
receive the initiating frame; and
transmit a response frame to the second wireless device based at least in part on the initiating frame, wherein the second beam training procedure is performed based at least in part on the response frame being transmitted.

22. The apparatus of claim 20, wherein the instructions are further executable by the processor to cause the apparatus to:
identify an absence of the initiating frame from the second wireless device based at least in part on the initiating frame being monitored, wherein the second beam training procedure is performed based at least in part on the absence of the initiating frame.

23. The apparatus of claim 20, wherein the instructions are further executable by the processor to cause the apparatus to:

communicate, with the second wireless device, control signaling indicating a plurality of service periods associated with the first wireless device, the plurality of service periods including the service period, wherein the initiating frame is monitored for based at least in part on the control signaling.

24. The apparatus of claim 20, wherein the initiating frame comprises an indication as to whether the second wireless device is requesting to perform the second beam training procedure with the first wireless device during the service period.

25. The apparatus of claim 20, wherein the instructions are further executable by the processor to cause the apparatus to:
receive, via the initiating frame and based at least in part on the monitoring, a buffer status report associated with traffic to be communicated from the second wireless device to the first wireless device; and
receive the traffic from the second wireless device using the one or more beams and based at least in part on the buffer status report.

26. An apparatus for wireless communications at a first wireless device, comprising:
a processor;
memory coupled with the processor; and
instructions stored in the memory and executable by the processor to cause the apparatus to:
monitor for signals from a second wireless device during a beacon transmit interval, the signals associated with a first beam training procedure between the first wireless device and the second wireless device;
perform a second beam training procedure during a service period in response to the signals being monitored or an absence of the signals associated with the first beam training procedure; and
communicate one or more messages with the second wireless device using one or more beams based at least in part on the second beam training procedure.

27. The apparatus of claim 26, wherein the instructions to monitor are executable by the processor to cause the apparatus to:
monitor for a beacon frame in a beamformed mode.

28. The apparatus of claim 26, wherein the instructions are further executable by the processor to cause the apparatus to:
receive a beacon frame from the second wireless device based at least in part on the signals being monitored, the beacon frame associated with the first beam training procedure; and
refrain from transmission of an initiating frame within the service period based at least in part on the first beam training procedure comprising an initial beam training procedure between the first wireless device and the second wireless device, wherein the second beam training procedure is performed based at least in part on the initiating frame being refrained from transmission.

29. The apparatus of claim 26, wherein the instructions are further executable by the processor to cause the apparatus to:
identify an absence of an initiating frame communicated between the first wireless device and the second wireless device within the service period, wherein the second beam training procedure is performed based at least in part on the absence of the initiating frame.

30. A method for wireless communications at a first wireless device, comprising:
transmitting, to a second wireless device during a service period, an initiating frame using a transmit beam based at least in part on a first beam training procedure performed between the first wireless device and the second wireless device prior to the service period;
performing a second beam training procedure during the service period based at least in part on an absence of a response frame from the second wireless device, based at least in part on an indication within the response frame received from the second wireless device, or based at least in part on identification of a change in a wireless channel relative to a previous beam training interval or previous service period, the response frame being in response to the initiating frame; and
communicating one or more messages with the second wireless device using one or more beams based at least in part on the second beam training procedure.

* * * * *